(12) United States Patent
Enomoto et al.

(10) Patent No.: US 6,181,393 B1
(45) Date of Patent: Jan. 30, 2001

(54) LIQUID CRYSTAL DISPLAY DEVICE AND METHOD OF MANUFACTURING THE SAME

(75) Inventors: Shintaro Enomoto, Yokohama; Aira Hotta, Tokyo; Yuko Kizu; Hiroki Iwanaga, both of Yokohama; Masao Tanaka, Sagamihara; Seizaburo Shimizu; Kazuyuki Sunohara, both of Yokohama, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/220,364

(22) Filed: Dec. 24, 1998

(30) Foreign Application Priority Data

Dec. 26, 1997 (JP) .................................... 9-366824

(51) Int. Cl.⁷ ................................................ G02F 1/1333
(52) U.S. Cl. .............................. 349/86; 349/79; 349/80; 349/81
(58) Field of Search .................................. 349/86, 74, 78, 349/79, 80, 81

(56) References Cited

U.S. PATENT DOCUMENTS 4,834,508   5/1989   Fergason ........................ 350/339 F
5,784,136 * 7/1998   Ando et al. ........................ 349/86
6,067,135 * 5/2000   Shimizu et al. ...................... 349/86

FOREIGN PATENT DOCUMENTS 8-248398   9/1996   (JP) .

* cited by examiner

*Primary Examiner*—William L. Sikes
*Assistant Examiner*—Quynh-Nhu H. Vu
(74) *Attorney, Agent, or Firm*—Oblon, Spivak, McClelland, Maier & Neustadt, P.C.

(57) ABSTRACT

A liquid crystal display device of this invention includes a substrate having a pixel electrode on one major surface, a liquid crystal layer including first and second liquid crystal microcapsule layers sequentially stacked on the pixel electrode of the substrate, and a counter electrode formed on the liquid crystal layer. Each of the first and second liquid crystal microcapsule layers contains a plurality of aspherical liquid crystal microcapsules each formed by encapsulating a liquid crystal material containing a liquid crystal compound and a dichroic dye with a transparent film. The major axes of aspherical liquid crystal microcapsules contained in the first liquid crystal microcapsule layer are aligned in a first direction. The major axes of aspherical liquid crystal microcapsules contained in the second liquid crystal microcapsule layer are aligned in a second direction different from the first direction.

19 Claims, 11 Drawing Sheets

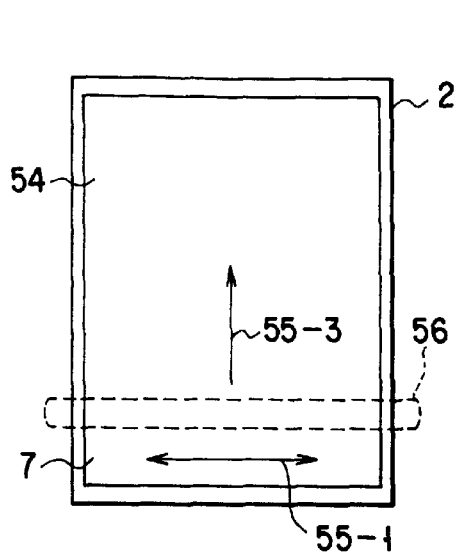 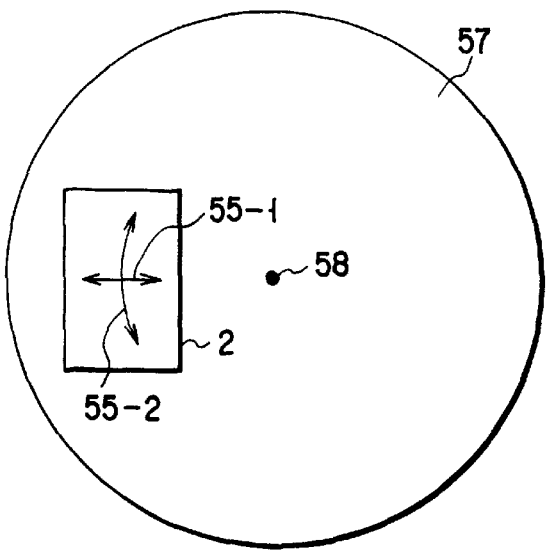
FIG. 27A    FIG. 27B
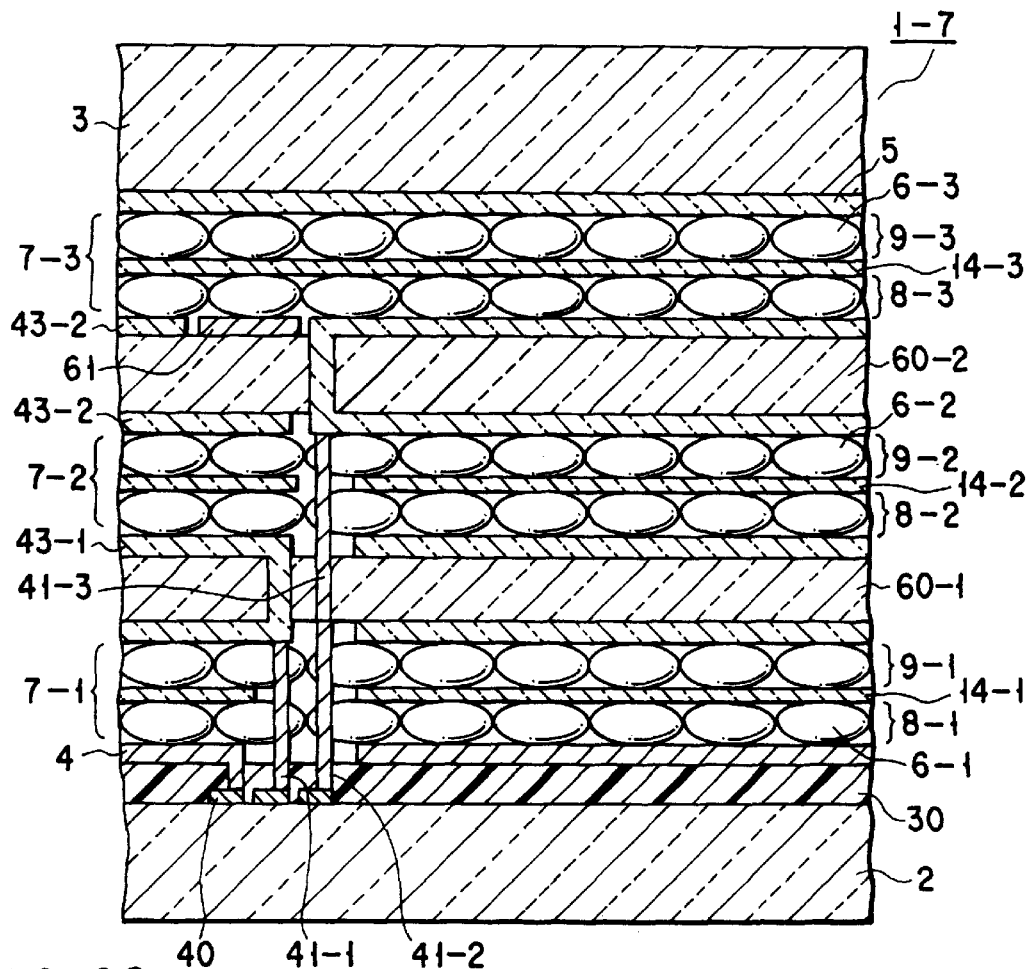
FIG. 28

LIQUID CRYSTAL DISPLAY DEVICE AND METHOD OF MANUFACTURING THE SAME

BACKGROUND OF THE INVENTION

The present invention relates to a liquid crystal display device and a method of manufacturing the same.

A variety of liquid crystal display devices have been proposed as display devices for information devices. Currently, of these liquid crystal display devices, devices using nematic liquid crystals represented by the TN mode (Twisted Nematic mode) disclosed in Jpn. Pat. Appln. KOKAI Publication No. 47-11737 and the STN mode (Super Twisted Nematic mode) disclosed in Jpn. Pat. Appln. KOKAI Publication No. 60-107020 are popularly used.

In TN and STN mode liquid crystal display devices, alignment of liquid crystal molecules are twisted about 90° and 260° in the initial states, respectively. Light incident on a liquid crystal layer emerges with a change in polarization state due to the twisted alignment structure of the liquid crystal molecules and birefringence.

When a voltage is applied to the liquid crystal layer, the liquid crystal molecules reorient themselves in the direction of electric field, and the above-described twisted structure is lost. Consequently, birefringence is lost, and incident light emerges without any change in polarization state. More specifically, the optical characteristics of the liquid crystal layer change depending on application/nonapplication of a voltage. For this reason, when the liquid crystal device is sandwiched by two linear polarizers, a change in intensity of exit light is observed. The TN or STN mode is a display scheme of obtaining contrast in density on the basis of this operation principle.

A liquid crystal display device of such a display scheme is more advantageous than a CRT (Cathode Ray Tube) because the power consumption is much lower, and a low-profile device can be manufactured. The liquid crystal display devices are widely used in office information devices such as personal computers or wordprocessors.

However, the liquid crystal display device of the above display scheme uses polarizers and may not effectively use incident light. Many liquid crystal display devices have light sources (backlights) behind the devices to ensure exit light intensities. In a liquid crystal display device having a color filter, the light transmittance further lowers, and therefore, a more powerful light source is required.

The power for the light source almost equals the power consumption of the liquid crystal display device including a driving circuit. For this reason, the liquid crystal display device of the above display scheme is not suitable as a display for a battery-driven portable information device.

More specifically, in the liquid crystal display device of the conventional display scheme, the improvement in brightness and the reduction in power consumption are antinomic independently of color display or monochrome display.

Such a liquid crystal display device normally uses a fluorescent light as a backlight. This light is not preferable because it causes considerable eyestrain in long-time viewing on the display. A demand has arisen for development of a display scheme with high light utilization efficiency, which is applicable to a reflection liquid crystal display device requiring no backlight.

In use of a liquid crystal display device as a projection display, a compact device having a long service life and power saving of the entire device can be realized by increasing the light transmittance. Hence, for a projection liquid crystal display device as well, a demand for development of a display scheme with high light utilization efficiency has arisen.

To meet such requirements, various display schemes using no polarizers have been proposed. For example, as a display scheme using no polarizers, a scheme called NCAP (Nematic Curvilinear Aligned Phase) or PDLC (Polymer Dispersed Liquid Crystal) is known. In these display schemes, a liquid crystal layer is formed by dispersing a nematic liquid crystal material having a positive dielectric anisotropy in a polymer matrix to form droplets of the liquid crystal material having a diameter of about several micrometers. This liquid crystal material is selected such that the refractive index for ordinary rays nearly equals that of the polymer matrix, and the refractive index for extraordinary rays differs from that of the polymer matrix.

According to this display scheme, in the initial state, the liquid crystal molecules in each liquid crystal particle have a distorted alignment structure. In addition, the alignment direction changes between the liquid crystal particles. For this reason, refractive index differences are generated between most liquid crystal particles and the polymer matrix. As a result, light scattering occurs, as in frosted glass.

When a sufficient voltage is applied to this liquid crystal layer, the liquid crystal molecules reorient themselves in each liquid crystal particle, and the refractive indices of each liquid crystal particle and the polymer matrix equal with respect to light which is perpendicularly incident on the liquid crystal layer. Consequently, neither refraction nor reflection occurs on the interface between each liquid crystal particle and the polymer matrix, resulting in a transparent state. Note that the incident light need not be linearly polarized light.

In the above-described display scheme, a liquid crystal material is dispersed into a medium, unlike a display scheme using liquid crystal microcapsules (to be described later). The liquid crystal display device of this display scheme can be easily formed by encapsulating a polymer matrix dispersed with particles of a liquid crystal material in a glass cell to be used for a general liquid crystal display device or applying the polymer matrix on a substrate.

However, when the liquid crystal molecules are to be aligned by post-processing such as stretching, to increase the contrast, or a conductive polymer film is to be laminated on the liquid crystal layer, the strength of this liquid crystal layer is insufficient. In addition, the light utilization efficiency cannot be increased in color display which requires a color filter, though no problem is posed when a transparent-opaque change is produced for display or when a white-black change is produced for display by adding a black dichroic dye.

As another display scheme using no polarizers, a display scheme using a guest-host liquid crystal formed by adding a guest dychroic dye to a host liquid crystal material is known. According to this display scheme, the light transmittance is controlled by changing the alignment direction of the dychroic dye molecules. M ore specifically, a voltage is applied to the liquid crystal layer to reorient the liquid crystal molecules which aligned themselves parallel to the substrate surface in the initial state to be perpendicular to the substrate surface. By changing the direction of the dychroic dye molecules accordingly, the light transmittance is controlled.

According to this display scheme, a transparent-coloring change can be realized without using any polarizers. In addition, according to this display scheme, when cyan, magenta, and yellow liquid crystal layers are stacked via intermediate substrates, color display can be performed without using any color filter.

However, the dychroic dye has only one absorbance axis and cannot absorb a polarized light component perpendicular to the absorbance axis. Additionally, since the dychroic dye has low solubility in the host liquid crystal m aterial and low molar extinction coefficient, the above display scheme cannot realize display at high contrast.

To realize a liquid crystal display device using a guest-host liquid crystal which can display at higher contrast, various examinations have been made. For example, a White-Taylor type guest-host liquid crystal display device is disclosed in "Journal of Applied Physics (J. Appl. Phys.), Vol. 45, pp. 4718–4723 (1974)". This liquid crystal display device uses, as a liquid crystal material, a mixture of a liquid crystal compound and a dichroic dye having a chiral nematic phase. In this device, light is efficiently absorbed by the dye due to the twisted structure of the chiral nematic phase, so high display contrast can be obtained in principle without using any polarizers.

However, to achieve high contrast in this liquid crystal display device, the helical pitch in the alignment of liquid crystal molecules having the chiral nematic phase must be set on the order of the wavelength of light. If the helical pitch is decreased, many lines of disclination are formed to degrade the display quality. Simultaneously, since the hysteresis phenomenon occurs, the response speed to voltage application excessively lowers. Therefore, this liquid crystal display device is of no practical use, as compared to the above-described liquid crystal display device of TN or STN mode.

As still another display device using a guest-host liquid crystal, a liquid crystal display device using liquid crystal microcapsules is known. An examination has been made to obtain a color liquid crystal display device having a high light utilization efficiency by using the guest-host liquid crystal microcapsules. For example, a technique of preparing guest-host liquid crystal microcapsules having different absorption wavelengths and mixing them to form a liquid crystal layer (Jpn. Pat. Appln. KOKAI Publication No. 58-144885) or a technique of stacking three liquid crystal layers having different absorption wavelengths using guest-host liquid crystal microcapsules without using any intermediate substrates of glass or a plastic (Japanese Patent Application No. 7-56086) is known.

As described above, the liquid crystal display device using liquid crystal microcapsules need not use polarizers. For this reason, the light utilization efficiency increases, and high display contrast can be expected. However, the current liquid crystal display device using liquid crystal microcapsules has not achieved high display contrast yet.

This is partially because when liquid crystal microcapsules are used, all liquid crystal molecules cannot be aligned in a desired direction in the absence of applied voltage. More specifically, in the absence of applied voltage, the liquid crystal molecules in the liquid crystal microcapsules are aligned to be parallel or perpendicular to capsule walls having curved surfaces. For this reason, the liquid crystal molecules in the liquid crystal microcapsules are nonuniformly aligned. When the liquid crystal molecules are non-uniformly aligned, the light absorbance or light transmittance becomes lower than that of a structure with all liquid crystal molecules aligned in one direction. Hence, the liquid crystal display device using liquid crystal microcapsules cannot obtain high display contrast.

BRIEF SUMMARY OF THE INVENTION

As described above, a liquid crystal display device using liquid crystal microcapsules cannot achieve high display contrast.

It is an object of the present invention to provide a liquid crystal display device capable of display at high contrast and a method of manufacturing the same.

According to one aspect of the present invention, there is provided a liquid crystal display device comprising a substrate having a pixel electrode on one major surface, a liquid crystal layer including first and second liquid crystal microcapsule layers sequentially stacked on the pixel electrode of the substrate, and a counter electrode formed on the liquid crystal layer, wherein each of the first and second liquid crystal microcapsule layers contains a plurality of aspherical liquid crystal microcapsules each formed by encapsulating a liquid crystal material containing a liquid crystal compound with a transparent film, major axes of the aspherical liquid crystal microcapsules in the first liquid crystal microcapsule layer are aligned in a first direction, and major axes of the aspherical liquid crystal microcapsules in the second liquid crystal microcapsule layer are aligned in a second direction.

According to another aspect of the present invention, there is provided a method of manufacturing a liquid crystal display device, comprising the steps of forming a first liquid crystal microcapsule layer containing a plurality of liquid crystal microcapsules each having a shape elongated in a first direction, forming a second liquid crystal microcapsule layer containing a plurality of liquid crystal microcapsules each having a shape elongated in a second direction, and forming a structure in which the first liquid crystal microcapsule layer, the second liquid crystal microcapsule layer, and a counter electrode are sequentially stacked on a pixel electrode formed on one major surface of a substrate, wherein each of the plurality of liquid crystal microcapsules contained in the first and second liquid crystal microcapsule layers is formed by encapsulating a liquid crystal material containing a liquid crystal compound with a transparent film.

In the present invention, the liquid crystal material can contain a dichroic dye. In this case, when the first and second directions are set in different directions, the first and second liquid crystal microcapsule layers can absorb light components (polarized light components) having different polarization directions (planes of polarization) at a high efficiency. That is, display at high contrast can be performed.

The light absorbance in each liquid crystal microcapsule layer is maximized when the first or second direction is substantially parallel to the substrate surface. When the first direction is substantially perpendicular to the second direction, a light component transmitted through one of the first and second liquid crystal microcapsule layers can be absorbed by the other at a high efficiency.

In the present invention, the first direction may be substantially parallel to the second direction, and a $\lambda/2$-wavelength plate may be inserted between the first liquid crystal microcapsule layer and the second liquid crystal microcapsule layer. The $\lambda/2$-wavelength plate has two different principal refractive indices in the third and fourth directions perpendicular to each other in its plane. That is, the $\lambda/2$-wavelength plate has two optical axes perpendicular to each other in its plane. When the $\lambda/2$-wavelength plate is arranged such that the first and second directions make an angle of substantially 45° with the third or fourth direction, the light component transmitted through the first liquid crystal microcapsule layer is rotated in its polarization direction through 90° by the λ/2-wavelength plate and becomes incident on the second liquid crystal microcapsule layer. Hence, the first and second liquid crystal microcapsule layers can absorb light components having different polarization directions at a high efficiency.

In the present invention, the major axis of each of the plurality of aspherical liquid crystal microcapsules preferably has a length not less than two times the maximum value of the diameter perpendicular to the major axis. More preferably, the major axis has a length not less than three times the maximum value. Preferably, in the first liquid crystal microcapsule layer, a variation of the major axes of the liquid crystal microcapsules from the first direction falls within a range of 10°, and in the second liquid crystal microcapsule layer, a variation of the major axes of the liquid crystal microcapsules from the second direction falls within a range of 10°. In this case, each of the first and second liquid crystal microcapsule layers can be made to absorb a specific polarized beam at a very high efficiency.

In the present invention, the aspherical liquid crystal microcapsule can have various shapes. The aspherical liquid crystal microcapsule may have a spheroidal shape. Alternatively, the aspherical liquid crystal microcapsule may have a tapered or fibrous shape.

The first and second liquid crystal microcapsule layers can be formed using aspherical liquid crystal microcapsules. In this case, a plurality of recessed portions aligned periodically are preferably formed in the surface of the substrate having the pixel electrode. This recessed portion can be formed into a shape that fits with the aspherical liquid crystal microcapsule or a groove shape.

The major axes of the plurality of aspherical liquid crystal microcapsules may be aligned in a desired direction by arranging the plurality of aspherical liquid crystal microcapsules on the pixel electrode of the substrate and vibrating the substrate. A pickup head for holding the plurality of aspherical liquid crystal microcapsules by suction to align their major axes in a predetermined direction may be used.

The first and second liquid crystal microcapsule layers can be formed using spherical liquid crystal microcapsules. For example, when a liquid crystal microcapsule layer is formed using spherical liquid crystal microcapsules and stretched, the first or second liquid crystal microcapsule layer can be formed.

A plurality of spherical liquid crystal microcapsules may be aligned in lines on a flat plate and pressed against the flat plate. When liquid crystal microcapsules adjacent in a line are in contact with each other, and liquid crystal microcapsules adjacent between the lines are aligned at a predetermined interval, the liquid crystal microcapsules are drawn in a direction perpendicular to the lines. That is, the first or second liquid crystal microcapsule layer can be formed.

The first or second liquid crystal microcapsule layer can also be formed by applying a liquid crystal microcapsule coating solution containing the plurality of spherical liquid crystal microcapsules and a liquid to a flat plate to form a coat and sequentially drying the coat in a direction parallel to the flat plate. In this case, the liquid crystal microcapsule coating solution can contain a photosetting or thermosetting resin which shrinks upon hardening. A groove-shaped recessed portion or a band-shaped projecting portion may be formed on the surface of the flat plate. When the first liquid crystal microcapsule layer is to be formed by this method, the substrate can be used as the flat plate. When the second liquid crystal microcapsule layer is to be formed by this method, a thin film consisting of a transparent resin may be formed on the first liquid crystal microcapsule layer and used in place of the flat plate.

In the present invention, the liquid crystal layer can be formed by independently forming the first and second liquid crystal microcapsule layers and bonding them. One of the first and second liquid crystal microcapsule layers may be formed on the other.

The first or second liquid crystal microcapsule layer can be formed on the substrate having the pixel electrode. Alternatively, the first or second liquid crystal microcapsule layer may be formed on a flat plate different from this substrate and transferred from the flat plate to the substrate.

In the present invention, the liquid crystal display device preferably has a structure in which three liquid crystal layers having different absorption wavelengths are sequentially stacked. In this case, full-color display is made possible by providing intermediate electrodes between the three liquid crystal layers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 27A and 27B are plan views schematically showing a method of forming a liquid crystal layer of Example 20 of the present invention; and FIG. 28 is a sectional view schematically showing a liquid crystal display device of Example 26 of the present invention.

DETAILED DESCRIPTION OF THE INVENTION

The present invention will be described below in detail with reference to the accompanying drawings.

The first embodiment of the present invention will be described. In the first embodiment, a liquid crystal microcapsule is formed as an aspherical granule.

Figure 1:
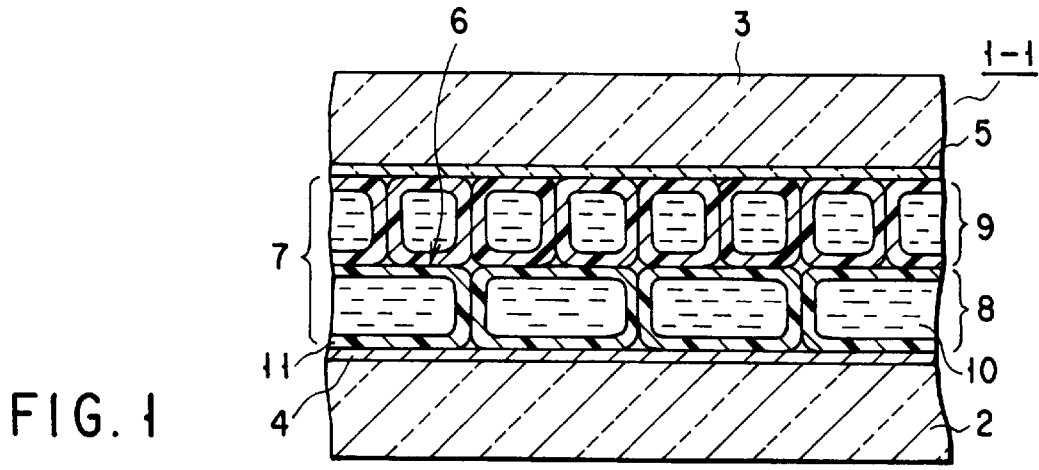
FIG. 1 is a sectional view schematically showing a liquid crystal display device according to the first embodiment of the present invention.

FIG. 1 is a sectional view of a liquid crystal display device according to the first embodiment of the present invention. Referring to FIG. 1, a liquid crystal display device 1-1 has a substrate 2 having an electrode 4 formed on one major surface, a substrate 3 placed to oppose the surface of the substrate 2 with the electrode 4 and having an electrode 5 on the opposing surface, and a liquid crystal layer 7 sandwiched by the substrates 2 and 3.

In the liquid crystal display device 1-1, a transparent substrate of glass or a plastic or the like is used as the substrate 2. As the electrode 4, a transparent conductive film of ITO or the like or a metal film of aluminum or the like is used. The substrate 3 need not always be arranged. Instead, a protective film of a transparent resin or the like may be arranged. As the counter electrode 5, a transparent conductive film of ITO or the like is used.

In the liquid crystal display device 1-1, the liquid crystal layer 7 comprises liquid crystal microcapsules 6 each formed by encapsulating a liquid crystal material 10 with a transparent film 11. The liquid crystal microcapsules 6 form liquid crystal microcapsule layers 8 and 9 in the liquid crystal layer 7. That is, the liquid crystal layer 7 has a layered structure formed by stacking the liquid crystal microcapsule layers 8 and 9.

Each liquid crystal microcapsule 6 has an anisotropic shape, i.e., an aspherical shape. The liquid crystal microcapsules 6 in the liquid crystal microcapsule layer 8 have equal or similar shapes and are arranged such that the alignment directions of their major axes almost match in the liquid crystal microcapsule layer 8. The liquid crystal microcapsules 6 in the liquid crystal microcapsule layer 9 also have equal or similar shapes and are arranged such that the alignment directions of their major axes almost match in the liquid crystal microcapsule layer 9. The alignment direction of the liquid crystal microcapsules 6 in the liquid crystal microcapsule layer 8 is different from that in the liquid crystal microcapsule layer 9.

As the liquid crystal material 10 of the liquid crystal microcapsules 6, for example liquid crystal compounds represented by formulas (1) to (10) can be used.

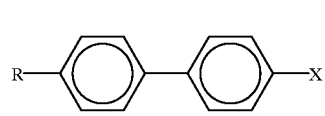

(1)

-continued

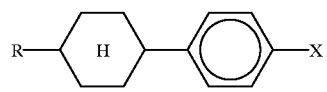
(2)

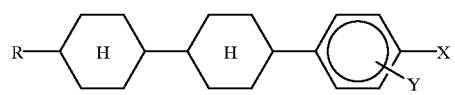
(3)

(4)

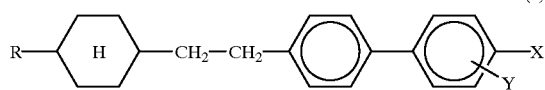
(5)

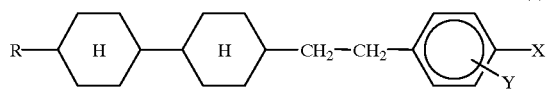
(6)

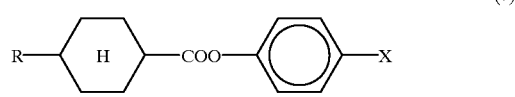
(7)

(8)

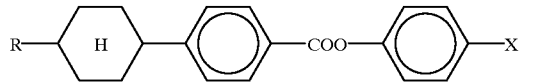
(9)

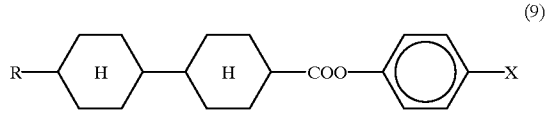
(10)

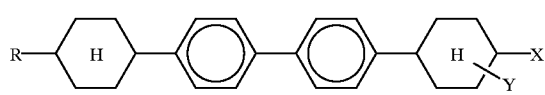

In the above formulas (1) to (10), substituting groups R and X represent an alkyl group, an alkoxy group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyalkylphenylalkyl group, an alkoxyalkylcyclohexylalkyl group, an alkylcyclohexylalkyl group, an alkoxyalkoxycyclohexylalkyl group, an alkoxyphenylalkyl group, and an alkylcyclohekylphenylalkyl group. A substituting group Y represents a hydrogen atom and a halogen atom.

In the substituting groups R and X, alkyl chain or alkoxy chain may be optically active, and phenyl group or phenoxy group may be substituted by a halogen atom such as a fluorine atom or chlorine atom. In the substituting groups R and X, a hydrogen atom in the phenyl group may be substituted by one or two halogen atoms such as fluorine atoms or chlorine atoms.

In the present invention, liquid crystal compositions prepared by mixing the liquid crystal compounds represented by formulas (1) to (10) may be used as the liquid crystal material. All the liquid crystal compounds represented by formulas (1) to (10) have a positive dielectric anisotropy. However, a liquid crystal compound having a negative dielectric anisotropy can also be used. For example, as the liquid crystal material, a liquid crystal composition prepared by mixing a liquid crystal compound having a negative dielectric anisotropy with a liquid crystal compound having a positive dielectric anisotropy to obtain a positive net dielectric anisotropy can be used. When appropriate device structure and driving method are used, a liquid crystal compound or composition having a negative dielectric anisotropy can also be used as the liquid crystal material.

The liquid crystal material preferably contains a dichroic dye. In a liquid crystal display device using a dichroic dye, the display color becomes whitish when light absorption is unsufficient in the absence of applied voltage. For this reason, increase in light absorption is particularly required. Hence, when the liquid crystal material has a dichroic dye, the effect of the present invention especially becomes conspicuous.

As the dichroic dye, yellow dyes represented by formulas (11) to (19), magenta dyes represented by formulas (20) to (27), or cyan dyes represented by formulas (28) to (31) can be used.

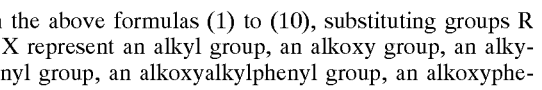
(11)

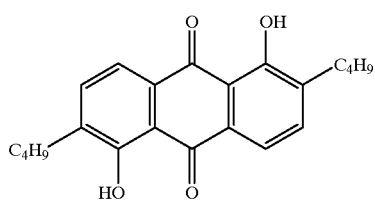
(12)

(13)
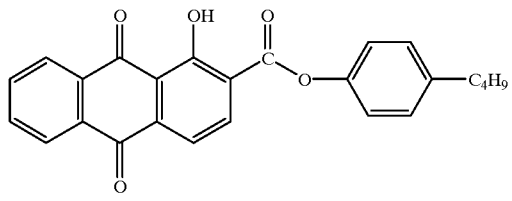
(14)
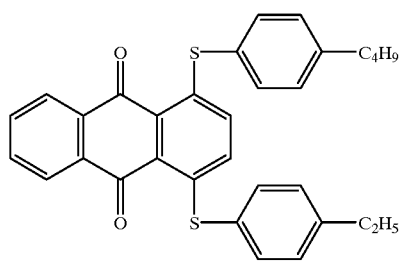
(15)
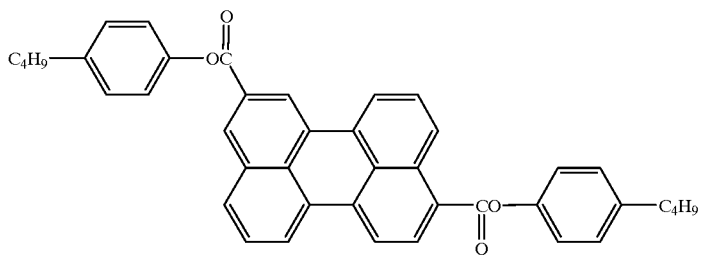
(16)
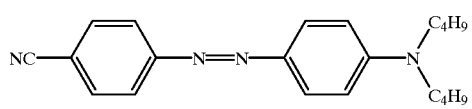
(17)
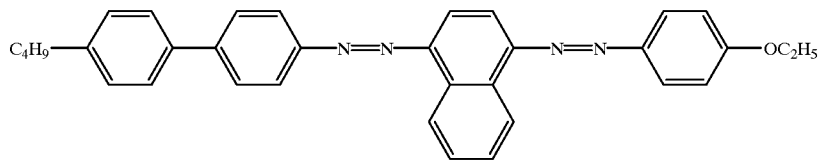
(18)
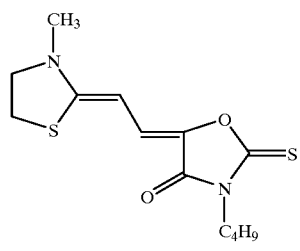
(19)
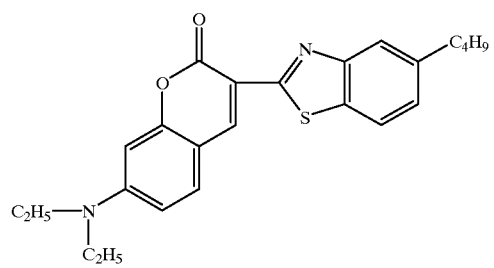
(20)
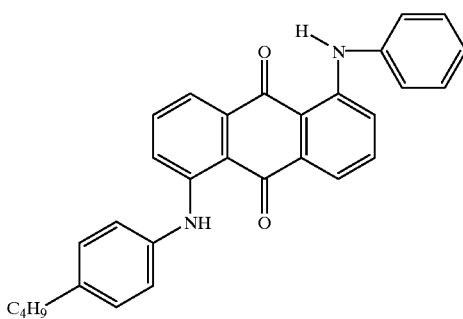
(21)
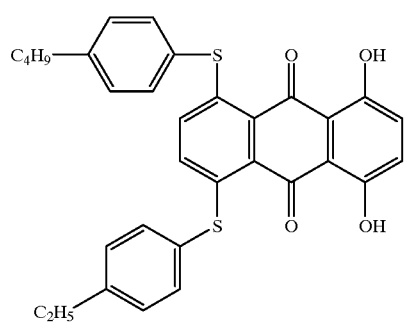

-continued
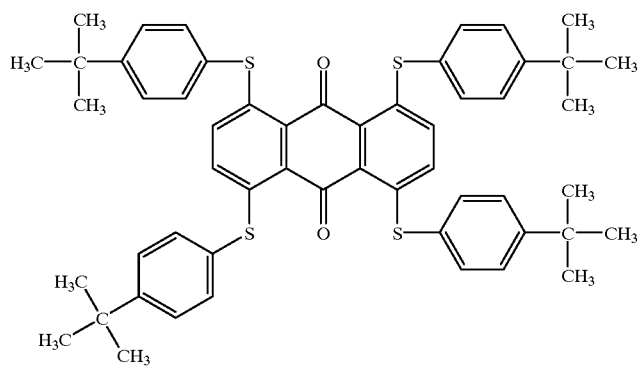
(22)
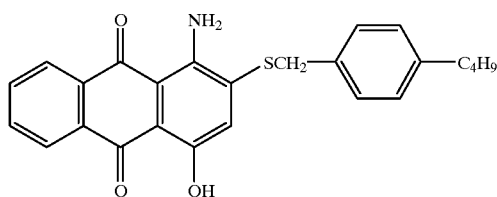
(23)
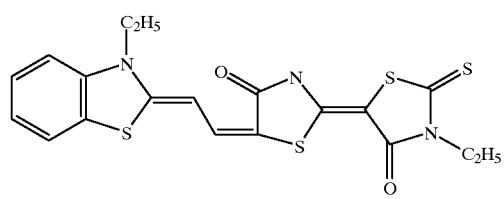
(24)
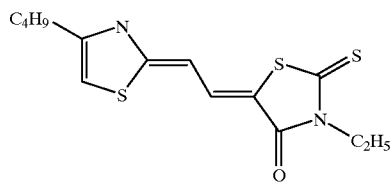
(25)
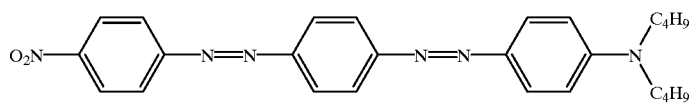
(26)
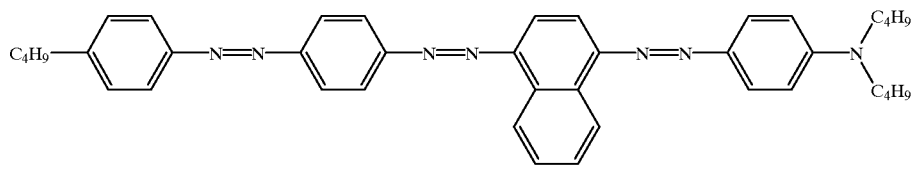
(27)
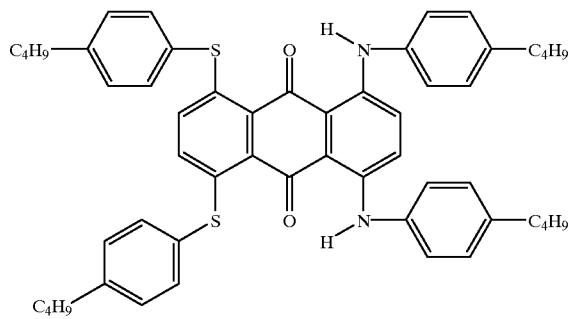
(28)
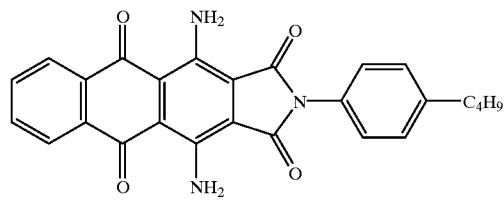
(29)

(30)

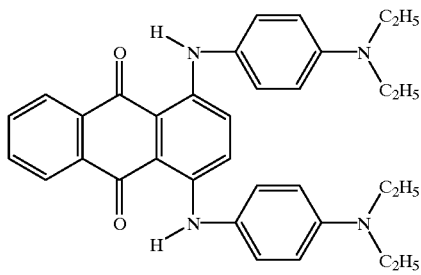

(31)

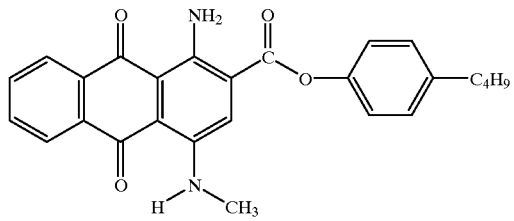

When the liquid crystal material contains a dichroic dye, the mixing ratio of the dichroic dye to the liquid crystal compound or liquid crystal composition is preferably 0.01 wt % to 10 wt %, and more preferably, 0.1 wt % to 5 wt %. If the mixing ratio of the dichroic dye is lower than the lower limit value, sufficient contrast may not be obtained. If the mixing ratio exceeds the upper limit value, the contrast may lower because coloring remains even in the presence of applied voltage.

As the transparent film 11 for encapsulating the liquid crystal material 10, a thermosetting resin such as a condensation polymer, e.g., a melamine resin, an epoxy resin, a urea resin, a phenol resin, or a furan resin, or a three-dimensional cross-linked vinyl polymer, e.g., a styrene-divinylbenzene copolymer or methyl methacrylate-vinylacrylate copolymer, can be used.

Examples of the transparent film 11 are: thermoplastic resins such as polyethylenes; chlorinated polysthylenes; ethylene copolymers such as an ethylene-vinyl acetate copolymer and an ethylene-acrylic acid-maleic anhydride copolymer; polybutadienes; polyesters such as polyethylene terephthalate, polybutylene terephthalate, and polyethylene naphthalate; polypropylenes; polyisobutylenes; polyvinyl chlorides; polyvinylidene chlorides; polyvinyl acetates; polyvinyl alcohols; polyvinyl acetals; polyvinyl butyrals; ethylene tetrafluoride resins; chloroethylene trifluoride resins; ethylene fluoride-propylene resins; vinylidene fluoride resins; vinyl fluoride resins; ethylene tetrafluoride copolymers such as an ethylene tetrafluoride-perfluoroall, oxyethylene copolymer, an ethylene tetrafluoride-perfluoroalkylvinylether copolymer, an ethylene tetrafluoride-propylene hexafluoride copolymer, and an ethylene tetrafluoride-ethylene copolymer; fluoroplastics such as polybenzoxazole containing fluorine; acrylic resins; methacrylate resins such as polymethyl methacrylate; polyacrylonitriles; acrylonitrile copolymers such as an acrylonitrile-butadiene-styrene copolymer; polystyrenes; halogenated polystyrenes; styrene copolymers such as a styrene-methacrylate copolymer and a styrene-acrylonitrile copolymer; ionic polymers such as sodium polystyrenesulfonate and sodium polyacrylate; acetal resins; polyamides such as nylon 66; gelatine; acacia gum; polycarbonates; polyester carbonates; cellulosic resins; phenolic resins; urea resins; epoxy resins; unsaturated polyester resins; alkyd resins; melamine resins; polyurethanes; diaryl phthalate resins; polyphenylene oxides; polyphenylene sulfides; polysulfons; polyphenyl sulfones; silicone resins; polyimides; bismaleimide triazine resins; polyimide amides; polyether sulfones; polymethyl pentenes; polyether ether ketones; polyether imides; polyvinyl carbazoles; norbornane amorphous polyolefins; and polyester fumarates.

The transparent film 11 of the liquid crystal microcapsule 6 may be formed as a multilayered film using two or more types of resins selected from the above thermosetting resins and thermoplastic resins. In this case, a thermosetting resin is preferably used as the outermost film of the transparent film 11 to improve the thermal stability of the liquid crystal microcapsule 6.

The liquid crystal microcapsule 6 having the above structure can be formed using interface polymerization, in situ polymerization, dipped hardening/coating, phase separation from an aqueous solution system, phase separation from an organic solution system, fusing dispersion cooling, air suspension, or spray drying. The liquid crystal microcapsule 6 is normally formed such that the average grain size becomes about 3 to 15 μm.

In the PDLC, a liquid crystal layer has a structure in which droplets of a liquid crystal material are dispersed in a thin film matrix of a transparent resin. In the PDLC, it is difficult to raise the volume ratio of the liquid crystal material to the matrix because of its structure. In addition, the mechanical strength of this liquid crystal layer is low.

To the contrary, when the liquid crystal microcapsules 6 are used as in the liquid crystal display device 1-1, the volume ratio of the liquid crystal material 10 to the transparent film 11 as a matrix can be largely increased as compared to the PDLC. More specifically, in the liquid crystal microcapsule 6, the volume percentage of the liquid crystal material to the sum of the transparent film 11 and liquid crystal material 10 can be about 70 vol % or more. When the volume percentage of the liquid crystal material is 70 vol % or more, sufficient display contrast can be obtained. When the volume percentage of the liquid crystal material is 96 vol % or less, a sufficient mechanical strength can be obtained.

Figure 2A:
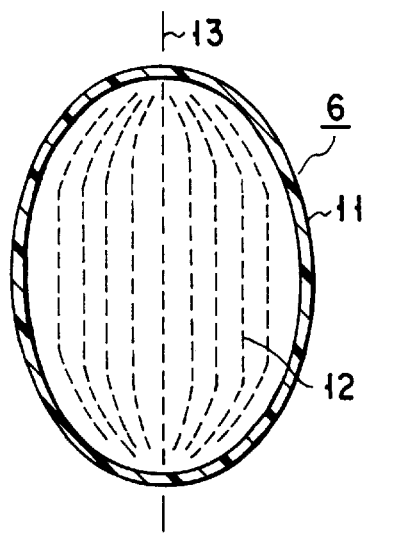
FIG. 2A is a sectional view schematically showing an example of a liquid crystal microcapsule used in the liquid crystal display device according to the first embodiment of the present invention.

FIG. 2A is a sectional view showing an example of a liquid crystal microcapsule used in the liquid crystal display device according to the first embodiment of the present invention. In the liquid crystal microcapsule 6 shown in FIG. 2A, reference numeral 12 denotes a liquid crystal molecule. The transparent film 11 encapsulates not only the liquid crystal molecules 12 but also a dichroic dye (not shown). Referring to FIG. 2A, the liquid crystal microcapsule 6 has an aspherical shape and, more specifically, a spheroidal shape. Most liquid crystal molecules 12 lie parallel to an axis 13 corresponding to the major axis of the liquid crystal microcapsule 6.

When the liquid crystal microcapsule 6 has an aspherical shape as shown in FIG. 2A, and the major-axis direction of the liquid crystal microcapsules 6 in the liquid crystal microcapsule layer 8 is different from that in the liquid crystal microcapsule layer 9 in the liquid crystal display device 1-1, high display contrast can be obtained. The reason for this will be described below.

Figure 2B:
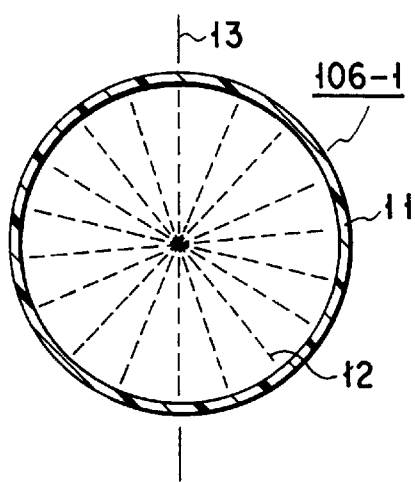
FIGS. 2B to 2D are sectional views schematically showing a conventional liquid crystal microcapsule.
Figure 2C:
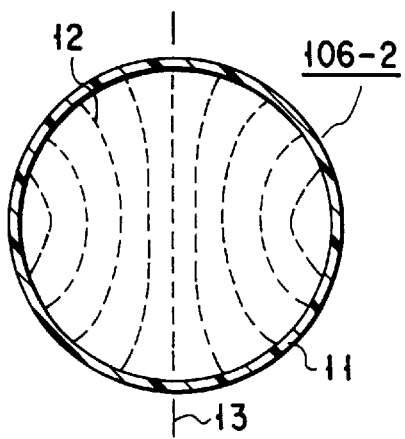
Figure 2D:
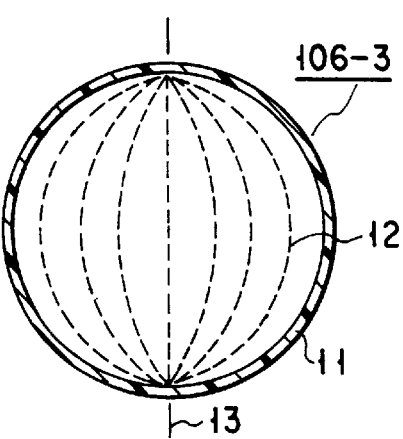

FIGS. 2B to 2D are sectional views of liquid crystal microcapsules used in the conventional liquid crystal display device. Each of conventional liquid crystal microcapsules 106-1, 106-2, and 106-3 shown in FIGS. 2B to 2D has a structure in which a liquid crystal material is encapsulated by a transparent film 11. According to the conventional manufacturing method, the liquid crystal microcapsules 106-1, 106-2, and 106-3 are formed into a spherical shape, as shown in FIGS. 2B to 2D.

In the liquid crystal microcapsules 106-1 to 106-3 shown in FIGS. 2B to 2D, the liquid crystal molecules 12 have different aligned states. This difference in alignment results from the degree of interaction between the transparent film 11 and the liquid crystal molecules 12 and the grain size difference between the liquid crystal microcapsules 106-n. When an appropriate interaction is present between the transparent film 11 and the liquid crystal molecules 12, bipolar alignment is observed. If the interaction is weak, radial or axial alignment is observed. When the interaction is weak, and the grain size is sufficiently large, radial alignment is observed. When the interaction is weak, and the grain size is small, axial alignment is observed.

In the liquid crystal microcapsule 106-1 shown in FIG. 2B, the liquid crystal molecules 12 are radially aligned from the center of the liquid crystal microcapsule to be perpendicular to the transparent film 11, resulting in radial alignment. The liquid crystal microcapsule 106-1 with radially aligned liquid crystal molecules 12 has equal light transmittance with respect to incident light from all directions. That is, the liquid crystal microcapsule 106-1 is optically isotropic. For this reason, when the liquid crystal microcapsule 106-1 is used, light absorbance cannot be improved by optimizing the relationship between the optical axis of incident light and the alignment directions of the liquid crystal molecules 12.

In the liquid crystal microcapsule 106-2 shown in FIG. 2C, the liquid crystal molecules 12 are aligned almost perpendicular to the transparent film 11, though no radial alignment is observed. In the liquid crystal microcapsule 106-2, the liquid crystal molecules 12 have axial alignment, and the liquid crystal microcapsule 106-2 has optical anisotropy.

In the liquid crystal microcapsule 106-3 shown in FIG. 2D, the liquid crystal molecules 12 are aligned parallel to the transparent film 11 from one pole to the other pole of the liquid crystal microcapsule 106-3. That is, in the liquid crystal microcapsule 106-3, the liquid crystal molecules 12 have bipolar alignment. For this reason, the liquid crystal microcapsule 106-3 has optical anisotropy.

In the liquid crystal microcapsules 106-2 and 106-3 with the liquid crystal molecules 12 having axial or bipolar alignment, the liquid crystal alignment has anisotropy. Hence, when light is incident perpendicularly to the axis 13 connecting the two poles, the highest light absorbance can be obtained.

However, the liquid crystal molecules 12 far from the axis 13 in the liquid crystal microcapsule 106-2 or the liquid crystal molecules 12 near the two poles in the liquid crystal microcapsule 106-3 are not aligned parallel to the axis 13. That is, only some liquid crystal molecules 12 are aligned parallel to the axis 13. For this reason, relatively low light absorbance is obtained as compared to a case in which all liquid crystal molecules line up in one direction.

The light absorbance is increased when the axis 13 is perpendicular to the light incident direction. However, it is difficult to arrange the spherical liquid crystal microcapsules 106-2 and 106-3 such that the axis 13 is perpendicular to the optical axis of incident light.

To the contrary, in the liquid crystal display device 1-1, the liquid crystal microcapsule 6 is formed to have a major axis as shown in FIG. 2A. In the liquid crystal microcapsule 6 having this shape and liquid crystal molecules with bipolar alignment, the liquid crystal microcapsules are most stabilized when the liquid crystal molecules 12 lie in the direction of the axis 13. The liquid crystal microcapsule shown in FIG. 2A is stretched along the axis 13. Therefore, in the liquid crystal microcapsule 6 shown in FIG. 2A, the ratio of liquid crystal molecules 12 aligned parallel to the axis 13 is higher than that in the liquid crystal microcapsules 106-2 and 106-3 shown in FIGS. 2C and 2D.

According to the present invention, since the alignment directions of the liquid crystal molecules 12 in the liquid crystal microcapsule 6 are uniformed, the angle the alignment direction of each liquid crystal molecule 12 makes with the optical axis of incident light can be optimized, so a liquid crystal display device capable of display at high contrast can be obtained.

However, a dichroic dye cannot absorb all light components in a predetermined wavelength range. More specifically, a dichroic dye can absorb only a polarized light component parallel to the long axes of the molecules and cannot absorb a polarized light component perpendicular to the long axes of the molecules. For this reason, incident light cannot be sufficiently absorbed by only one liquid crystal microcapsule layer.

In the liquid crystal display device 1-1, the liquid crystal microcapsule layers 8 and 9 are stacked to form the liquid crystal layer 7. In addition, the major-axis directions of the liquid crystal microcapsules 6 are different between the liquid crystal microcapsule layers 8 and 9, and accordingly, the alignment directions of the dichroic dye are also different.

With this structure, when light is incident from, e.g., the substrate 3 side on the liquid crystal layer 7, some components of the incident light are absorbed by the liquid crystal microcapsule layer 9, and the remaining light components transmitted through the liquid crystal microcapsule layer 9 are absorbed by the liquid crystal microcapsule layer 8. Therefore, according to the liquid crystal display device 1-1, higher display contrast can be obtained.

The average alignment direction of the liquid crystal molecules 12 in each of the liquid crystal microcapsule layers 8 and 9 preferably makes an angle of 0° to 60° with the substrate surface. More preferably, the alignment direction is parallel to the substrate surface. The average alignment direction of the liquid crystal molecules 12 in the liquid crystal microcapsule layer 8 preferably makes an angle of 80° to 90° with the average alignment direction of the liquid crystal molecules 12 in the liquid crystal microcapsule layer 9. More preferably, the alignment directions form an angle of 90°. When the alignment direction of the liquid crystal molecules 12 is controlled in this manner, higher display contrast can be obtained.

When the major axis of the liquid crystal microcapsule 6 has a length two times or more the maximum value of the diameter perpendicular to the major axis, the above-described effect becomes more remarkable. More specifically, the average alignment direction of the liquid crystal molecules 12 can be roughly matched with the major axis of the liquid crystal microcapsule 6. Especially, when the major axis of the liquid crystal microcapsule 6 has a length of three times or more the maximum value of the diameter perpendicular to the major axis, the alignment directions of the liquid crystal molecules 12 can be further uniformed in the absence of applied voltage. That is, the order parameter of the liquid crystal molecules 12 in the absence of applied voltage can be increased.

The projection of the liquid crystal microcapsule 6 on the substrate 2 preferably has a shape with which the average alignment direction of the liquid crystal molecules 12 in the absence of applied voltage is uniquely determined. For example, when the projection of the liquid crystal microcapsule 6 on the substrate 2 has a regular hexagonal shape, the alignment direction in the absence of applied voltage is parallel to a diagonal line. However, a regular hexagon has a triple rotary axis. That is, a regular hexagon has three equivalent diagonal lines. In this case, the average alignment direction of the liquid crystal molecules 12 in the absence of applied voltage cannot be matched among the liquid crystal microcapsules 6.

On the other hand, when the projection of the liquid crystal microcapsule 6 on the substrate 2 has no rotary axis or has double rotary axis, the average alignment direction of the liquid crystal molecules 12 in the absence of applied voltage is uniquely determined. Hence, the average alignment direction of the liquid crystal molecules 12 in the absence of applied voltage can be matched among the liquid crystal microcapsules 6.

In each of the liquid crystal microcapsule layers 8 and 9, a variation in the alignment direction of each liquid crystal microcapsule 6 from the average alignment direction of the liquid crystal microcapsules 6 preferably falls within the range of 10°. The reason for this will be described with reference to FIG. 3.

Figure 3:
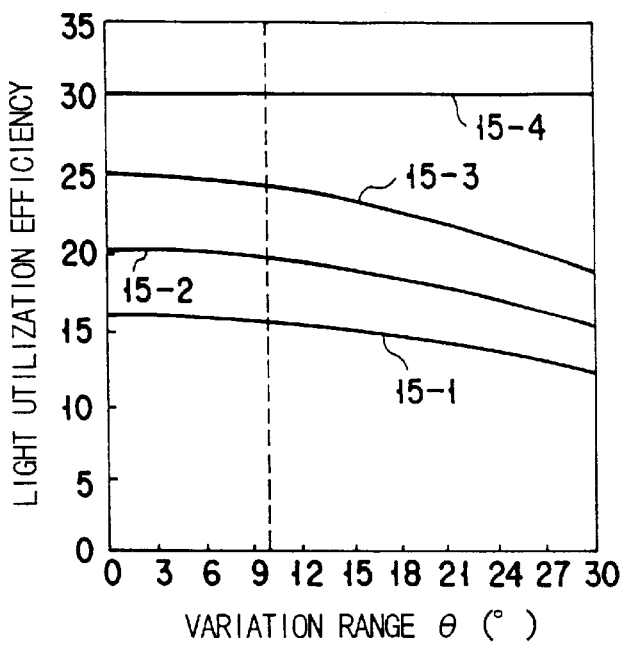
FIG. 3 is a graph showing the relationship between a variation in alignment direction of the liquid crystal microcapsule and the light utilization efficiency according to the first embodiment of the present invention.

FIG. 3 is a graph showing the relationship between a variation in alignment direction of the liquid crystal microcapsule 6 and the light utilization efficiency. Referring to FIG. 3, a variation range θ of the liquid crystal microcapsule alignment direction is plotted along the abscissa, and a light utilization efficiency R is plotted along the ordinate. When an order parameter S of the liquid crystal molecule 12 in the liquid crystal microcapsule 6 is 0.4, 0.45, 0.5, and 0.55, respectively, curves 15-1 to 15-4 represent data obtained by:

$$R=(S \times \cos \theta)^2$$

As shown in FIG. 3, for any values, when the variation in alignment direction of the liquid crystal microcapsule 6 falls within the range of ±10°, a high light utilization efficiency R can be obtained.

The first direction as the major-axis direction of the liquid crystal microcapsule 6 in the liquid crystal microcapsule layer 8 and the second direction as the major-axis direction of the liquid crystal microcapsule 6 in the liquid crystal microcapsule layer 9 preferably has an angle of 0° to 6° with respect to the substrate surface and, more preferably, are parallel to the substrate surface. The first and the second directions preferably form an angle of 80° to 90° and, more preferably, 90°. By controlling the first and second directions in this manner, higher display contrast can be obtained.

The above-described liquid crystal display device 1-1 can be manufactured by a method to be described below. The method will be described with reference to FIGS. 4A to 4C.

Figure 4A:
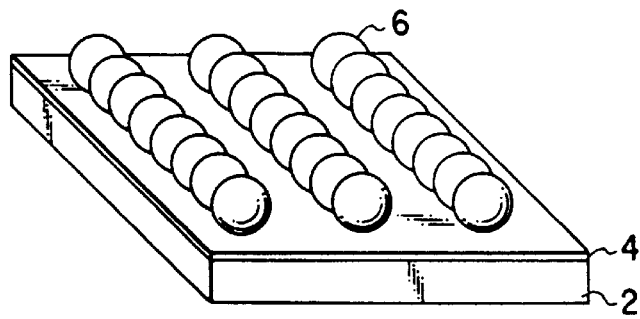
FIGS. 4A to 4C are perspective views schematically showing an example of a process of manufacturing the liquid crystal display device according to the first embodiment of the present invention.
Figure 4B:
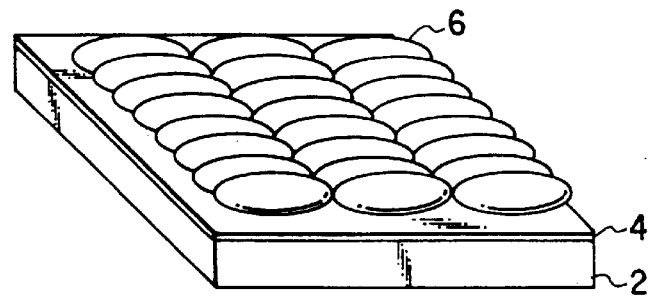
Figure 4C:
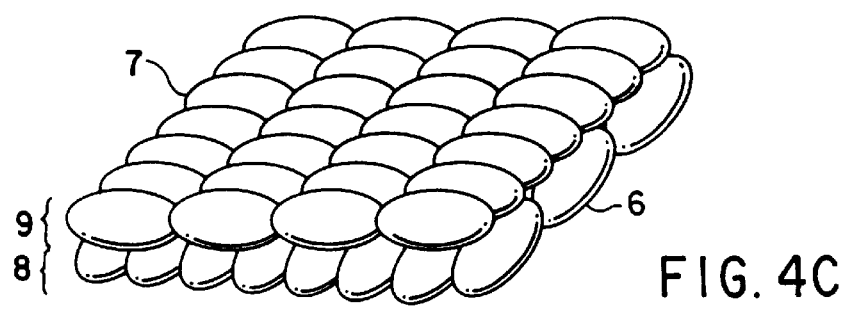

FIGS. 4A to 4C are perspective views schematically showing a method of manufacturing the liquid crystal display device according to the first embodiment of the present invention.

To manufacture the liquid crystal display device 1-1, first, as shown in FIG. 4A, spherical liquid crystal microcapsules 6 are aligned in lines on the surface of a substrate 2 having an electrode 4. At this time, the liquid crystal microcapsules 6 adjacent to each other in each line are placed in contact with each other. After a plurality of lines are formed at predetermined intervals, a pressure is applied to the liquid crystal microcapsules 6 aligned on the substrate 2 from a direction perpendicular to the substrate surface. The liquid crystal microcapsules 6 are drawn in a direction perpendicular to the lines, as shown in FIG. 4B. Consequently, the liquid crystal molecules 12 in each liquid crystal microcapsule 6 align themselves along the major axis of the liquid crystal microcapsule 6. With this process, a liquid crystal microcapsule layer 8 is formed.

By the same method as described above, liquid crystal microcapsules 6 are aligned on a transfer plate consisting of, e.g., Teflon, and a pressure is applied to align the liquid crystal microcapsules 6. A liquid crystal microcapsule layer 9 is formed and transferred from the transfer plate to the liquid crystal microcapsule layer 8. With this process, a liquid crystal layer 7 is formed as shown in FIG. 4C. This transfer is performed such that the major-axis direction of the liquid crystal microcapsules 6, i.e., the alignment direction of liquid crystal molecules 12 changes between the liquid crystal microcapsule layers 8 and 9, as shown in FIG. 4C.

When the substrate 3 having the electrode 5 is placed on the liquid crystal layer 7, a liquid crystal display device 1-1 can be obtained.

In the above-described manufacturing method, the liquid crystal microcapsules 6 are deformed using the intervals between adjacent liquid crystal microcapsules 6. However, the liquid crystal microcapsules 6 may be deformed using another method. For example, the liquid crystal microcapsules 6 are dispersed into a liquid such as water to prepare a liquid crystal microcapsule coating solution. Subsequently, the liquid crystal microcapsule coating solution is applied to the substrate 2 to form a coat, which is dried. After this, the dried coat is drawn in a predetermined direction parallel to the substrate surface. With this process, the liquid crystal microcapsules 6 are elongated, and the liquid crystal molecules 12 in the liquid crystal microcapsules 6 align in the elongating direction.

In the above method, the liquid crystal microcapsule coating solution can contain a thermoplastic resin capable of being drawn in the film formation process, such as polyvinyl alcohols, polyvinyl acetates, unvulcanized rubbers, and various types of oligomers. In this case, gaps between the adjacent liquid crystal microcapsules 6 are filled with a transparent resin in the liquid crystal microcapsule layers 8 and 9. This allows to prevent an increase in light scattering due to residual gaps and also more satisfactorily deform the liquid crystal microcapsules.

When the liquid crystal microcapsule coating solution contains a thermoplastic resin, the liquid crystal microcapsule layers 8 and 9 can be formed by the following method. First, spherical liquid crystal microcapsules and fine particles of a thermoplastic resin are dispersed into water, an organic solvent, or a solution mixture thereof to prepare a liquid crystal microcapsule coating solution. The composition of the liquid crystal microcapsule coating solution is appropriately changed in accordance with the coating apparatus to be used or the surface to which the liquid crystal microcapsule coating solution is to be applied.

As an organic solvent, ones that do not cause destruction of the liquid crystal microcapsules or elution of the liquid crystal material from the transparent film is selected. To realize sufficient display contrast, the amount of fine particles is controlled such that the ratio of the liquid crystal material to the sum volume of the liquid crystal microcapsules and the fine particles of the thermoplastic resin becomes 60 vol % or more.

Subsequently, the liquid crystal microcapsule coating solution is applied to a film or flat plate to form a coat. As this film or flat plate, a film or flat plate whose surface is applied with polyethylene, polypropylene, a fluoroplastic, a silicone-based mold release agent, or a fluorine-based mold release agent and imparted with hydrophilic nature, or a film or flat plate having mold release characteristics and hydrophilic nature is used. That is, the film or flat plate requires mold release characteristics and hydrophilic nature.

After the coat is dried, it is peeled from the film or flat plate and drawn or stretched in a specific direction. With this process, liquid crystal microcapsule layers 8 and 9 can be formed.

According to the above-described method, a pressure is applied to the liquid crystal microcapsules 6 in aligning the liquid crystal molecules 12. If an excessive pressure is applied to the liquid crystal microcapsules 6, the transparent films 11 may be destroyed. Especially, when the transparent films 11 are destroyed on the substrate 2, the display characteristics of the liquid crystal display device 1-1 may suffer.

To prevent such degradation in display characteristics of the liquid crystal display device 1-1, the liquid crystal molecules 12 may be aligned not by drawing but by sequentially drying the coat from the end portion. When the coat is uniformly dried, the contact area between the adjacent liquid crystal microcapsules 6 increases. For this reason, a large tensile force acts on the liquid crystal microcapsules 6 from a plurality of directions parallel to the substrate surface. Consequently, each liquid crystal microcapsule 6 normally obtains a hexagonal shape when viewed from the direction perpendicular to the substrate surface.

To the contrary, when the coat is dried with a temperature gradient, the above-described increase in contact area does not become uniform. When the coat is sequentially dried from one end to the other end, the tensile force acting on the liquid crystal microcapsules 6 is nonuniform. Hence, substantially all liquid crystal microcapsules 6 can be elongated in a direction perpendicular to the drying direction.

To further deform the liquid crystal microcapsules 6 elongated by the above method, a cloth, plate, or roll may be slid or rolled on the dried coat while applying a pressure of 2 kg/cm² or less. When the applied pressure is 2 kg/cm² or less, the liquid crystal microcapsules 6 are not damaged. The surface of the roll or the like is preferably treated with a fluoroplastic. In this case, the friction between the roll or the like and the coat is reduced to satisfactorily prevent damage to the liquid crystal microcapsules 6.

The above-described photosetting or thermosetting resin may be mixed with the liquid crystal microcapsule coating solution. More specifically, a coat is formed using a liquid crystal microcapsule coating solution mixed with a photosetting or thermosetting resin, and sequentially dried from one end to the other end. When the photosetting or -thermosetting resin shrinks upon hardening, the liquid crystal microcapsules 6 can be more largely deformed.

The coat can be dried using, e.g., a far-infrared heater capable of simultaneously heating band-shaped regions. More specifically, the substrate 2 and the far-infrared heater are translated relative to each other in a direction perpendicular to the longitudinal direction of the heated regions. With this operation, the coat can be sequentially dried from one end to the other end. Alternatively, by sending the substrate 2 having the coat to a tunnel-shaped drier such as a continuous furnace, the coat can be sequentially dried from one end to the other end.

When the coat is sequentially dried from an end portion to align the liquid crystal molecules 12, the liquid crystal layer 7 shown in FIG. 1 can be easily formed. For example, when the liquid crystal microcapsule layer 8 is formed on the substrate 2 by the above-described method, and then, the liquid crystal microcapsule layer 9 is sequentially formed by the above-described method, the liquid crystal layer 7 can be obtained.

According to the above-described method, the liquid crystal microcapsule layers 8 and 9 can also be formed by the following method. First, a liquid crystal microcapsule coating solution containing a thermosetting or photosetting resin is applied to a substrate 2 to form a thicker coat. The coat is sequentially dried from an end portion to dry only the surface region of the coat formed on the substrate 2. This dried surface region forms a liquid crystal microcapsule layer 9. Subsequently, the undried region of the coat between the liquid crystal microcapsule layer 9 and the substrate 2 is sequentially dried from an end portion to form a liquid crystal microcapsule layer 8. When the drying directions are perpendicular to each other, liquid crystal molecules 12 can be aligned perpendicular between the liquid crystal microcapsule layer 8 and the liquid crystal microcapsule layer 9.

When the alignment direction is to be controlled by sequentially drying the coat from an end portion, the surface of the substrate 2 may be rubbed. When the rubbing direction is perpendicular to the drying direction, the liquid crystal microcapsules 6 can be more easily deformed. Instead of rubbing the substrate 2, a thin film of a transparent resin may be formed on the substrate 2, and the surface of the thin film may be rubbed. In this case as well, the same effect as described above can be obtained.

When the alignment direction is to be controlled by sequentially drying the coat from an end portion, band-shaped projecting portions may be formed on the surface of the substrate 2. By forming the band-shaped projecting portions such that their longitudinal direction is perpendicular to that of the liquid crystal microcapsules 6, the liquid crystal microcapsules 6 can be more easily deformed. Columnar bodies may be formed in place of the band-shaped projecting portions. When columnar bodies are appropriately located on the substrate 2, the same effect as described above can be obtained. The band-shaped projecting portions or columnar bodies can be formed from either a conductive material or an insulating material. When the band-shaped projecting portions or columnar bodies consist of a conductive material, these elements can be partly used as interconnections.

Formation of the liquid crystal microcapsule layers 8 and 9 using spherical liquid crystal microcapsules has been described above. Aspherical liquid crystal microcapsules can also be used. When the liquid crystal microcapsules 6 are deformed into an aspherical shape in advance, degradation in display characteristics of the liquid crystal display device 1-1 due to damage to the liquid crystal microcapsules 6 can be prevented. The aspherical liquid crystal microcapsule 6 can be obtained by placing a spherical liquid crystal microcapsule in a mold and applying one or both of a pressure and heat to the liquid crystal microcapsule.

When the liquid crystal microcapsules 6 are formed into an aspherical shape in advance, as described above, the liquid crystal microcapsules 6 must be aligned on the substrate 2 such that the alignment directions of the liquid crystal molecules 12 in the liquid crystal microcapsules 6 match. This can be achieved by the following method.

Figure 5:
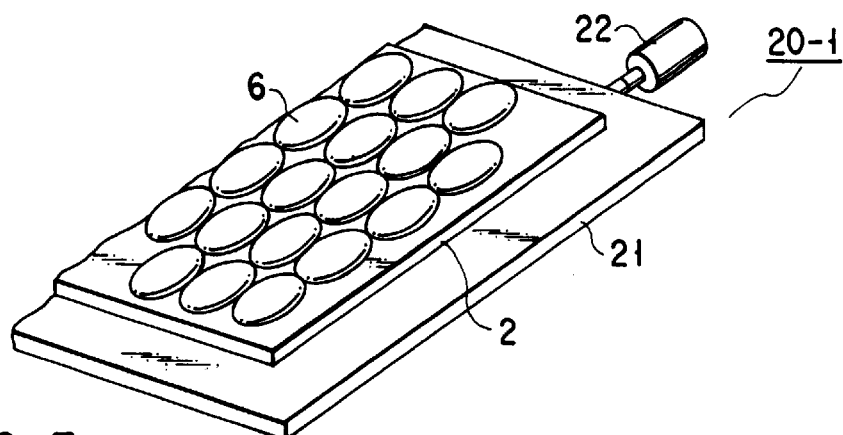
FIG. 5 is a perspective view schematically showing an example of a liquid crystal microcapsule aligning apparatus used to manufacture the liquid crystal display device according to the first embodiment of the present invention.

FIG. 5 is a schematic perspective view of a liquid crystal microcapsule aligning apparatus used to manufacture the liquid crystal display device according to the first embodiment of the present invention. Referring to FIG. 5, a liquid crystal microcapsule aligning apparatus 20-1 comprises a substrate support base 21 for supporting a substrate 2, and a solenoid vibrator 22 attached to the substrate support base 21.

To align liquid crystal microcapsules 6 on the substrate 2 using the liquid crystal microcapsule aligning apparatus 20-1, the substrate 2 is mounted on the substrate support base 21 first. Subsequently, liquid crystal microcapsules 6 are placed on the substrate 2. At this time, the liquid crystal microcapsules 6 need not always be regularly placed. The solenoid vibrator 22 is driven. The substrate 2 then vibrates in one direction to align the liquid crystal microcapsules 6 such that their major axes lie parallel to the direction of vibration.

The frequency used in this alignment processing is preferably 10 to 100 Hz and, more preferably, 30 to 70 Hz. If the frequency is lower than 10 Hz, the liquid crystal microcapsules 6 cannot be aligned. If the frequency exceeds 100 Hz, the liquid crystal microcapsules 6 may be destroyed.

When the substrate 2 is tilted with respect to the horizon in alignment processing, the liquid crystal microcapsules 6 can be accurately aligned. The angle the substrate 2 makes with the horizon is preferably 1° to 10°. If the angle is smaller than 1°, the effect of tilting the substrate 2 cannot be obtained. If the angle is larger than 10°, the alignment of the liquid crystal microcapsules 6 may be disturbed.

In the above-described method, the liquid crystal microcapsules 6 are irregularly placed on the substrate 2 and aligned. However, the liquid crystal microcapsules 6 may be aligned after they are regularly arranged on the substrate 2.

Figure 6:
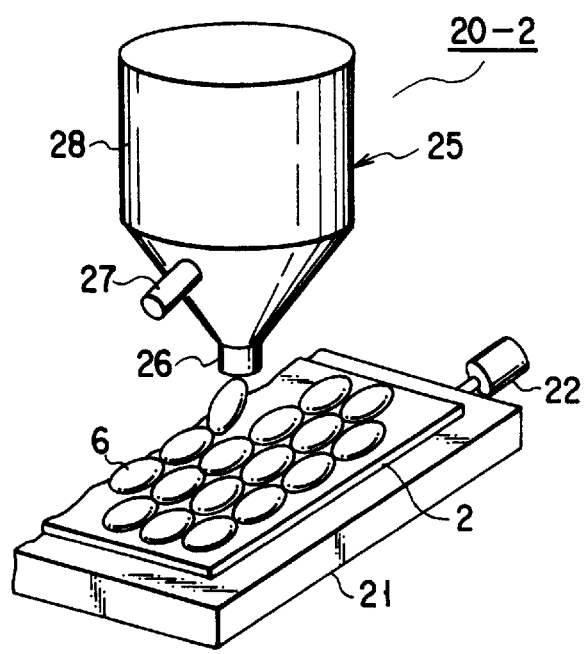
FIG. 6 is a perspective view schematically showing another example of the liquid crystal microcapsule aligning apparatus used to manufacture the liquid crystal display device according to the first embodiment of the present invention.

FIG. 6 is a schematic perspective view showing a liquid crystal microcapsule aligning apparatus used to manufacture the liquid crystal display device according to the first embodiment of the present invention. Referring to FIG. 6, a liquid crystal microcapsule aligning apparatus 20-2 comprises a substrate support base 21 for supporting a substrate 2, and a hopper 25 for feeding liquid crystal microcapsules 6 on the substrate 2. The hopper 25 has a nozzle 26 for discharging the liquid crystal microcapsules 6, a solenoid vibrator 27 for vibrating the nozzle 26, and a container 28 for storing the liquid crystal microcapsules 6 and supplying the liquid crystal microcapsules 6 to the nozzle 26. The solenoid vibrator 22 is attached to the substrate support base 21. The substrate support base 21 and the hopper 25 can be translated relative to each other.

To align the liquid crystal microcapsules 6 on the substrate 2 using the liquid crystal microcapsule aligning apparatus 20-2, the substrate 2 is mounted on the substrate support base 21 first. The solenoid vibrator 27 is driven to discharge the liquid crystal microcapsules 6 stored in the container 28 from the nozzle 26 onto the substrate 2. Simultaneously, the hopper 25 is translated relative to the substrate support base 21. With this operation, the liquid crystal microcapsules 6 can be almost regularly aligned on the substrate 2.

Subsequently, by the same method as described with reference to FIG. 5, i.e., by driving the solenoid vibrator 22, the liquid crystal microcapsules 6 are further regularly aligned, as needed.

In the method using the hopper 25, the width of the opening portion of the distal end of the nozzle 26 is preferably 1.2 to 1.5 times the maximum value of the diameter perpendicular to the major axis of the liquid crystal microcapsule 6. The length of the distal end of the nozzle 26 is preferably 2 or 3 times the length of the major axis of the liquid crystal microcapsule 6. When the size of the opening portion and the length of the distal end of the nozzle 26 are set within the above ranges, the discharge amount of the liquid crystal microcapsules 6 from the nozzle 26 can be easily controlled.

The substrate support base 21 is preferably vibrated by the solenoid vibrator 22 in the major-axis direction of the liquid crystal microcapsules 6. The frequency preferably falls within the range of 10 to 100 Hz. If the frequency is lower than 10 Hz, the effect of vibration cannot be obtained. If the frequency exceeds 100 Hz, the liquid crystal microcapsules 6 may be destroyed.

As has been described above with reference to FIG. 5, when the substrate 2 is tilted with respect to the horizon, the liquid crystal microcapsules 6 can be densely aligned. The angle the substrate 2 makes with the horizon is preferably 1° to 10°. If the angle is smaller than 1, the effect of tilting the substrate 2 cannot be obtained. If the angle is larger than 10°, the alignment of the liquid crystal microcapsules 6 may be perturbed.

Alignment of the spheroidal liquid crystal microcapsules 6 on the substrate 2 has been described above. By the same method, columnar liquid crystal microcapsules 6 can be aligned on the substrate 2.

Figure 7:
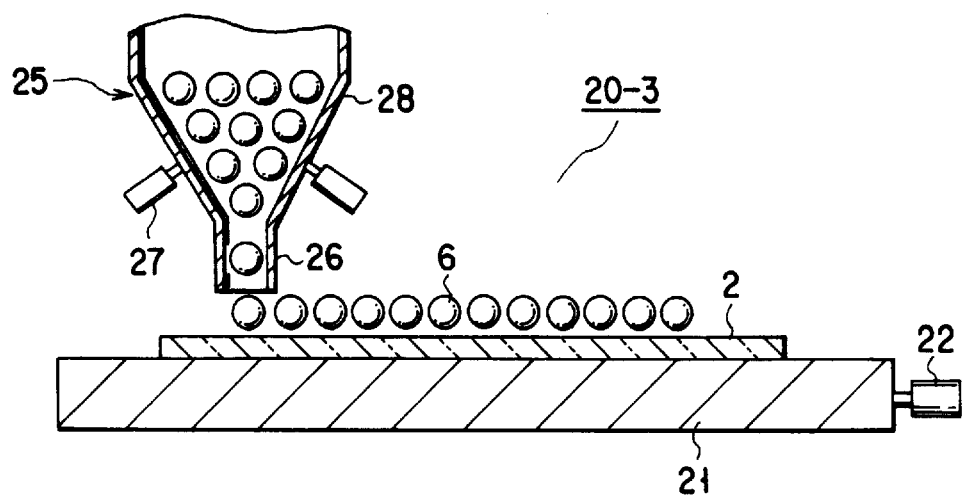
FIG. 7 is a perspective view schematically showing still another example of the liquid crystal microcapsule aligning apparatus used to manufacture the liquid crystal display device according to the first embodiment of the present invention.

FIG. 7 is a schematic sectional view of a liquid crystal microcapsule aligning apparatus used to manufacture the liquid crystal display device according to the first embodiment. A liquid crystal microcapsule aligning apparatus 20-3 shown in FIG. 7 has the same arrangement as that of the liquid crystal display device 20-2 shown in FIG. 6 except the nozzle shape. To align the liquid crystal microcapsules 6 by the liquid crystal microcapsule aligning apparatus 20-3, the same method as described in association with the liquid crystal microcapsule aligning apparatus 20-2 shown in FIG. 6 can be used except that the hopper 25 and the substrate support base 21 are translated relative to each other in a direction perpendicular to the major-axis direction of the liquid crystal microcapsules.

In the liquid crystal microcapsule aligning apparatus 20-3 shown in FIG. 7, the width of the slit-like opening portion of the nozzle 26 is preferably 1.2 to 1.5 times the diameter of the columnar liquid crystal microcapsule 6. The length of the distal end of the nozzle 26 is preferably 2 to 3 times the length of the major axis of the liquid crystal microcapsule 6. When the width of the opening portion and the length of the distal end of the nozzle 26 are set within the above ranges, the discharge amount of the liquid crystal microcapsules 6 from the nozzle 26 can be easily controlled.

The substrate support base 21 is preferably vibrated by the solenoid vibrator 22 in the direction perpendicular to the major axis of the liquid crystal microcapsule 6. The frequency preferably falls within the range of 10 to 100 Hz. If the frequency is lower than 10 Hz, the effect of vibration cannot be obtained. If the frequency exceeds 100 Hz, the liquid crystal microcapsules 6 may be destroyed.

As has been described above with reference to FIG. 5, when the substrate 2 is tilted with respect to the horizon, the liquid crystal microcapsules 6 can be densely aligned. The angle the substrate 2 makes with the horizon is preferably 1° to 10°. If the angle is smaller than 1°, the effect of tilting the substrate 2 cannot be obtained. If the angle is larger than 10°, the alignment of the liquid crystal microcapsules 6 may be perturbed.

The liquid crystal microcapsules 6 can be more accurately aligned by forming recessed portions in the surface of the substrate 2.

Figure 8:
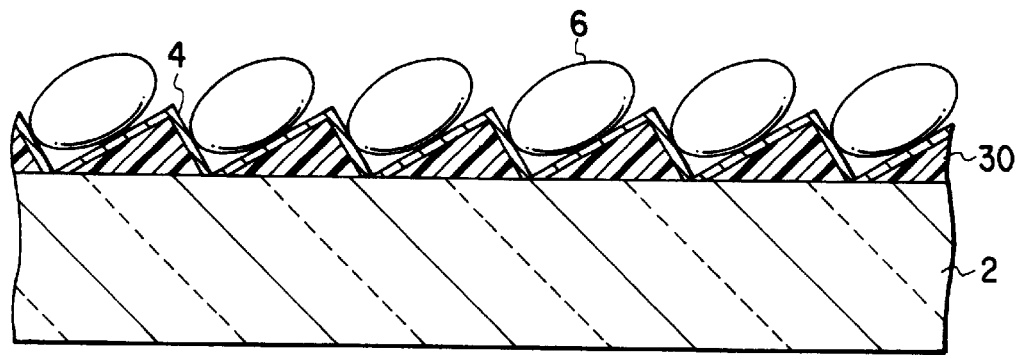
FIG. 8 is a sectional view schematically showing an example of a substrate used for the liquid crystal display device according to the first embodiment of the present invention.
Figure 9A:
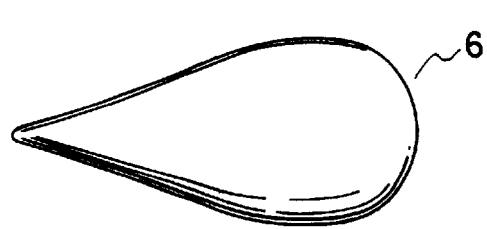
FIGS. 9A to 9E are perspective views schematically showing other examples of the liquid crystal microcapsule used in the liquid crystal display device according to the first embodiment of the present invention.
Figure 9B:
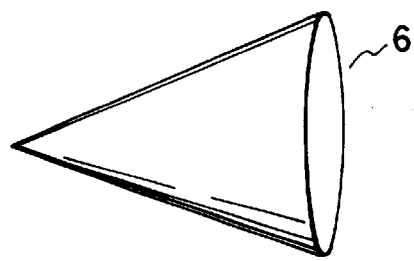
Figure 9C:
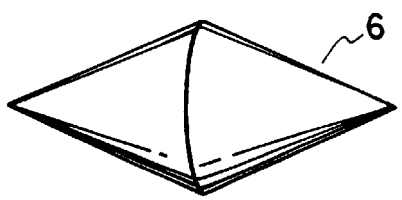
Figure 9D:
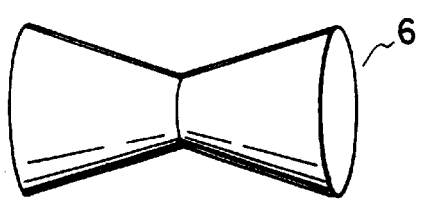
Figure 9E:
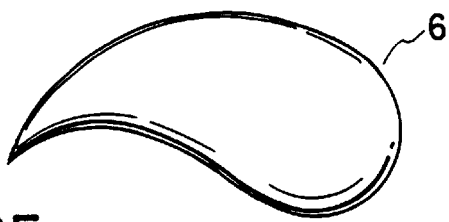

FIG. 8 is a sectional view of a substrate used for the liquid crystal display device according to the first embodiment of the present invention. Referring 5 to FIG. 8, groove-shaped recessed portions are formed on the surface of a substrate 2 by projecting portions 30 consisting of a resin. The projecting portions 30 forming the recessed portions can be formed by forming a resin film having a uniform thickness on the surface of the substrate 2 and embossing it. An electrode 4 is formed on the surface of the projecting portions 30.

When the groove-shaped recessed portions are formed on the surface of the substrate 2, liquid crystal microcapsules 6 are stable in the grooves. The alignment direction of the major axes of the liquid crystal microcapsules 6 can be controlled by the vibration direction of the substrate 2. More specifically, by appropriately selecting the vibration direction of the substrate 2, the liquid crystal microcapsules 6 can be aligned such that the major axes are either perpendicular or parallel to the grooves. Hence, when the groove-shaped recessed portions are formed on the surface of the substrate 2, and the method described with reference to FIGS. 5 and 6 is applied, the liquid crystal microcapsules 6 can be more accurately aligned.

The recessed portions to be formed on the surface of the substrate 2 need not always have a groove shape. For example, recessed portions having a well shape conforming to the liquid crystal microcapsule 6 may be formed on the surface of the substrate 2. In this case, the liquid crystal microcapsules 6 can be aligned in desired alignment by forming recessed portions complementary to the liquid crystal microcapsules 6.

When a liquid crystal microcapsule layer 8 is formed on the recessed portions on the substrate 2, a regular three-dimensional pattern is formed on the surface of the liquid crystal microcapsule layer 8. Using this three-dimensional pattern, the liquid crystal microcapsules 6 with desired alignment can be stacked on the liquid crystal microcapsule layer 8. That is, after the liquid crystal microcapsule layer 8 is formed on the substrate 2, a liquid crystal microcapsule layer 9 can be stacked by the same method as that used to form the liquid crystal microcapsule layer 8. The alignment direction of the liquid crystal microcapsules 6 in the liquid crystal microcapsule layer 9 can be controlled by the vibration direction or the like.

When well-shaped recessed portions are formed on the surface of the substrate 2, and the liquid crystal microcapsules 6 are tapered in the major-axis direction, the orientational order of the liquid crystal microcapsules 6 in the liquid crystal microcapsule layer 9 can be improved.

FIGS. 9A to 9E are perspective views schematically showing examples of the liquid crystal microcapsule used for the liquid crystal display device according to the first embodiment of the present invention. All the liquid crystal microcapsules 6 shown in FIGS. 9A to 9E have shapes at least partially tapered in the major-axis direction. By using these liquid crystal microcapsules 6, the liquid crystal material 10 in the liquid crystal microcapsule layer 8 can be easily aligned in a direction perpendicular to the liquid crystal material 10 in the liquid crystal microcapsule layer 9. This will be described below in detail while exemplifying the liquid crystal microcapsule 6 shown in FIG. 9B.

Figure 10A:
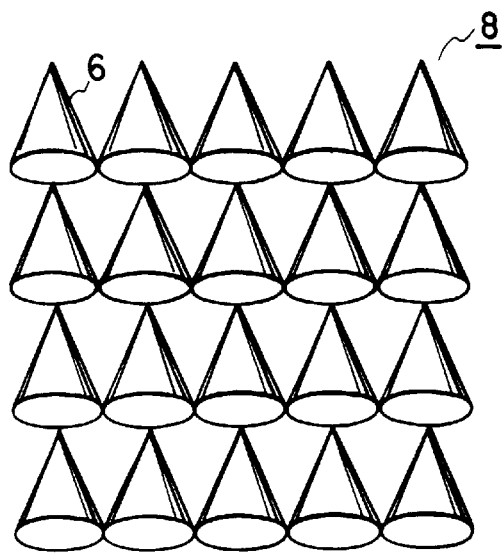
FIGS. 10A to 10C are plan views schematically showing alignment examples of the liquid crystal microcapsules in the liquid crystal display device according to the first embodiment of the present invention.
Figure 10B:
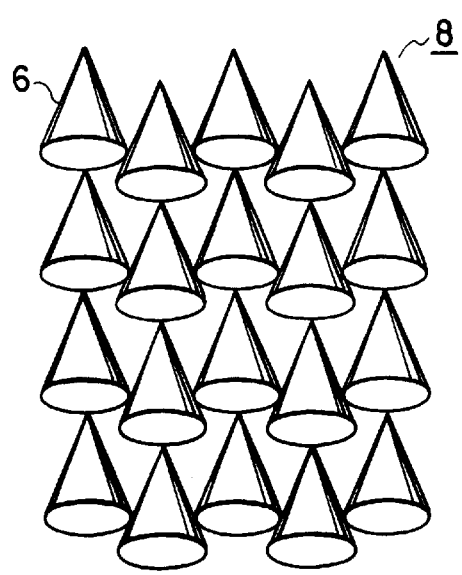
Figure 10C:
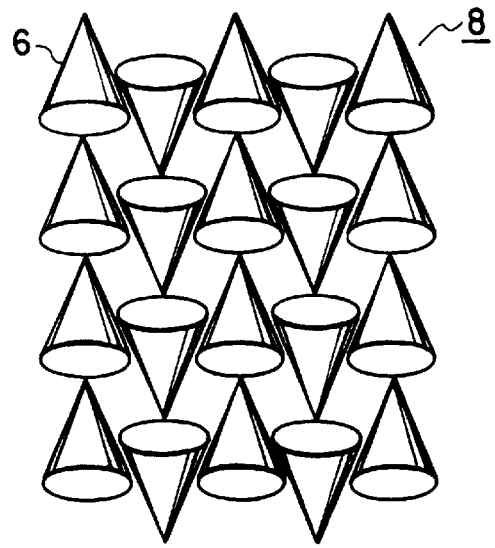

FIGS. 10A to 10C schematically show alignment examples of the liquid crystal microcapsules 6 on the substrate 2 in the first embodiment of the present invention. The substrate 2 and the like are not illustrated in these figures. The liquid crystal microcapsules 6 shown in FIGS. 10A to 10C are aligned on the substrate 2 to form the liquid crystal microcapsule layer 8. The alignment direction and positions of the liquid crystal microcapsules 6 are accurately controlled by forming recessed portions having a predetermined shape on the surface of the substrate 2.

Referring to FIG. 10A, conical liquid crystal microcapsules 6 are regularly aligned such that the vertices point in one direction and the barycenters form a matrix. Referring to FIG. 10B, conical liquid crystal microcapsules 6 are aligned such that the vertexes point in one direction, as in FIG. 10A. In FIG. 10B, however, the positions of the liquid crystal microcapsules 6 adjacent in a direction perpendicular to the major-axis direction are shifted by about ½period in the major-axis direction. The alignment shown in FIG. 10C corresponds to an alignment obtained by alternately inverting the vertexes of the liquid crystal microcapsules 6 in FIG. 10B in the direction perpendicular to the major-axis direction.

When the first liquid crystal microcapsule layer 8 is formed by aligning the liquid crystal microcapsules 6 as shown in FIGS. 10A to 10C, recessed portions are regularly formed between the liquid crystal microcapsules 6. The second liquid crystal microcapsule layer 9 can be formed using these recessed portions.

For example, the first liquid crystal microcapsule layer 8 with the alignment shown in FIG. 10A has recessed portions complementary to the conical liquid crystal microcapsules 6. When the liquid crystal microcapsules 6 with the same shape as that of the liquid crystal microcapsules in the first liquid crystal microcapsule layer 8 are stacked, the liquid crystal microcapsules 6 are aligned only with their vertices directed in the opposite directions between S the first and second liquid crystal microcapsule layers 8 and 9. That is, the liquid crystal microcapsules 6 cannot be aligned with their major axes perpendicular to each other.

In this case, the liquid crystal microcapsules 6 having a longer major axis than that of the liquid crystal microcapsules 6 in the first liquid crystal microcapsule layer 8 are stacked on the first liquid crystal microcapsule layer 8 with the alignment shown in FIG. 10 A. With this arrangement, the liquid crystal layer 7 can be formed without matching the major-axis directions of the liquid crystal microcapsules 6 in the first and second liquid crystal microcapsule layers 8 and 9. That is, the liquid crystal material 10 in the first liquid crystal microcapsule layer 8 can be aligned to be perpendicular to that of the second liquid crystal microcapsule layer 9.

On the other hand, no recessed portions complementary to the conical liquid crystal microcapsules 6 are formed on the surface of the first liquid crystal microcapsule layer 8 with the alignment shown in FIG. 10B or 10C. Hence, even when the same conical liquid crystal microcapsules 6 as those in the first liquid crystal microcapsule layer 8 are used, the liquid crystal layer 7 can be formed without matching the major-axis directions of the liquid crystal microcapsules 6 in the first and second liquid crystal microcapsule layers 8 and 9.

Formation of the liquid crystal microcapsule layer 9 using the three-dimensional pattern on the surface of the liquid crystal microcapsule layer 8 has been described above. In this case, the surface shape of the first liquid crystal microcapsule layer 8 largely influences the accuracy of alignment of the liquid crystal microcapsules 6 in the second liquid crystal microcapsule layer 9. According to the finding of the present inventors, the second liquid crystal microcapsule layer 9 can be accurately formed when the surface of the first liquid crystal microcapsule layer 8 satisfies:

$$H_x^2/L_x^3 < H_y^2/L_y^3$$

where $H_x$, $L_x$, $H_y$, and $L_y$ are values obtained by the following method. More specifically, $L_x$ is a period obtained by approximating, by a sine curve, the shape of a groove observed when the liquid crystal microcapsule layer 8 is viewed from a direction parallel to the major axis of the liquid crystal microcapsule 6, and $H_x$ is the level difference obtained at this time. $L_y$ is a period obtained by approximating, by a sine curve, the shape of a groove observed when the liquid crystal microcapsule layer 8 is viewed from a direction perpendicular to the major axis and parallel to the minor axis of the liquid crystal microcapsules 6, and $H_y$ is the level difference obtained at this time.

When the surface shape of the liquid crystal microcapsule layer 8 satisfies the above inequality, the liquid crystal microcapsules 6 in the liquid crystal microcapsule layer 9 are most stable when their major axes are perpendicular to the major axes of the liquid crystal microcapsules 6 in the liquid crystal microcapsule layer 8. Hence, the liquid crystal molecules in the liquid crystal microcapsule layer 8 can be more accurately aligned to be perpendicular to those in the liquid crystal microcapsule layer 9.

By using the inequality above, the relationship between the ratio of the length of the major axis of the liquid crystal microcapsule 6 to the maximum value of the diameter perpendicular to the major axis and the angle of the major axis with respect to the substrate surface can be obtained. A case in which columnar liquid crystal microcapsules 6 are aligned on a substrate having groove-shaped recessed portions shown in FIG. 8 will be described. Let a be the length of the minor axis of the liquid crystal microcapsule 6, r be the ratio of the length of the major axis to the minor axis length $\underline{a}$, and θ be the angle of the major axis of the columnar liquid crystal microcapsule 6 with respect to the substrate surface. Then, the ratio of $H_x$, $L_x$, $H_y$, and $L_y$ to the minor axis length $\underline{a}$ can be approximately given by:

$H_x/a = 1 - 3^{1/2}/2$ $L_x/a = 1$ $H_y/a = r \times \sin\theta + \frac{1}{2} - \sin(45° + \theta)/\sin(45° - \theta/2)$ $L_y/a = r \times \cos\theta$ When these values are substituted into the above inequality, optimum $\underline{r}$ and θ can be obtained.

A case in which the liquid crystal microcapsule layer 8 has the structure shown in FIG. 10A, and the liquid crystal microcapsule layer 9 is formed using the columnar liquid crystal microcapsules 6 will be described. Assume that each liquid crystal microcapsule 6 shown in FIG. 10A has a major axis parallel to the substrate surface and its half portion buried in the substrate 2.

Let $a_1$ be the maximum value of the diameter perpendicular to the major axis of the liquid crystal microcapsule 6 shown in FIG. 10A, $b_1$ be the length of the liquid crystal microcapsules 6 in the major-axis direction, and $b_2$ be the longitudinal-direction length of the columnar liquid crystal microcapsule 6 in the liquid crystal microcapsule layer 9. Then, if $r_1 = b_1/a_1$, $r = b_2/a_1$, and the maximum value of the angle formed by the vertex and side surface portion of the conical liquid crystal microcapsule 6 is represented by θ, the ratio of $H_x$, $L_x$, $H_y$, and $L_y$ to $a_1$ can be approximately given by:

$H_x/a_1 = (1+r_2)/2 - [(1+r_2) \times (1+r_2) - 1]^{1/2}/2$ $L_x/a_1 = 1$ $H_y/a_1 = \frac{1}{2} + r_2 \times [1 - \arcsin(45° - \theta/2) \times \sin(45° + \theta/2)]/2$ $L_y/a_1 = r_1$ where $\theta = \arctan(2 \times r_1)$. When these values are substituted into the inequality, optimum $r_1$ and $r_2$ can be obtained.

As described above, in the first embodiment, the liquid crystal microcapsule layers 8 and 9 can be formed on the substrate 2 by transfer. This transfer can be accurately and easily performed using the following method.

Figure 11:
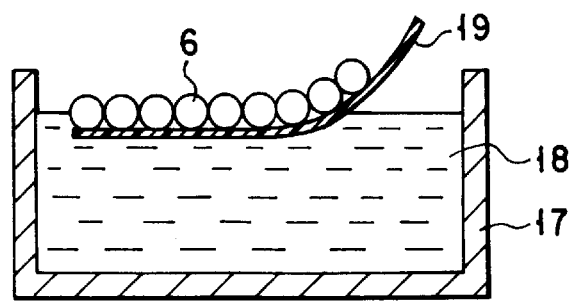
FIG. 11 is a sectional view schematically showing another example of a process of manufacturing the liquid crystal display device according to the first embodiment of the present invention.

FIG. 11 schematically shows a method of manufacturing the liquid crystal display device according to the first embodiment of the present invention. FIG. 11 is a sectional view.

To form the liquid crystal microcapsule layers 8 and 9, liquid crystal microcapsules 6 are put into a predetermined solution 18 stored in a container 17. As the solution 18, a solution capable of floating the liquid crystal microcapsules 6 is used. A single-layered film of liquid crystal microcapsules 6 is formed on the surface of the solution 18, and then, the single-layered film of liquid crystal microcapsules 6 is dipped up by a porous film 19, as shown in FIG. 11. With this process, a single-layered film of regularly aligned liquid crystal microcapsules 6 can be obtained.

As another method, vacuum suction may be used. A liquid crystal microcapsule coating solution prepared by dispersing the liquid crystal microcapsules 6 into a predetermined solution is applied to a plate with holes smaller than the liquid crystal microcapsules 6. By vacuum-suction through the holes of the plate, the liquid crystal microcapsule coating solution is removed from the plate surface, and simultaneously, the liquid crystal microcapsules 6 are fixed at the positions of the holes. With this process, a single-layered film of regularly aligned liquid crystal microcapsules 6 can be obtained.

In this case, when the holes are formed at appropriate positions in the plate, the alignment of liquid crystal microcapsules can be controlled.

In addition, when recessed portions conforming to the liquid crystal microcapsules 6 are formed on the surface of the plate, and holes to be used for vacuum suction are formed in correspondence with the recessed portions, the alignment direction of the liquid crystal microcapsules can be more accurately controlled.

As still another method, dried liquid crystal microcapsules 6 may be used. The liquid crystal microcapsules 6 are subjected to a surface treatment so as not to coagulate, and are dried. Subsequently, the dried liquid crystal microcapsules 6 are dispersed on a substrate having regularly formed recessed portions. At this time, vibration may be applied. With this process, a single-layered film of regularly aligned liquid crystal microcapsules 6 can be obtained.

In the above-described methods, spherical liquid crystal microcapsules 6 can be regularly aligned and then deformed by drawing or the like. If liquid crystal microcapsules 6 formed into an aspherical shape in advance are to be used, recessed portions having a shape complementary to the liquid crystal microcapsules 6 are formed on the substrate, thereby regularly aligning the liquid crystal microcapsules 6 with their major axes directed in one direction.

To regularly align the liquid crystal microcapsules 6 formed into an aspherical shape in advance, the liquid crystal microcapsules 6 are aligned in one direction by using a squeegee or the like or applying a sound pressure such as an ultrasonic wave, or aligned downward using the gravitational effect.

Alternatively, a plurality of liquid crystal microcapsules 6 are aligned such that the major-axis direction is perpendicular to the substrate surface, and then tilted to one side by a squeegee or the like. With this method as well, the liquid crystal microcapsules 6 can be regularly aligned such that the major axes point in one direction. In this case, when a plurality of holes with a diameter smaller than the length of the major axis of the liquid crystal microcapsule 6 are formed in the surface of the substrate 2 in a matrix shape by a laser process or the like, the microcapsules 6 can be aligned such that the major-axis direction is perpendicular to the substrate surface.

In the first embodiment, the liquid crystal display device 1-1 is manufactured by the particle-like liquid crystal microcapsules 6. However, even when fibrous liquid crystal microcapsules 6 are used, a liquid crystal display device capable of display at high display contrast can be obtained. The second embodiment using fibrous liquid crystal microcapsules will be described below.

Figure 12:
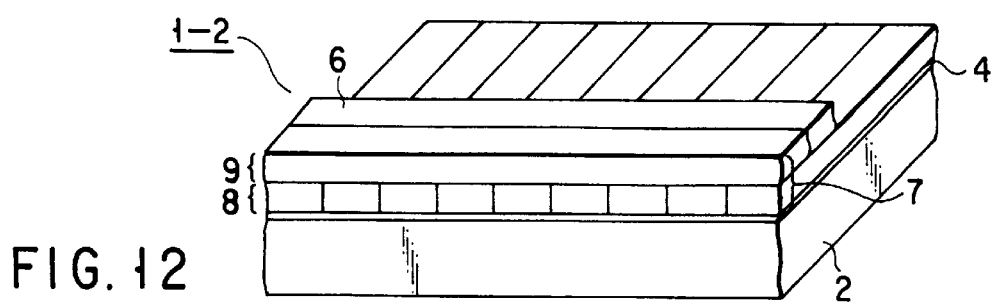
FIG. 12 is a perspective view schematically showing a liquid crystal display device according to the second embodiment of the present invention.

FIG. 12 is a schematic perspective view of a liquid crystal display device according to the second embodiment of the present invention. Referring to FIG. 12, a liquid crystal display device 1-2 comprises a substrate 2 having an electrode 4 formed on one major surface, a liquid crystal layer 7 formed on the substrate 2, and an electrode (not shown) formed on the liquid crystal layer 7. The liquid crystal layer 7 has a liquid crystal microcapsule layer 8 formed by aligning liquid crystal microcapsules 6 with their major axes parallel to each other, and a liquid crystal microcapsule layer 9 formed by aligning the liquid crystal microcapsules 6 with their major axes parallel to each other. The major-axis direction of the liquid crystal microcapsules 6 in the liquid crystal microcapsule layer 8 is different from that in the liquid crystal microcapsule layer 9.

Figure 13:
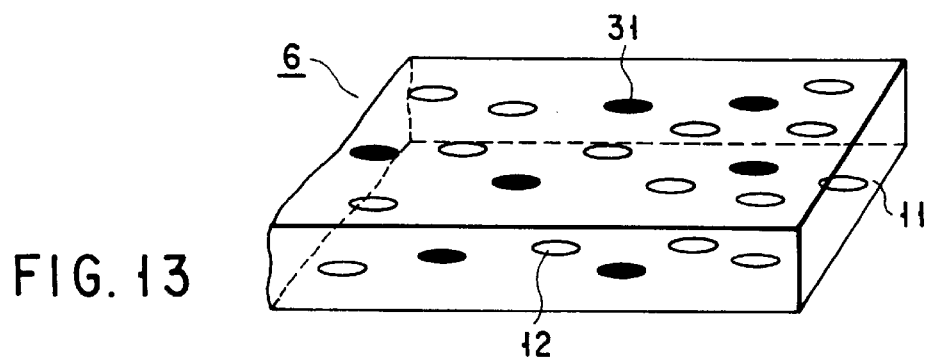
FIG. 13 is a perspective view schematically showing a liquid crystal microcapsule used in the liquid crystal display device according to the second embodiment of the present invention.

FIG. 13 is a schematic perspective view of the liquid crystal microcapsule 6 used for the liquid crystal display device 1-2. Referring to FIG. 13, the fibrous liquid crystal microcapsule 6 has a transparent film 11, and liquid crystal molecules 12 and dichroic dye molecules 31 encapsulated by the transparent film 11. A fibrous liquid crystal microcapsule means a liquid crystal microcapsule having almost a constant diameter at any positions in the major-axis direction and a length in the major-axis direction 100 times the diameter. The section of the fibrous liquid crystal microcapsule 6 taken along a direction perpendicular to the major-axis direction can have any one of a circular shape, elliptical shape, and rectangular shape.

As described in the first embodiment, when the liquid crystal microcapsule is formed into an aspherical shape, the alignment directions of the liquid crystal molecules 12 can be uniformed in a direction parallel to the major axis of the liquid crystal microcapsule. In the fibrous liquid crystal microcapsule 6 shown in FIG. 13, since the ratio of the length in the major-axis direction to the width in the minor-axis direction is excessively high, most liquid crystal molecules 12 align themselves parallel to the major-axis direction. Hence, when the fibrous liquid crystal microcapsules 6 are used, light absorbance in the absence of applied voltage can be increased, so a liquid crystal display device capable of display at high display contrast can be obtained.

In the liquid crystal display device 1-2 shown in FIG. 12, the liquid crystal layer 7 has a multilayered structure of the liquid crystal microcapsule layers 8 and 9. The major-axis direction of the liquid crystal microcapsules 6 in the liquid crystal microcapsule layer 8 is different from that in the liquid crystal microcapsule layer 9. Hence, the liquid crystal display device 1-2 can display at higher display contrast.

The section of the fibrous liquid crystal microcapsule 6 preferably has an elliptical shape having major and minor axes or a rectangular shape having long and short sides. When the liquid crystal microcapsules 6 having such a section are aligned such that the major-axis direction of the section is parallel to the substrate surface, display at higher display contrast is allowed.

The fibrous liquid crystal microcapsule 6 preferably contains 75 vol % or more of a liquid crystal material. Preferably, the length of the minor axis or short side of the section of the liquid crystal microcapsule 6 is 2 to 30 $\mu$m, and the length of the major axis or long side of the section is 2 $\mu$m or more. When the liquid crystal microcapsule 6 has this structure, the interface area is reduced relative to the volume of the liquid crystal material, so light scattering and the driving voltage can be decreased.

The above-described fibrous liquid crystal microcapsule 6 can be formed by preparing a tube of a polymer fiber and injecting a liquid crystal material into the hollow portion.

The above-described fibrous liquid crystal microcapsules 6 can also be formed by continuously extruding a solution mixture of a liquid crystal compound, a dichroic dye, a polymer precursor, and a radical generator into a coagulating bath of a liquid or gas through nozzles or a porous film. According to this method, the fibrous liquid crystal microcapsules 6 can be continuously manufactured at high reproducibility. In this case, to form continuous fibrous liquid crystal microcapsules 6, the transparent film 11 must be formed immediately after the mixture is discharged from the nozzle. To prompt polymerization of the polymer precursor, the coagulating bath of a liquid or gas preferably has a temperature of 60° C. or more.

As the liquid for the coagulating bath, water or the like can be used. As the gas, an inert gas such as nitrogen or argon can be used.

The surface tension of the solution mixture to the porous film is preferably 100 dyn·cm$^{-1}$ or less. When the surface tension falls within the above range, the mixture extruded from the holes of the porous film is supplied into the coagulating bath without sticking to the surface of the porous film. This will be described with reference to FIGS. 14A and 14B.

Figure 14A:
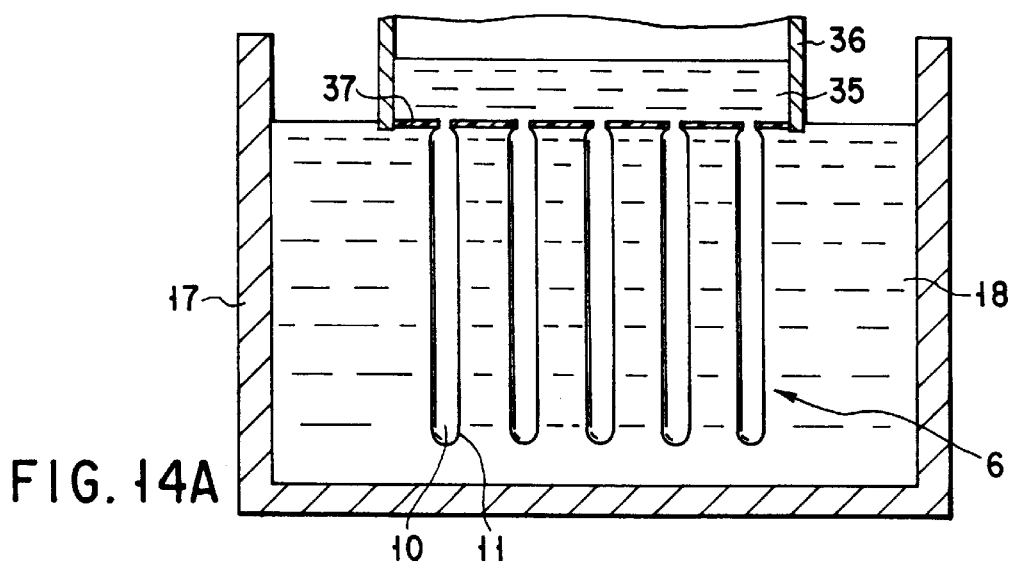
FIG. 14A is a sectional view schematically showing a process of manufacturing the liquid crystal microcapsules used in the liquid crystal display device according to the second embodiment of the present invention.
Figure 14B:
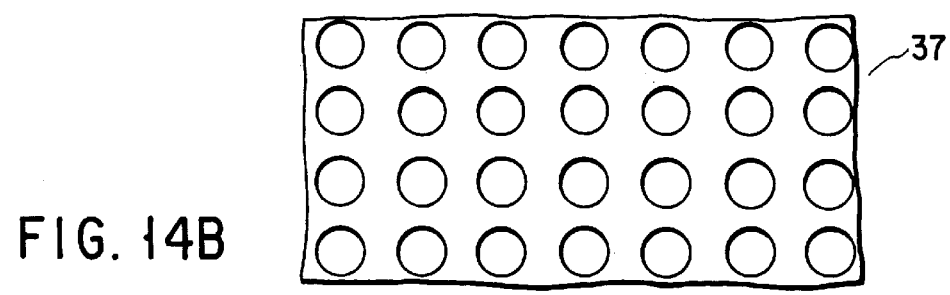
FIG. 14B is a plan view schematically showing a porous film used in the liquid crystal microcapsule manufacturing process shown in FIG. 14A.

FIG. 14A is a sectional view schematically showing a method of manufacturing the liquid crystal microcapsules according to the second embodiment. FIG. 14B is a plan view of a porous film used for manufacturing.

To form the fibrous liquid crystal microcapsules 6, a solution mixture 35 stored in a container 36 is extruded into hot water 18 stored in a container 17 through holes formed in a porous film 37 as shown in FIG. 14A. Holes in equal size are formed in the porous film 37, as shown in FIG. 14B. The flow of the solution mixture 35 extruded into the hot water 18 forms a transparent film on its surface. That is, fibrous liquid crystal microcapsules 6 each having the liquid crystal material 10 encapsulated by the transparent film 11 are formed.

However, since the solution mixture 35 immediately after extrusion from the porous film 37 has no transparent film, it may therefore stick to the contact surface between the porous film 37 and the hot water 18. In this case, the transparent film is formed on the surface of the porous film 37, and liquid crystal microcapsules 6 having a desired shape and desired composition may not be formed.

When the surface tension of the solution mixture 35 to the porous film 37 is set within the above range, the solution mixture 35 can be prevented from sticking to the contact surface between the porous film 37 and the hot water 18. Hence, liquid crystal microcapsules 6 having a desired shape and desired composition can be formed.

A flow of liquid or gas may be formed in the coagulating bath. For example, when a flow of liquid or gas parallel to the surface of the porous film is formed near the porous film in the coagulating bath, the fibrous liquid crystal microcapsules 6 can be easily collected. In addition, by making the speed of the liquid or gas flow sufficiently higher than the speed for extruding the mixture from the porous film, the length of the fibrous liquid crystal microcapsule 6 can be controlled to a desired value.

In the liquid crystal display device 1-2, the liquid crystal microcapsule layers 8 and 9 can be formed by aligning and fixing the fibrous liquid crystal microcapsules 6 one by one on the substrate without using any warps. When the fibrous liquid crystal microcapsule 6 are sufficiently long, an apparatus to be described below can be used to form the liquid crystal microcapsule layer.

Figure 15:
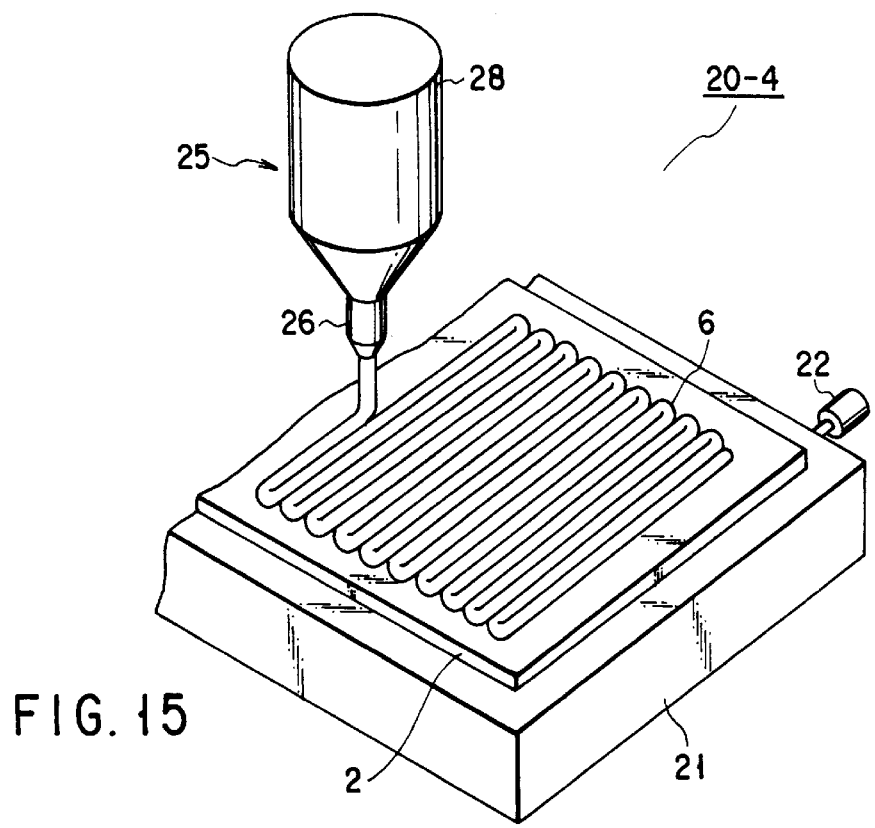
FIG. 15 is a perspective view schematically showing a liquid crystal microcapsule aligning apparatus used to manufacture the liquid crystal display device according to the second embodiment of the present invention.
Figures 16A, 16B, 16C, 16D, 16E:
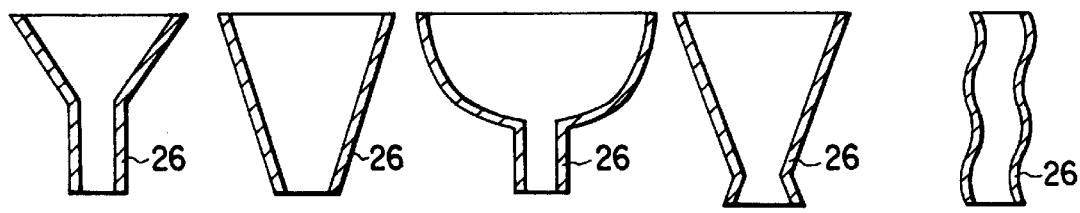
FIGS. 16A to 16E are sectional views schematically showing a nozzle of the liquid crystal microcapsule aligning apparatus used to manufacture the liquid crystal display device according to the first or second embodiment of the present invention.

FIG. 15 is a schematic perspective view of a liquid crystal microcapsule aligning apparatus used to manufacture the liquid crystal display device according to the second embodiment of the present invention. Referring to FIG. 15, a liquid crystal microcapsule aligning apparatus 20-4 comprises a substrate support base 21 for supporting a substrate 2, and a hopper 25 for aligning liquid crystal microcapsules 6 on the substrate 2. The hopper 25 has a nozzle 26 for discharging the liquid crystal microcapsules 6, and a container 28 for storing the liquid crystal microcapsules 6 and supplying the liquid crystal microcapsules to the nozzle 26. The substrate support base 21 also has a solenoid vibrator 22. The substrate support base 21 and the hopper 25 can be translated relative to each other.

To align the fibrous liquid crystal microcapsules 6 on the substrate 2 using the liquid crystal microcapsule aligning apparatus 20-4, the substrate 2 is mounted on the substrate support base 21 first. Subsequently, a pressure is applied into the container 28 to discharge the liquid crystal microcapsules 6 stored in the container 28 from the nozzle 26 onto the substrate 2. Simultaneously, the hopper 25 is translated relative to the substrate support base 21. In this manner, the liquid crystal microcapsules 6 are placed on the substrate 2. After the fibrous liquid crystal microcapsules 6 are fed on the substrate 2, the solenoid vibrator 22 may be driven. With this process, the liquid crystal microcapsules 6 can be more accurately aligned.

The width of the distal end of the nozzle 26 is preferably 1.2 to 1.5 times the diameter of the fibrous liquid crystal microcapsule 6. The length of the distal end of the nozzle 26 is preferably 2 to 3 times the diameter of the fibrous liquid crystal microcapsule 6. When the width of the opening portion and the length of the distal end of the nozzle 26 are set within the above ranges, the discharge amount of the liquid crystal microcapsules 6 from the nozzle 26 can be easily controlled.

The substrate support base 21 is preferably vibrated by the solenoid vibrator 22 in the major-axis direction of the liquid crystal microcapsules 6. The frequency preferably falls within the range of 10 to 100 Hz. If the frequency is lower than 10 Hz, the liquid crystal microcapsules 6 from the nozzle 26 cannot be sufficiently aligned. If the frequency exceeds 100 Hz, the liquid crystal microcapsules 6 may be destroyed.

When the substrate 2 is tilted with respect to the horizon, the liquid crystal microcapsules 6 can be densely aligned. The angle the substrate 2 makes with the horizon is preferably 1° to 10°. If the angle is smaller than 1°, the effect of tilting the substrate 2 cannot be obtained. If the angle is larger than 10°, the alignment of the liquid crystal microcapsules 6 may be disturbed.

The discharge pressure for the fibrous liquid crystal microcapsules 6 is preferably 0.5 to 3 kg/cm$^2$.

If the discharge pressure is lower than 0.5 kg/cm$^2$, the liquid crystal microcapsules 6 cannot be discharged.

If the discharge pressure exceeds 3 kg/cm$^2$, the liquid crystal microcapsules 6 may be destroyed.

In the above-described first and second embodiments of the present invention, the shape of the nozzle 26 of the liquid crystal microcapsule aligning apparatus shown in FIGS. 6, 7, or 15 is appropriately selected in accordance with the shape of the liquid crystal microcapsule to be used.

FIGS. 16A to 16E are schematic sectional views of nozzles used in the liquid crystal microcapsule aligning apparatuses according to the first and second embodiments of the present invention. As the material of the nozzles 26 shown in FIGS. 16A to 16E, a resin such as Teflon, surface-polished stainless steel or aluminum is normally used.

In the first and second embodiments, the two liquid crystal microcapsule layers 8 and 9 are stacked such that the first alignment direction is perpendicular to the second alignment direction. However, the liquid crystal microcapsule layers 8 and 9 can also be stacked such that the first and second alignment directions are parallel to each other. The third embodiment in which the first and second alignment directions are parallel will be described below.

Figure 17:
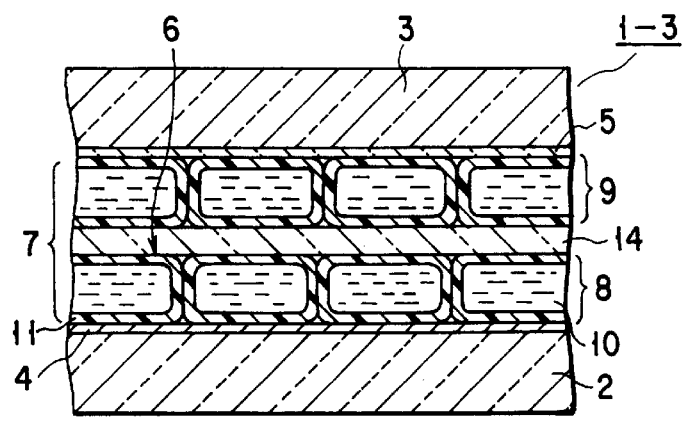
FIG. 17 is a sectional view schematically showing a liquid crystal display device according to the third embodiment of the present invention.

FIG. 17 is a schematic sectional view of a liquid crystal display device according to the third embodiment of the present invention. Referring to FIG. 17, a liquid crystal display device 1-3 comprises a substrate 2 having an electrode 4 formed on one major surface, a substrate 3 opposing the surface of the substrate 2 with the electrode 4 and having an electrode 5 formed on the opposite surface, and a liquid crystal layer 7 sandwiched by the substrates 2 and 3. The liquid crystal layer 7 has a structure in which a liquid crystal microcapsule layer 8, a λ/2-wavelength plate 14, and a liquid crystal microcapsule layer 9 are sequentially stacked. In the liquid crystal microcapsule layers 8 and 9, liquid crystal microcapsules 6 are aligned with their major axes parallel to each other. The directions of the major axes of the liquid crystal microcapsules 6 are equal in the liquid crystal microcapsule layers 8 and 9.

The λ/2-wavelength plate 14 has two different principal refractive indices $n_A$ and $n_B$ in the third and fourth directions perpendicular to each other in its plane. The speed of light changes depending on the refractive index of a medium through which the light passes. Hence, when a linearly polarized light beam enters the λ/2-wavelength plate 14 having different principal refractive indices $n_A$ and $n_B$, a speed difference is generated between a light component parallel to the third direction and that parallel to the fourth direction. Consequently, the incoming linearly polarized light beam on the λ/2-wavelength plate 14 emerges as a circularly polarized light beam, an elliptically polarized light beam, or a linearly polarized light beam.

The polarization state of the emerging light depends on a wavelength λ of incident light, and the principal refractive indices $n_A$ and $n_B$ and a thickness d of the λ/2-wavelength plate 14. For example, as the λ/2-wavelength plate 14, a plate having principal refractive indices $n_A$ and $n_B$ and thickness d with which a phase difference $(2n-1)\pi$ is formed between the polarized light component in the third direction and that in the fourth direction when a linearly polarized light beam having the wavelength λ is sent on the λ/2-wavelength plate 14 is used. In this case, the linearly polarized light beam incident on the λ/2-wavelength plate 14 leaves the plate as a linearly polarized light beam whose polarization direction is rotated. Note that n is a positive integer.

When the principal refractive indices $n_A$ and $n_B$ and thickness d of the λ/2-wavelength plate 14 satisfy the above relationship for an incident light beam having the wavelength λ, the angle the polarization direction of the incident light beam makes with that of the emerging light beam depends on the angle the third or fourth directions makes with the polarization direction of the incident light beam. To make the polarization direction of the emerging light beam perpendicular to the polarization direction of the incident light beam, the angle the third or fourth direction makes with the polarization direction of the incident light beam is set to be 45°.

Assume that the second liquid crystal microcapsule layer 9 absorbs all light components having a polarization direction parallel to the second direction. In this case, only light components having a polarization direction perpendicular to the above light components are incident on the λ/2-wavelength plate 14. Hence, when the angle formed by the first or second direction and the third or fourth direction is set to be 45°, the light components transmitted through the second liquid crystal microcapsule layer 9 can be launched on the first liquid crystal microcapsule layer 8 with the polarization direction rotated through 90°. That is, light components having different polarization directions can be absorbed by the first liquid crystal microcapsule layer 8 and second liquid crystal microcapsule layer 9 at a high efficiency.

As described above, in the third embodiment, the major axes of the liquid crystal microcapsules 6 in the first and second liquid crystal microcapsule layers 8 and 9 point in the same direction. According to the third embodiment, the first and second liquid crystal microcapsule layers 8 and 9 can be easily formed.

For example, a coat is formed on the substrate 2 by using a liquid crystal microcapsule coating solution prepared by dispersing spherical liquid crystal microcapsules into water or the like. This coat is dried, and then, the λ/2-wavelength plate 14 is placed on the dried coat. Another coat is formed on the λ/2-wavelength plate 14 using the liquid crystal microcapsule coating solution. This coat is dried, and a flat plate is placed on the dried coat. This flat plate is slightly translated relative to the substrate 2 while pressing the flat plate against the substrate 2. With this process, the liquid crystal microcapsules on and under the λ/2-wavelength plate 14 are stretched in the moving direction of the flat plate, so the first and second liquid crystal microcapsule layers 8 and 9 are formed.

As described above, the polarization state by the λ/2-wavelength plate 14 changes depending on the wavelength λ of incident light, and the principal refractive indices $n_A$ and $n_B$ and the thickness d of the λ/2-wavelength plate 14. That is, the λ/2-wavelength plate 14 to be used must be appropriately selected in accordance with the wavelength of light components to be rotated in polarization direction, i.e., a specific wavelength. This specific wavelength only need be included in the absorption wavelength band of the dichroic dye contained in the liquid crystal microcapsules 6. However, the specific wavelength is preferably equal to the maximum absorption wavelength of the dichroic dye. In this case, excellent display contrast can be realized.

In the above-described first to third embodiments, the liquid crystal layer 7 has a structure in which the two liquid crystal microcapsule layers 8 and 9 are stacked. However, the liquid crystal layer 7 may have a multilayered structure of three or more liquid crystal microcapsule layers. The above-described effect can be obtained as far as the number of stacked liquid crystal microcapsule layers is two or more.

In the first to third embodiments, the liquid crystal display devices 1-1 to 1-3 preferably have a structure in which three liquid crystal layers are sequentially stacked. When the absorption wavelengths of the three liquid crystal layers are different, and intermediate electrodes are formed between the three liquid crystal layers, full-color display can be realized.

In the above-described first to third embodiments of the present invention, members denoted by the same reference numerals can be formed from the same materials unless otherwise specified.

Examples of the present invention will be described below.

EXAMPLE 1

A liquid crystal display device 1-1 shown in FIG. 1 was formed by the following method.

As the liquid crystal material, a material prepared by adding 1 wt % of black dichroic dye S-435 available from Mitsui Toatsu Chemicals to Lixon-4033xx having a positive dielectric anisotropy, available from Chisso, was used. Eighty parts by weight of this liquid crystal material, 14 parts by weight of methyl methacrylate as a monomer, 1 part by weight of divinyl benzene as a crosslinker, and 0.2 parts by weight of benzoyl peroxide as a crosslinker were mixed and dissolved. The resultant solution mixture was extruded from pores of a hydrophilic porous glass tube with an average pore size of 1 μm into a 0.3 wt % aqueous solution of polyvinyl alcohol at a period of 10 Hz, maximum pressure of 1.5 atm, and minimum pressure of 1.2 atm, thereby obtaining an emulsion.

The emulsion was stirred at a temperature of 85° C. and a stirring speed of 50 rpm for 1 hr to polymerize the monomer component. After one hour, the product was poured into a porous tube consisting of an ion exchange resin together with pure water and purified, thereby obtaining liquid crystal microcapsules 6. When the liquid crystal microcapsules 6 were observed with a microscope, they had an average grain size of 6 μm and a spherical shape.

ITO films 4 and 5 each having a thickness of 1,000 Å were formed on two 0.7 mm thick glass substrates 2 and 3 by deposition, respectively. These ITO films were patterned into predetermined shapes. A liquid crystal microcapsule coating solution prepared by dispersing the liquid crystal microcapsules 6 into a predetermined solution was applied to the substrate 2 having the ITO film 4. The resultant coat was dried and stretched to obtain a liquid crystal microcapsule layer 8.

The liquid crystal microcapsule coating solution was applied to a porous glass substrate having holes with an average size of 0.2 μm to form a coat. This coat was drawn through the holes of the porous glass substrate by vacuum-suction and dried. The dried coat was stretched to obtain a liquid crystal microcapsule layer 9. This liquid crystal microcapsule layer 9 was transferred from the porous glass substrate to the liquid crystal microcapsule layer 8 to form a liquid crystal layer 7. The liquid crystal microcapsule layers 8 and 9 were stacked such that their stretching directions are perpendicular to each other. Upon stretching, the liquid crystal microcapsules 6 were stretched in the stretching directions in both the liquid crystal microcapsule layers 8 and 9 and deformed to have a major axis with a length about 2.5 times the maximum value of the diameter perpendicular to the major axis.

The glass substrate 3 having the transparent electrode 5 was pressed against the liquid crystal layer 7 and the side surface portion was sealed using a sealing agent in vacuum, thereby obtaining the liquid crystal display device 1-1.

When an AC voltage of 9 V at 50 Hz was applied across the electrodes 4 and 5 of the resultant liquid crystal display device 1-1, the display state changed from black in the absence of applied voltage to transparent. The contrast ratio obtained by a reflection densitometer was 5:1.

EXAMPLE 2

A liquid crystal display device 1-1 shown in FIG. 1 was manufactured by the following method. In this example, projecting portions 30 shown in FIG. 8 were formed on a substrate 2.

Spherical liquid crystal microcapsules 6 prepared by the method of Example 1 were applied to a base film of polyvinyl alcohol to form a coat. This coat was stretched at 100° C. to form a liquid crystal microcapsule layer 8 on the base film. A liquid crystal microcapsule layer 9 was formed on another base film, like the liquid crystal microcapsule layer 8.

A 2 $\mu$m thick undercoat of an acrylic resin was formed on a 0.7 mm thick glass substrate 2. This undercoat was embossed to form the projecting portions 30 shown in FIG. 8. Each projecting portion 30 has a tilted triangular prism-like shape. The length of the oblique side of a right-angled triangle corresponding to the bottom surface of the triangular prism was 5 $\mu$m, and the length of one of the remaining sides was 2 $\mu$m. A 1,000 Å thick aluminum film was formed on the projecting portions 30 and patterned to form a reflection electrode 4.

The composite film of the liquid crystal microcapsule layer 8 and base film was placed on the reflection electrode 4 such that the liquid crystal microcapsule layer 8 was in contact with the reflection electrode 4 and the stretching direction of the liquid crystal microcapsule layer 8 was perpendicular to the longitudinal direction of grooves formed by the projecting portions 30. The base film and liquid crystal microcapsule layer 8 were embossed, as in embossing the projecting portions 30, while heating the substrate 2 at a temperature lower than the glass transition temperature of a transparent film 11 of the liquid crystal microcapsule 6. After embossing, the base film was washed and removed. With this process, the liquid crystal microcapsule layer 8 was arranged on the reflection electrode 4.

The composite film of the liquid crystal microcapsule layer 9 and base film was placed on the liquid crystal microcapsule layer 8 such that the liquid crystal microcapsule layer 8 was in contact with the liquid crystal microcapsule layer 8 and the stretching directions of these layers were perpendicular to each other. The base film and liquid crystal microcapsule layer 9 were pressed using a flat plate while heating the substrate 2 at a temperature lower than the glass transition temperature of a transparent film 11 of the liquid crystal microcapsule 6. After pressing, the base film was washed and removed. With this process, the liquid crystal microcapsule layers 8 and 9 were stacked on the substrate 2 to form a liquid crystal layer 7.

A glass substrate 3 having a transparent electrode 5 was placed on the liquid crystal layer 7. The resultant multilayered structure was put in a polyamide bag. The structure was heated to 120° C. while reducing the pressure in the polyamide bag to joint the polyamide bag and members, thus completing the liquid crystal display device 1-1 shown in FIG. 1.

The liquid crystal display device 1-1 was observed with a microscope. The liquid crystal microcapsules 6 were stretched in the stretching direction. Destruction of the transparent films was not confirmed. In both the liquid crystal microcapsule layers 8 and 9, the major axis of each liquid crystal microcapsule 6 had a length about 2.8 times the maximum value of the diameter perpendicular to the major axis. The thickness of the liquid crystal layer was 10 $\mu$m, and the liquid crystal layer 7 was comprised of the liquid crystal microcapsule layers 8 and 9. The alignment direction of liquid crystal molecules was approximately parallel to the substrate surface. The alignment direction of the liquid crystal molecules in the liquid crystal microcapsule layer 8 was perpendicular to that in the liquid crystal microcapsule layer 9.

When an AC voltage of 9 V at 50 Hz was applied across the electrodes 4 and 5 of the resultant liquid crystal display device 1-1, the display state changed from black in the absence of applied voltage to white. The contrast ratio obtained by a reflection densitometer was 7:1.

EXAMPLE 3

A liquid crystal display device 1-1 shown in FIG. 1 was manufactured by the following method. In this example, a liquid crystal microcapsule 6 had a shape shown in FIG. 9A. In addition, in a liquid crystal microcapsule layer 8, the liquid crystal microcapsules 6 had an alignment shown in FIG. 10B.

Spherical liquid crystal microcapsules 6 prepared by the same method as in Example 1 were dispersed into a predetermined solution to prepare a suspension. This suspension was dropped on a disk having a diameter of 1 m which was heated to 95° C. and rotated at a rotational speed of 1,000 rpm. With this operation, the liquid crystal microcapsules 6 were dried and deformed. The deformed liquid crystal microcapsules 6 were collected in a container set around the disk and observed with a microscope. Each liquid crystal microcapsule 6 had the shape shown in FIG. 9A, the average diameter in the major-axis direction was 6.5 $\mu$m, and the average of the maximum diameters in a direction perpendicular to the major axes was 5 $\mu$m.

A 2 $\mu$m thick undercoat of an acrylic resin was formed on a 0.7 mm thick glass substrate 2. This undercoat was embossed to form recessed portions which were capable of aligning the liquid crystal microcapsules 6 in the alignment shown in FIG. 10B. A 1,000Å thick aluminum film was formed on the embossed undercoat and patterned to form a reflection electrode 4.

A liquid crystal microcapsule coating solution prepared by dispersing the liquid crystal microcapsules 6 into a predetermined solution was applied to the reflection electrode 4 to form a coat. The coat was heated and dried while applying an ultrasonic wave to the substrate 2, thereby forming a liquid crystal microcapsule layer 8. A liquid crystal microcapsule layer 9 formed like the liquid crystal microcapsule layer 8 was stacked on the liquid crystal microcapsule layer 8 to form a liquid crystal layer 7.

A glass substrate 3 having a transparent electrode 5 was placed on the liquid crystal layer 7. The resultant multilayered structure was put in a polyamide bag. The structure was heated to 120° C. while reducing the pressure in the polyamide bag to joint the polyamide bag and members, thus completing the liquid crystal display device 1-1 shown in FIG. 1.

The liquid crystal display device 1-1 was observed with a microscope. Destruction of the transparent films of the liquid crystal microcapsules 6 was not confirmed. The thickness of the liquid crystal layer was 10 $\mu$m, and the liquid crystal layer 7 was comprised of the liquid crystal microcapsule layers 8 and 9. In both the liquid crystal microcapsule layers 8 and 9, the major axis of each liquid crystal microcapsule 6 had a length about 2.2 times the maximum value of the diameter perpendicular to the major axis. The alignment direction of liquid crystal molecules was approximately parallel to the substrate surface. The alignment direction of the liquid crystal molecules in the liquid crystal microcapsule layer 8 was perpendicular to that in the liquid crystal microcapsule layer 9.

When an AC voltage of 9 V at 50 Hz was applied across the electrodes 4 and 5 of the resultant liquid crystal display device 1-1, the display state changed from black in the absence of applied voltage to white. The contrast ratio obtained by a reflection densitometer was 6:1.

COMPARATIVE EXAMPLE 1

A liquid crystal display device was manufactured without deforming liquid crystal microcapsules into an aspherical shape. More specifically, spherical liquid crystal microcapsules 6 prepared by the same method as in Example 1 were dispersed into a predetermined solution t o prepare a liquid crystal microcapsule coating solution. A liquid crystal display device was manufactured by the same method as in Example 2 except that the liquid crystal microcapsule coating solution was applied to a reflection electrode 4 and dried to form a liquid crystal layer 7.

The liquid crystal di splay device was observed with a microscope. The thickness of the liquid crystal layer was 10 $\mu$m. The liquid crystal layer had a structure in which two liquid crystal microcapsule layers were stacked. The central positions of the liquid crystal microcapsules were shifted between the two layers. More specifically, the positions of the liquid crystal microcapsules 6 in a plane parallel to the substrate surface were different between the two liquid crystal microcapsule layers.

In both the liquid crystal microcapsule layers, the major axis of each liquid crystal microcapsule had a length about 2 times the maximum value of the diameter perpendicular to the major axis. The alignment direction of liquid crystal molecules in each liquid crystal microcapsule layer was nearly parallel to the substrate surface although the liquid crystal microcapsules were aligned at random in a plane parallel to the substrate surface.

When an AC voltage of 9 V at 50 Hz was applied across the electrodes of the resultant liquid crystal display device 1-1, the display state changed from black in the absence of applied voltage to white. The contrast ratio obtained by a reflection densitometer was 5:1.

EXAMPLE 4

Figure 18:
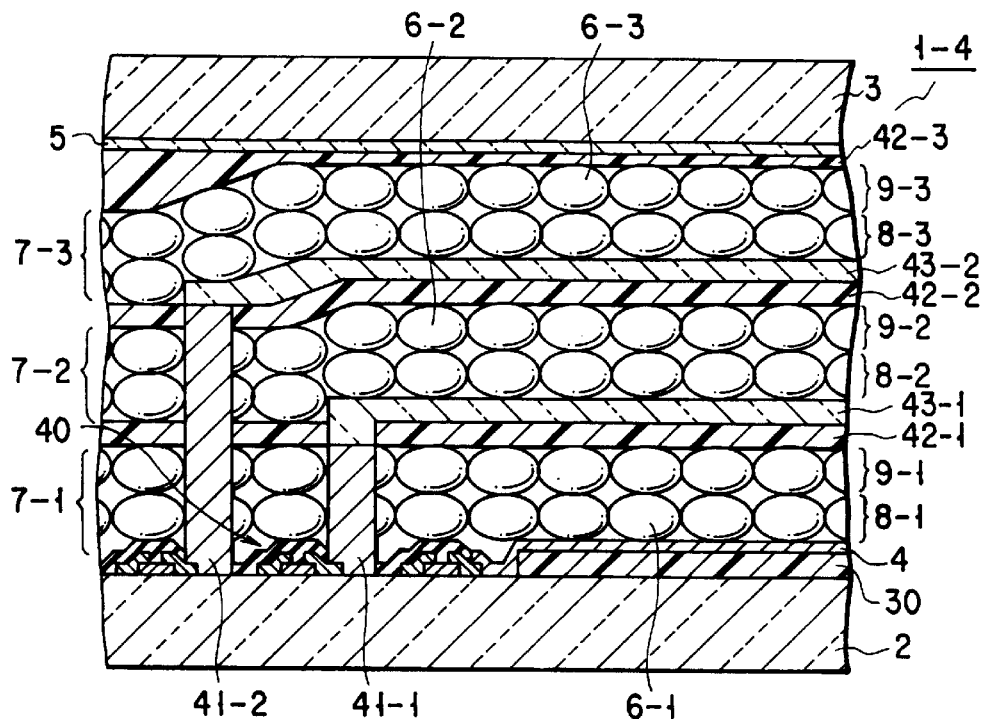
FIG. 18 is a sectional view schematically showing a liquid crystal display device of Example 4 of the present invention.

A liquid crystal display device shown in FIG. 18 was manufactured by the following method. FIG. 18 is a sectional view schematically showing a liquid crystal display device of Example 4 of the present invention.

One wt % of an anthraquinone-based yellow dichroic dye represented by formula (1) was added to Lixon-5053xx as a fluorine-based liquid crystal mixture having a positive dielectric anisotropy, available from Chisso, to prepare a liquid crystal material. Eighty parts by weight of this liquid crystal material, 15 parts by weight of isoprene rubber, and 0.2 parts by weight of benzoyl peroxide as a crosslinker were mixed and dissolved into 300 parts by weight of toluene. This solution mixture was dropped on a disk having a diameter of 1 m which was heated to 80° C. and rotated at a rotational speed of 1,000 rpm and collected in a container set around the disk. A droplet of the solution mixture formed a transparent film 11 on the disk surface upon coming into contact with the disk. That is, yellow liquid crystal microcapsules 6-1 were formed. The resultant liquid crystal microcapsules 6-1 were observed with a microscope. Each liquid crystal microcapsule 6-1 had a shape shown in FIG. 9E, the average diameter in the major-axis direction was 6.5 $\mu$m, and the average of the maximum diameters in a direction perpendicular to the major axes was 5 $\mu$m.

Cyan liquid crystal microcapsules 6-2 were obtained by the same method as described above except that an anthraquinone-based cyan dichroic dye represented by formula (29) was used as a dichroic dye. Also, magenta liquid crystal microcapsules 6-3 were obtained by the same method as described above except that an anthraquinone-based magenta dichroic dye represented by formula (20) was used as a dichroic dye.

Three systems of TFTs and gate/signal interconnections 40 were formed for each pixel on a glass substrate 2. A 2 $\mu$m thick undercoat 30 of polyimide was formed. This undercoat 30 was embossed to form well-shaped recessed portions in the surface of the undercoat 30. The well-shaped recessed portions had a shape which made it possible to align the liquid crystal microcapsules 6-1 in an alignment shown in FIG. 10A. A 1,000 Å thick aluminum film was formed on the embossed undercoat 30 and patterned to form a reflection electrode 4.

The resultant reflection electrode 4 was connected to the source electrode of one of the three TFTs. A 10 $\mu$m high electrode column 41-1 and a 22 $\mu$m high electrode column 41-2 were formed on the source electrodes of the remaining two TFTS, respectively, using a hydrophobic conductive paste.

A liquid crystal microcapsule coating solution prepared by dispersing the yellow liquid crystal microcapsules 6-1 into an aqueous solution of polyvinyl alcohol (molecular weight: 6000) and applied to the reflection electrode 4 by slit coating. By applying an ultrasonic wave while heating the substrate 2, the coat was dried while aligning the liquid crystal microcapsules 6-1, thereby forming a liquid crystal microcapsule layer 8-1. A liquid crystal microcapsule layer 8-2 was formed on the liquid crystal microcapsule layer 8-1 by the same method as that described in association with the liquid crystal microcapsule layer 8-1, thereby forming a liquid crystal layer 7-1.

An aqueous solution of hydroxymethyl cellulose was applied to the liquid crystal layer 7-1 by slit coating and dried at 120° C. as a temperature lower than the glass transition temperature of the transparent film 11 of the liquid crystal microcapsule 6-1 to form a protective film 42-1. The aqueous solution of hydroxymethyl cellulose has affinity to the transparent film 11 (the contact angle is smaller than 5°) and no affinity to the electrode columns 41-1 and 41-2 (the contact angle exceeds 50°). The protective film 42-1 was dried and annealed in air to impart hydrophobic nature to the surface of the protective film 42-1.

An ITO filler coating solution (toluene solution of polyester particles) was selectively applied to the protective film 42-1 into a predetermined form, embossed as in formation of the undercoat 30, and dried at room temperature in a nitrogen atmosphere. The ITO filler coating solution is hydrophobic and has affinity to the protective film 42-1 and electrode columns 41-1 and 41-2. The ITO filler was dried and irradiated with UV light having a center wavelength of 147 nm. The ITO filler was hardened and imparted with conductivity to form an intermediate electrode 43-1. Groove-shaped recessed portions similar to those formed in the undercoat 30 were formed in the surface of the intermediate electrode 43-1. The intermediate electrode 43-1 was electrically connected to the electrode column 41-1 and electrically insulated from the electrode column 41-2.

As in formation of the yellow liquid crystal layer 7-1, liquid crystal microcapsule layers 8-1 and 9-2 were sequentially stacked on the intermediate electrode 43-1 using the cyan liquid crystal microcapsules 6-2. On a liquid crystal layer 7-2 as well, a protective film 42-2 and intermediate electrode 43-2 were formed by the above-described method. The intermediate electrode 43-2 is electrically connected to the electrode column 41-2. Groove-shaped recessed portions similar to those formed in the undercoat 30 were formed in the surface of the intermediate electrode 43-2.

As in formation of the yellow liquid crystal layer 7-1, liquid crystal microcapsule layers 8-3 and 9-3 were sequentially stacked on the intermediate electrode 43-2 using the magenta liquid crystal microcapsules 6-3. The aqueous solution of hydroxymethyl cellulose was also applied to a liquid crystal layer 7-3 formed and dried to form a protective film 42-3.

A glass substrate 3 having a transparent electrode 5 was heated and pressed against the protective film 42-3, thus completing a liquid crystal display device 1-4.

The liquid crystal display device 1-4 was observed with a microscope. Destruction of the transparent films of the liquid crystal microcapsules 6-1 to 6-3 was not confirmed. In all of the liquid crystal microcapsule layers 8-n and 9-n, the major axis of each of the liquid crystal microcapsules 6-1 to 6-3 had a length about 2.1 times the maximum value of the diameter perpendicular to the major axis. In all of the liquid crystal layers 7-1 to 7-3, the alignment direction of liquid crystal molecules was almost parallel to the substrate surface. The alignment direction of the liquid crystal molecules in the liquid crystal microcapsule layers 8-n was perpendicular to that in the liquid crystal microcapsule layers 9-n. Since the liquid crystal display device 1-4 had no intermediate substrates, no parallax or alignment defects of the liquid crystal molecules were observed, unlike a normal multilayered structure.

When a driver IC was mounted on the liquid crystal display device 1-4 by TAB, and an AC voltage having a maximum signal amplitude of 5 V was independently applied across the electrodes, the display state changed from black in the absence of applied voltage to white. The contrast ratio obtained by a reflection densitometer was 5:1. In addition, color display with satisfactory color tone could be achieved.

COMPARATIVE EXAMPLE 2

Yellow, cyan, and magenta liquid crystal microcapsules were prepared by the same method as in Example 4 except that the rotational speed of the disk was 50 rpm. The resultant liquid crystal microcapsules were observed with a microscope. The liquid crystal microcapsules had a spherical shape and an average grain size of 6 µm.

A liquid crystal display device in which yellow, cyan, and magenta liquid crystal layers were sequentially stacked was manufactured by the same method as in Example 4 except that the spherical liquid crystal microcapsules prepared by the above method were used.

When this liquid crystal display device was observed with a microscope, destruction of the transparent film of the liquid crystal microcapsule was not confirmed. Each liquid crystal layer was comprised of two liquid crystal microcapsule layers. In each liquid crystal microcapsule layer, the major axis of each liquid crystal microcapsule had a length about 1.2 times the maximum value of the diameter perpendicular to the major axis. The alignment direction of liquid crystal molecules in each liquid crystal microcapsule layer was virtually parallel to the substrate surface although the liquid crystal microcapsules were aligned at random in a plane parallel to the substrate surface.

When a driver IC was mounted on the liquid crystal display device by TAB, and an AC voltage having a maximum signal amplitude of 5 V was independently applied across the electrodes, the display state changed from black in the absence of applied voltage to white. The contrast ratio obtained by a reflection densitometer was 3:1. In addition, the black color in the absence of applied voltage was light, so light absorption was insufficient.

EXAMPLE 5

Figure 19:
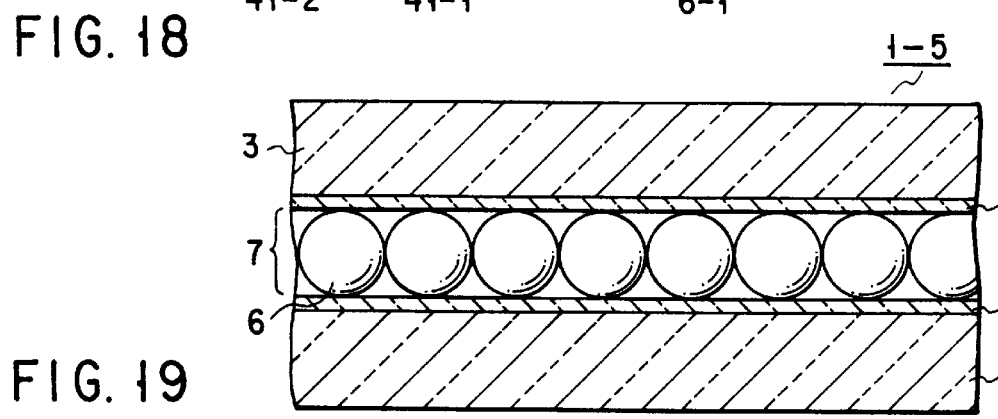
FIG. 19 is a sectional view schematically showing a liquid crystal display device of Examples 5 to 7, Examples 15 to 17, and Example 18 of the present invention.

A liquid crystal display device shown in FIG. 19 was manufactured by the following method. FIG. 19 is a sectional view showing a liquid crystal display device of Example 5 of the present invention.

To manufacture a liquid crystal display device 1-5 shown in FIG. 19, a 1,000 Å thick titanium oxide film (not shown) was deposited on a glass substrate 2 having a thickness of 1.1 mm, and a 1,000 Å thick ITO film 4 was deposited on the titanium oxide film. A 2 µm thick resist film was formed on the ITO film 4 and patterned into a predetermined shape. The ITO film 4 was patterned into a stripe shape using the resist pattern as a mask.

A 200 Å thick ITO film 5 was deposited on a glass substrate 3 having a thickness of 1.1 mm and patterned into a stripe shape by the same method as described above.

Subsequently, liquid crystal microcapsules 6 having an average grain size of 10 µm were prepared by the normal method. For the liquid crystal microcapsules 6, a liquid crystal material prepared by adding 1 wt % of dichroic dye G232 available from Nippon Kanko Shikiso to ZLI5065 as a nematic liquid crystal available from Merck Japan was encapsulated with polymethyl methacrylate (PMMA).

A liquid crystal microcapsule coating solution prepared by dispersing the liquid crystal microcapsules 6 into a predetermined solution was applied to a porous glass plate to a uniform thickness. After the liquid crystal microcapsules 6 were allowed to settle on the surface of the porous glass plate, vacuum-suction from the lower surface of the porous glass plate was done. The solution used to disperse the liquid crystal microcapsules 6 was removed through holes formed in the porous glass plate, so a liquid crystal microcapsule layer was formed on the surface of the porous glass plate.

This liquid crystal microcapsule layer was transferred from the porous glass plate to the surface of the glass substrate 2 with the ITO film 4 to form a liquid crystal layer 7 on the glass substrate 2. In addition, the glass substrate 3 was placed on the liquid crystal layer 7 such that the surface having the ITO film 5 came into contact with the liquid crystal layer 7, and pressed against the glass substrate 2 while heating the structure in vacuum, thus completing the liquid crystal display device 1-5.

When an AC voltage of 12 V at 50 Hz was applied across the electrodes 4 and 5 of the liquid crystal display device 1-5, the transmission contrast ratio was 2:1.

In this example, the porous glass plate was used as a porous substrate. However, even when a filter paper, membrane filter, or perforated film was used, a liquid crystal microcapsule layer could be formed. The thickness of the liquid crystal microcapsule layer could be controlled by adjusting the amount of liquid crystal microcapsules 6 scattered on the porous substrate.

Grooves equal in size to the grain size of the liquid crystal microcapsule 6 were formed in the surface of the porous substrate. When a liquid crystal microcapsule layer was formed using this porous substrate, the liquid crystal microcapsules 6 can be aligned in one direction. When the liquid crystal microcapsules 6 were formed into an aspherical shape, e.g., a spheroidal shape, and the width of the groove was smaller than the length of the major axis of the liquid crystal microcapsule 6, all the liquid crystal microcapsules 6 could be aligned while matching the major-axis directions.

By using the above-described method, a liquid crystal display device having the same structure as that shown in FIG. 1 could be manufactured, and the contrast ratio could be increased.

EXAMPLE 6

A liquid crystal display device 1-5 shown in FIG. 19 was manufactured by the following method.

First, spherical liquid crystal microcapsules 6 having an average grain size of 10 μm were prepared by the same method as in Example 5. The liquid crystal microcapsules 6 were put into water 18 stored in a predetermined container 17 and allowed to float on the surface of the water 18, as shown in FIG. 11. The liquid crystal microcapsules 6 were gathered such that the liquid crystal microcapsules 6 floating on the surface of the water 18 were closely aligned to form a single-layered film on the surface of the water 18.

A sheet 19 was placed on the single-layered film formed on the surface of the water 18 by the above method, and pulled up from the water surface, thereby transferring the single-layered film of the liquid crystal microcapsules 6, i.e., the single-layered liquid crystal microcapsule layer to the surface of the sheet 19 while maintaining the alignment. Also, the sheet 19 could be placed below the single-layered film of the liquid crystal microcapsules 6, as shown in FIG. 11, to transfer the single-layered film to the surface of the sheet 19.

The liquid crystal display device 1-5 was manufactured by the same method as in Example 5 except that the liquid crystal microcapsule layer transferred to the sheet 19 was transferred to a substrate 2. When an AC voltage of 12 V at 50 Hz was applied across electrodes 4 and 5 of the resultant liquid crystal display device 1-5, the transmission contrast ratio was 2:1.

EXAMPLE 7

A liquid crystal display device 1-5 shown in FIG. 19 was manufactured by the following method.

Spherical liquid crystal microcapsules 6 having an average grain size of 20 μm were prepared by the normal method. For the liquid crystal microcapsules 6, a liquid crystal material prepared by adding 1 wt % of dichroic dye G232 available from Nippon Kanko Shikciso to ZLI5065 as a nematic liquid crystal available from Merck Japan was encapsulated with polymethyl methacrylate (PMMA). The liquid crystal microcapsules 6 were dried and subjected to a surface treatment for preventing coagulation, and the capsule surfaces were dried.

The liquid crystal microcapsules 6 were scattered on a porous film having holes with a diameter smaller than the grain size of the liquid crystal microcapsule 6, and vacuum-suction from the lower surface of the porous film was done. With this process, the liquid crystal microcapsules 6 were drawn and held on the upper surface of the porous film by vacuum suction. The liquid crystal microcapsules 6 drawn and held on the upper surface of the porous film by vacuum suction formed a single-layered film. That is, a liquid crystal microcapsule layer was formed on the surface of the porous film.

The liquid crystal display device 1-5 was manufactured by the same method as in Example 5 except that the liquid crystal microcapsule layer held on the surface of the porous film was transferred to a substrate 2. When an AC voltage of 25 V at 50 Hz was applied across electrodes 4 and 5 of the resultant liquid crystal display device 1-5, the transmission contrast ratio was 3:1.

EXAMPLE 8

Figure 20:
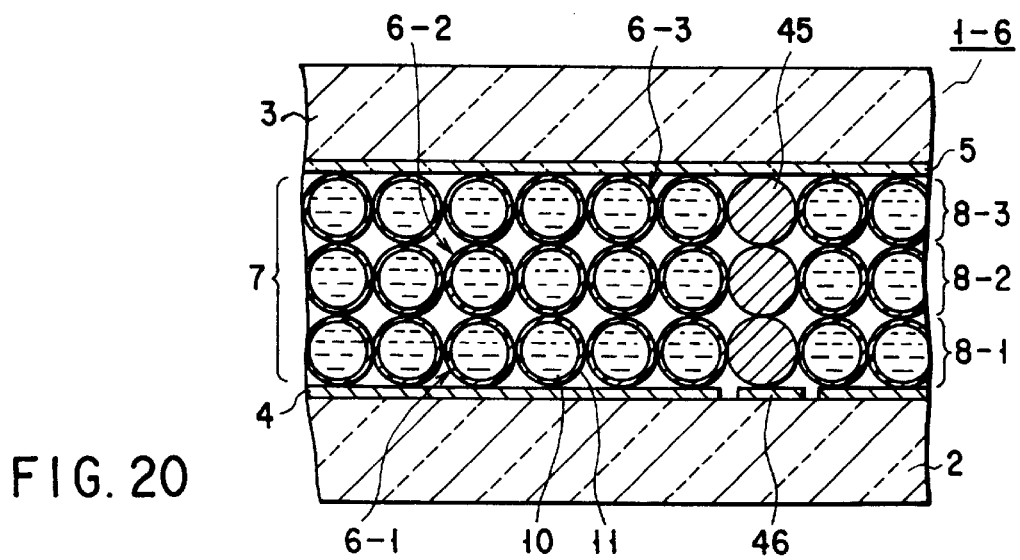
FIG. 20 is a sectional view schematically showing a liquid crystal display device of Example 8 of the present invention.

A liquid crystal display device shown in FIG. 20 was manufactured by the following method. FIG. 20 is a sectional view showing the liquid crystal display device of Example 8.

First, spherical liquid crystal microcapsules 6 having an average grain size of 15 μm were prepared by the normal method. For the liquid crystal microcapsules 6, a liquid crystal material prepared by adding 1 wt % of a dichroic dye to ZLI5065 as a nematic liquid crystal available from Merck Japan was encapsulated with polymethyl methacrylate (PMMA). Three colors, i.e., cyan, magenta, and yellow liquid crystal microcapsules 6 were prepared by changing the type of dichroic dye to be added. The liquid crystal microcapsules 6 were subjected to a surface treatment for preventing coagulation, as in Example 7.

Figure 21:
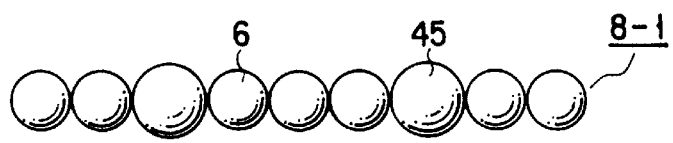
FIG. 21 is a side view showing liquid crystal microcapsules used in the liquid crystal display device shown in FIG. 20.

A yellow liquid crystal microcapsule layer 8-1 shown in FIG. 21 was formed by the following method. FIG. 21 is a side view showing the liquid crystal microcapsule layer used in the liquid crystal display device of Example 8 of the present invention.

Spherical bodies 45 of an AFC (anisotropic conductive film) and having an average grain size of 20 μm were scattered on a porous substrate in which recessed portions almost complementary to the spherical bodies 45 were regularly formed at predetermined intervals. By vibrating the porous substrate, the spherical bodies 45 were fitted in the recessed portions formed in the porous substrate surface, and excess spherical bodies 45 were removed from the porous substrate surface. After the spherical bodies 45 were regularly aligned on the porous substrate surface, the yellow liquid crystal microcapsules 6 were scattered on the porous substrate and vacuum-suction was done, as in Example 7. With this process, the yellow liquid crystal microcapsule layer 8-1 containing the yellow liquid crystal microcapsules 6 and the spherical bodies 45 was formed.

Cyan and magenta liquid crystal microcapsule layers 8-2 and 8-3 were formed, like the yellow liquid crystal microcapsule layer 8-1.

An ITO pixel electrode 4 and an Ni electrode portion 46 electrically insulated from the pixel electrode 4 were formed on one major surface of a glass substrate 2. The liquid crystal microcapsule layers 8-1 to 8-3 were sequentially transferred on the surface of the glass substrate 2 having the pixel electrode 4 such that the spherical bodies 45 of each layer were electrically connected to the electrode portion 46. With this process, a liquid crystal layer 7 was formed on the glass substrate 2.

A glass substrate 3 was placed on the liquid crystal layer 7 such that the surface of the glass substrate 3 having an ITO film 5 came into contact with the liquid crystal layer 7. The resultant structure was heated and pressed in vacuum, thus completing a liquid crystal display device 1-6.

When an AC voltage of 18 V at 50 Hz was applied across the electrodes 4 and 5 of the liquid crystal display device 1-6, the transmission contrast ratio was 5:1.

In this example, the liquid crystal display device 1-6 was manufactured with single color display specifications. However, the liquid crystal display device may have color display specifications. For example, when intermediate electrodes are formed between the liquid crystal microcapsule layers 8-1 to 8-3, and the pixel electrode 4 and intermediate electrodes are simple-matrix- or active-matrix-driven instead of driving the counter electrode 5, a liquid crystal display device with color display specifications can be manufactured.

EXAMPLE 9

Liquid crystal microcapsules 6 shown in FIG. 13 were prepared by the following method, and a liquid crystal display device was manufactured using the liquid crystal microcapsules 6.

A liquid crystal material prepared by adding 1.5 wt % of black dichroic dye S-435 available from Mitsui Toatsu Chemicals to a fluorine-based liquid crystal Lixon-5052xx available from Chisso was used. Eighty parts by weight of this liquid crystal material, 14 parts by weight of polyvinyl alcohol, 1 part by weight of TMPTA as a crosslinker, and 0.2 parts by weight of benzoyl peroxide as a crosslinker were mixed and dissolved. Using a film emulsifier available from Ise Kagaku, similar to that shown in FIG. 14, this solution mixture was extruded from a hydrophilic porous glass tube with an average pore size of 1 $\mu$m into hot water at 70° C. at a static pressure of 1.5 atm, thereby obtaining fibrous liquid crystal microcapsules 6.

The encapsulated liquid crystal material was removed from the resultant fibrous liquid crystal microcapsules 6 using toluene, and the liquid crystal microcapsules were dried to obtain empty liquid crystal microcapsules 6. The empty liquid crystal microcapsule 6, i.e., a transparent film 11 was observed with an SEM. The fibrous liquid crystal microcapsule 6 had an outer diameter of 6 $\mu$m and an inner diameter of 5.8 $\mu$m. The transparent film 11 had no network of polymeric substance and had a smooth inner wall. That is, the transparent film 11 was satisfactorily phase-separated from the liquid crystal material.

The fibrous liquid crystal microcapsules 6 were applied to a glass substrate having an aluminum reflection electrode on one major surface, and dried to form a liquid crystal layer. The fibrous liquid crystal microcapsules 6 were parallelly aligned such that the major axes pointed in one direction in the liquid crystal layer.

A glass substrate having a transparent electrode on one major surface was placed on the liquid crystal layer, and the entire structure was put into a polyamide bag. The structure was heated to 120° C. while reducing the pressure in the polyamide bag to joint the polyamide bag and members, thus completing a liquid crystal display device.

The resultant liquid crystal display device was observed with a microscope. Destruction of the transparent films of the liquid crystal microcapsules 6 was not confirmed. The thickness of the liquid crystal layer was 5 $\mu$m. The alignment direction of liquid crystal molecules was almost parallel to the substrate surface and parallel to the major-axis direction of the liquid crystal microcapsules 6.

When an AC voltage of 10 V at 50 Hz was applied across the electrodes of the liquid crystal display device, the display state changed from black in the absence of applied voltage to white. The contrast ratio obtained by a reflection densitometer was 7:1.

EXAMPLE 10

A liquid crystal display device 1-2 shown in FIG. 12 was manufactured by the following method.

A liquid crystal material prepared by adding 1 wt % of black dichroic dye S-435 available from Mitsui Toatsu Chemicals to a fluorine-based liquid crystal Lixon-5052xx available from Chisso was used. Eighty parts by weight of this liquid crystal material, 14 parts by weight of di-isobutyl fumarate, 1 part by weight of divinyl benzene as a crosslinker, and 1 part by weight of AIBN as an initiator were mixed and dissolved. Using a film emulsifier available from Ise Kagaku, this solution mixture was extruded from a hydrophilic porous glass tube with an average pore size of 1 $\mu$m into an argon atmosphere at 100° C. at a static pressure of 5 atm, thereby obtaining fibrous liquid crystal microcapsules 6.

The encapsulated liquid crystal material was removed from the resultant fibrous liquid crystal microcapsules 6 using toluene, and the liquid crystal microcapsules were dried. The empty liquid crystal microcapsules 6, i.e., a transparent film 11 was observed with an SEM. The fibrous liquid crystal microcapsule 6 had an outer diameter of 6 $\mu$m and an inner diameter of 5.7 $\mu$m. The transparent film 11 had no network of polymeric substance and had a smooth inner wall. That is, the transparent film 11 was satisfactorily phase-separated from the liquid crystal material.

The fibrous liquid crystal microcapsules 6 were applied to a glass substrate 2 having an aluminum reflection electrode 4 on one major surface, and dried to form a liquid crystal layer 8. The liquid crystal microcapsule layer 8 was formed by parallelly aligning the liquid crystal microcapsules 6 with their major axes directed in one direction.

More fibrous liquid crystal microcapsules 6 were applied to the liquid crystal microcapsule layer 8 and dried to form a liquid crystal microcapsule layer 9, thereby forming a liquid crystal layer 7. The liquid crystal microcapsule layer 9 was formed by parallelly aligning the liquid crystal microcapsules 6 with their major axes directed in one direction. The major axis of the liquid crystal microcapsule 6 in the liquid crystal microcapsule layer 8 is perpendicular to that in the liquid crystal microcapsule layer 9.

A glass substrate having a transparent electrode on one major surface was placed on the liquid crystal layer 7, and the entire structure was put into a polyamide bag. The structure was heated to 100° C. while reducing the pressure in the polyamide bag to joint the polyamide bag and members, thus completing a liquid crystal display device.

The resultant liquid crystal display device 1-2 was observed with a microscope. Destruction of the transparent films of the liquid crystal microcapsules 6 was not confirmed. The thickness of each of the liquid crystal microcapsule layers 8 and 9 was 5 $\mu$m. The alignment direction of liquid crystal molecules was nearly parallel to the substrate surface and parallel to the major-axis direction of the liquid crystal microcapsules 6.

When an AC voltage of 11 V at 50 Hz was applied across electrodes 4 and 5 of the liquid crystal display device, the display state changed from black in the absence of applied voltage to white. The contrast ratio obtained by a reflection densitometer was 8:1.

EXAMPLE 11

A liquid crystal display device 1-2 shown in FIG. 12 was manufactured by the following method.

A liquid crystal material prepared by adding a mixture of a dichroic dye represented by formulas (32) to (34) below to a fluorine-based liquid crystal Lixon5052 available from Chisso was used. Methyl methacrylate as a polymeric monomer and a photoinitiator Irgacure 907 available from Ciba-Geigy Corp. were mixed with the liquid crystal material and dissolved. This solution mixture was slowly extruded from a nozzle having a rectangular opening portion with 20 μm long sides and 5 μm short sides. The extruded solution mixture was irradiated with UV light near the distal end of the nozzle and wound up, thereby obtaining fibrous liquid crystal microcapsules 6.

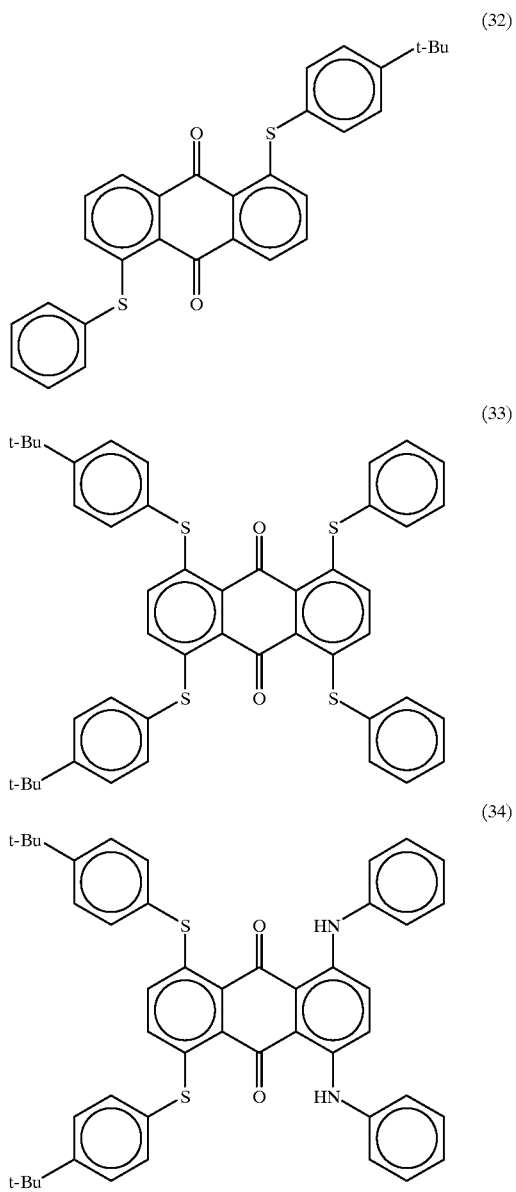

(32)

(33)

(34)

The fibrous liquid crystal microcapsules 6 were aligned on a glass substrate 2 having a transparent electrode 4 on one major surface and pressed against the glass substrate 2 using a loom, thereby forming a liquid crystal microcapsule layer 8. In the liquid crystal microcapsule layer 8, the liquid crystal microcapsules 6 were parallelly aligned with their major axes directed in one direction.

More fibrous liquid crystal microcapsules 6 were aligned on the liquid crystal microcapsule layer 8 and pressed against the liquid crystal microcapsule layer 8 using a loom to stack a liquid crystal microcapsule layer 9, thereby forming a liquid crystal layer 7. The liquid crystal microcapsule layer 9 was formed by parallelly aligning the liquid crystal microcapsules 6 with their major axes directed in one direction. The major-axis direction of the liquid crystal microcapsules 6 in the liquid crystal microcapsule layer 8 was perpendicular to that in the liquid crystal microcapsule layer 9.

A glass substrate having a transparent electrode on one major surface was placed on the liquid crystal layer 7 and pressed against the liquid crystal layer 7, thus completing the liquid crystal display device 1-2.

In the liquid crystal display device 1-2, the liquid crystal material in the liquid crystal microcapsules 6 contained 2 wt % of the dichroic dye. The thickness of the liquid crystal layer 7 was 20 μm.

When an AC voltage of 24 V at 50 Hz was applied across electrodes 4 and 5 of the liquid crystal display device 1-2, the display state changed from black in the absence of applied voltage to white. The contrast ratio obtained by a reflection densitometer was 10:1. This contrast was about twice that obtained when spherical liquid crystal microcapsules were used in place of the fibrous liquid crystal microcapsules 6. This improvement in contrast is probably attributed to an increase in light absorption efficiency of the dichroic dye in the absence of applied voltage.

EXAMPLE 12

A liquid crystal display device 1-2 shown in FIG. 12 was manufactured by the following method.

A liquid crystal material prepared by adding 2 wt % of a mixture of a dichroic dye represented by formulas (32) to (34) to a fluorine-based liquid crystal Lixon5052 available from Chisso was used. This liquid crystal material was deaerated in vacuum and vacuum-injected into a polymer tube having an inner diameter of 8 μm and an outer diameter of 10 μm. Fibrous liquid crystal microcapsules 6 were obtained by sealing the opening portions of this tube.

The liquid crystal display device was manufactured by the same method as in Example 11 except that the liquid crystal microcapsules 6 were used.

When an AC voltage of 10 V at 50 Hz was applied across electrodes 4 and 5 of the liquid crystal display device 1-2, the display state changed from black in the absence of applied voltage to white. The contrast ratio obtained by a reflection densitometer was 8:1.

EXAMPLE 13

Figure 22:
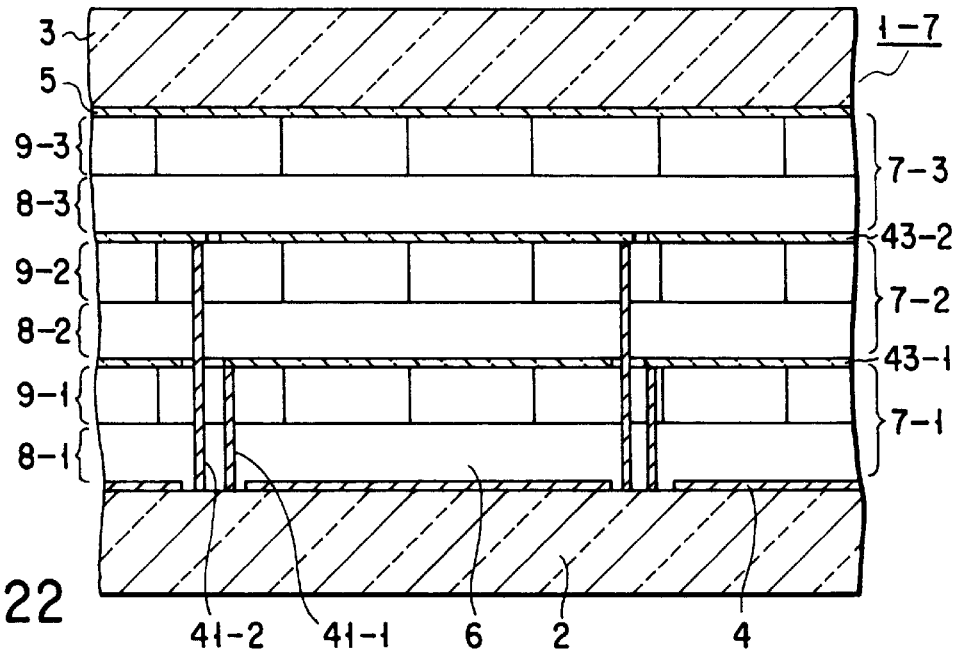
FIG. 22 is a sectional view schematically showing a liquid crystal display device of Example 13 of the present invention.

A liquid crystal display device 1-7 shown in FIG. 22 was manufactured by the following method. FIG. 22 is a sectional view showing the liquid crystal display device of Example 13 of the present invention.

Yellow, magenta, and cyan fibrous liquid crystal microcapsules 6-1 to 6-3 were prepared by the same method as in Example 11 except the composition of the liquid crystal material was changed. For the yellow fibrous liquid crystal microcapsules 6-1, a liquid crystal material prepared by adding 1.5 wt % of a mixture of dichroic dyes represented by formula (32) to a fluorine-based liquid crystal Lixon5052 available from Chisso was used. For the magenta fibrous liquid crystal microcapsules 6-2, a liquid crystal material prepared by adding 1.2 wt % of a mixture of dichroic dyes represented by formula (33) to the fluorine-based liquid crystal Lixon5052 available from Chisso was used. For the cyan fibrous liquid crystal microcapsules 6-3, a liquid crystal material prepared by adding 1.0 wt % of a mixture of dichroic dyes represented by formula (34) to the fluorine-based liquid crystal Lixon5052 available from Chisso was used.

Yellow liquid crystal microcapsule layers 8-1 and 9-1 were stacked on a glass substrate 2 having, on one major surface, three systems of switching elements (not shown) and an aluminum reflection electrode 4 by the same method as in Example 11 to form a liquid crystal layer 7-1.

An ITO film 43-1 was formed on the liquid crystal layer 7-1 by coating. Magenta liquid crystal microcapsule layers 8-2 and 9-2 were stacked by the same method as described above to form a liquid crystal layer 7-2. In addition, an ITO film 43-2 was formed on the liquid crystal layer 7-2 by coating, and cyan liquid crystal microcapsule layers 8-3 and 9-3 were stacked by the same method as described above to form a liquid crystal layer 7-3.

A glass substrate 3 having a transparent electrode 5 formed on one major surface was placed on the liquid crystal layer 7-3 and pressed against the liquid crystal layer 7-3, thus completing the liquid crystal display device 1-7.

In the liquid crystal display device 1-7, the reflection electrode 4 was connected to the source electrode of one of the three switching elements, and the ITO films 43-1 and 43-2 were connected to the source electrodes of the remaining systems through electrode columns 41-1 and 41-2, respectively.

In the liquid crystal display device 1-7, the thickness of each liquid crystal layer 7-n was 20 µm. When an AC voltage of 20 V at 50 Hz was applied to all liquid crystal layers of the liquid crystal display device 1-7, the display state changed from black in the absence of applied voltage to white. The contrast ratio obtained by a reflection densitometer was 10:1. Also the liquid crystal display device 1-7 was capable of clear color display.

EXAMPLE 14

A liquid crystal display device 1-2 shown in FIG. 12 was manufactured by the following method.

Figure 23:
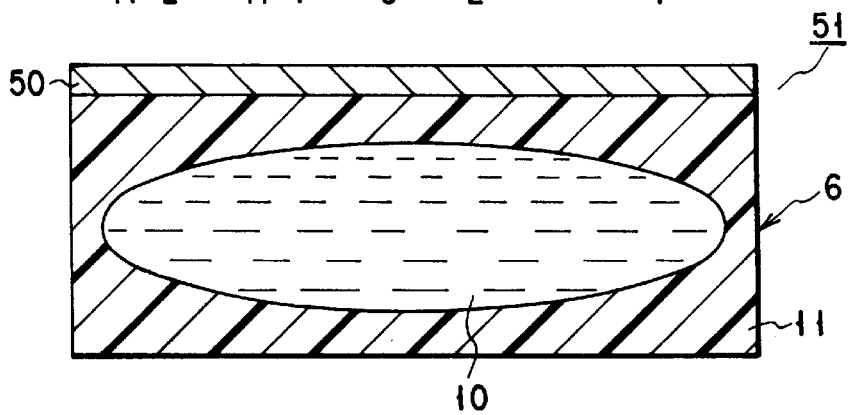
FIG. 23 is a sectional view showing a liquid crystal microcapsule used in the liquid crystal display device shown in FIG. 22.

A composite body 51 of a liquid crystal microcapsule 6 and an electrode 50 shown in FIG. 23 was manufactured using the fibrous liquid crystal microcapsule 6 prepared by the same method as in Example 11.

FIG. 23 is a sectional view showing a composite body of a liquid crystal microcapsule and an electrode used for the liquid crystal display device of Example 14 of the present invention. Referring to FIG. 23, the composite body 51 is comprised of the liquid crystal microcapsule 6 and the ITO film 50 formed on part of the surface of the liquid crystal microcapsule 6.

The fibrous composite bodies 51 were aligned on a transparent electrode 4 of a glass substrate 2 and pressed against the substrate 2 using a loom such that the surface with the ITO film 50 faced up to form a liquid crystal microcapsule layer 8. In the liquid crystal microcapsule layer 8, the composite bodies 51 were parallelly aligned with their major axes directed in one direction.

More fibrous liquid crystal microcapsules 6 were aligned on the liquid crystal microcapsule layer 8 and pressed against the liquid crystal microcapsule layer 8 using a loom to stack a liquid crystal microcapsule layer 9, thereby forming a liquid crystal layer 7. The liquid crystal microcapsule layer 9 was formed by parallelly aligning the liquid crystal microcapsules 6 with their major axes directed in one direction. The major-axis direction of the liquid crystal microcapsules 6 in the liquid crystal microcapsule layer 8 was perpendicular to that in the liquid crystal microcapsule layer 9.

A glass substrate having a transparent electrode on one major surface was placed on the liquid crystal layer 7 and pressed against the liquid crystal layer 7, thus completing the liquid crystal display device 1-2.

When an AC voltage of 20 V at 50 Hz was applied across electrodes 4 and 5 of the liquid crystal display device 1-2, the display state changed from black in the absence of applied voltage to white. The contrast ratio obtained by a reflection densitometer was 11:1. Since the liquid crystal display device 1-2 has an ITO film between the liquid crystal microcapsule layers 8 and 9, halftone display is possible by independently driving these layers. According to this example, since the ITO film patterning process can be omitted, the liquid crystal material less deteriorates.

In the above-described Examples 11 to 14, the liquid crystal LIXON5052 available from Chisso was used. However, LIXON5600 available from Chisso or ZLI132, 1221, 1557, 1565, 1636, 1694, 1695, 1701, 1738, 1780-000, 1840, or 2116 can also be used.

In Examples 11 to 14, dichroic dyes represented by formulas (32) to (34) were used. However, dichroic dyes represented by formulas (35) to (38) may be used.

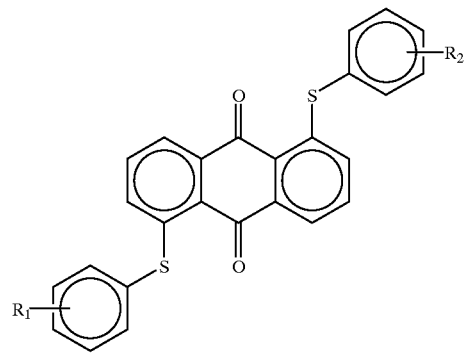

(35)

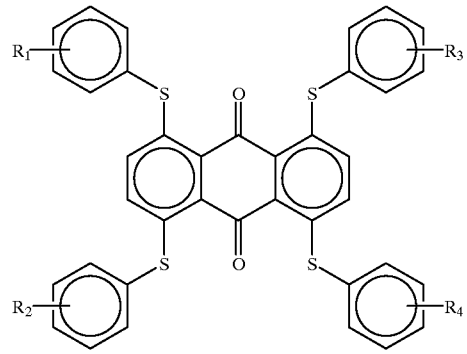

(36)

-continued

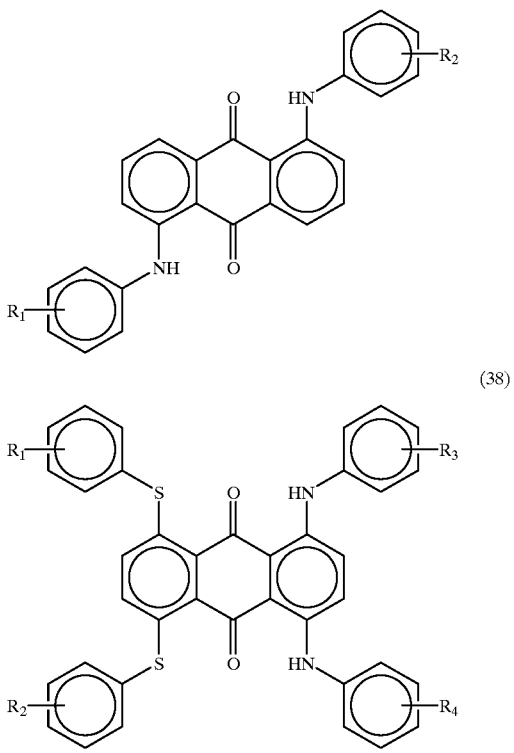

Formula (35) represents a yellow dichroic dye. Formulas (36) and (37) represent magenta dichroic dyes. Formula (38) represents a cyan dichroic dye. In formulas (35) to (38), each of $R_1$ to $R_4$ represents a hydrogen atom or an alkyl group such as a methyl group, ethyl group, an n-butyl group, or a t-butyl group.

In Examples 11 to 14, methyl methacrylate was used as a polymeric monomer. However, isobutyl methacrylate or the like may be used. As a photopolymerization initiator, benzoin ethers, dialkoxyacetophenones, hydroxyacetophenones, morpholinoacetophenones, banzophenones, cyclic benzophenones, or benzyls can also be used.

COMPARATIVE EXAMPLE 3

Liquid crystal microcapsules having an average grain size of 10 μm were prepared using the liquid crystal material used in Example 11. The liquid crystal microcapsules were dispersed into a predetermined solution to prepare a liquid crystal microcapsule coating solution. This liquid crystal microcapsule coating solution was applied to a glass substrate having an ITO film formed on one major surface, and dried to form a liquid crystal layer. A glass substrate having an ITO film formed on one major surface is heated and pressed against the liquid crystal layer in vacuum, thus completing a liquid crystal display device.

The resultant liquid crystal display device was observed with a microscope. In both liquid crystal microcapsule layers 8 and 9, each liquid crystal microcapsule 6 had a major axis with a length about 1.3 times the maximum value of the diameter perpendicular to the major axis. In the liquid crystal microcapsule layers 8 and 9, the liquid crystal microcapsules were aligned at random.

In the liquid crystal display device, the contrast ratio measured under the same conditions as in Example 11 was 6:1. As one of the reasons for the lower contrast ratio than that of the liquid crystal display device of Example 11, when spherical liquid crystal microcapsules are used, many dichroic dye molecules lie perpendicular to the substrate surface or make certain angles with the substrate surface even in the absence of applied voltage. That is, since the ratio of dichroic dye molecules aligned parallel to the substrate surface is low in the absence of applied voltage, the light absorption efficiency is reduced.

EXAMPLE 15

A liquid crystal display device shown in FIG. 19 was manufactured by the following method.

To manufacture a liquid crystal display device 1-5 shown in FIG. 19, a 2,000 Å thick ITO film 4 was deposited on a 1.1 mm thick glass substrate 2. A 2 μm thick resist film was formed on the ITO film 4 and patterned into a predetermined shape. The ITO film 4 was patterned into a stripe shape using the resist pattern as a mask.

A 2,000 Å thick ITO film 5 was deposited on a 1.1 mm thick glass substrate 3 and patterned into a stripe shape by the same method as described above.

Spheroidal liquid crystal microcapsules 6 having a 10 μm long minor axis and a 20 μm long major axis were prepared by the same method as in Example 1 except that a hydrophilic porous glass tube having an average pore size of 3.2 μm was used. The liquid crystal microcapsule 6 had a spherical shape in water.

The liquid crystal microcapsules 6 were applied to the surface of the glass substrate 2 having the ITO film 4 using a slit coater. This glass substrate 2 was mounted on a substrate support base 21 of a liquid crystal microcapsule aligning apparatus 20-1, as shown in FIG. 5. Vibration was applied to the glass substrate 2 by a solenoid vibrator 22 in one direction parallel to the substrate surface. With this process, the liquid crystal microcapsules 6 were aligned with their major axes directed in one direction to form a liquid crystal layer 7.

The glass substrate 3 was placed on the liquid crystal layer 7 such that the surface having the ITO film 5 came into contact with the liquid crystal layer 7 and the stripe patterns of the ITO films 4 and 5 were perpendicular to each other. This multilayered structure was pressed under heating in vacuum, and the side surface portion was sealed using a sealing agent, thus completing the liquid crystal display device 1-5.

When an AC voltage of 8 V at 50 Hz was applied across the electrodes 4 and 5 of the resultant liquid crystal display device 1-5, the transmission contrast ratio was 5:1.

EXAMPLE 16

A liquid crystal display device shown in FIG. 19 was manufactured by the same method as in Example 15 except the method of aligning liquid crystal microcapsules 6 on a substrate 2.

The glass substrate 2 having an ITO film 4 was mounted on a substrate support base 21 of a liquid crystal microcapsule aligning apparatus 20-2 shown in FIG. 6. The spheroidal liquid crystal microcapsules 6 used in Example 5 were discharged from a nozzle 26 onto the substrate 2 by vibrating the nozzle 26 by driving a solenoid vibrator 27. The liquid crystal microcapsules 6 were discharged while translating a hopper 25 and the substrate support base 21 relative to each other, thereby regularly aligning the liquid crystal microcapsules 6 on the substrate 2.

After completion of aligning the liquid crystal microcapsules 6 on the substrate 2, a solenoid vibrator 22 was driven to apply vibration to the glass substrate 2 in one direction parallel to the substrate surface. With this operation, the liquid crystal microcapsules 6 were more accurately aligned to form a liquid crystal layer 7.

The same glass substrate 3 as that used in Example 15 was placed on the liquid crystal layer 7 such that the surface having an ITO film 5 came into contact with the liquid crystal layer 7 and the stripe patterns of the ITO films 4 and 5 were perpendicular to each other. This multilayered structure was pressed while being heated in vacuum, and the side surface portion was sealed using a sealing agent, thus completing a liquid crystal display device 1-5.

When an AC voltage of 8 V at 50 Hz was applied across the electrodes 4 and 5 of the resultant liquid crystal display device 1-5, the transmission contrast ratio was 5:1.

EXAMPLE 17

A liquid crystal display device shown in FIG. 19 was manufactured by the same method as in Example 16 except that the shape of a liquid crystal microcapsule 6 was different and a liquid crystal microcapsule aligning apparatus 20-3 shown in FIG. 7 was used.

First, using the apparatus shown in FIG. 14, a solution mixture 35 containing a liquid crystal material with the same composition as that used in Example 9 was extruded from a hydrophilic porous glass film 47 having an average pore size of 10 $\mu$m into hot water 18 at 80° C. at a static pressure of 10 atm. With this process, a cylindrical liquid crystal microcapsule 6 having a diameter of 10 $\mu$m and a longitudinal-direction length of 100 mm was prepared.

A glass substrate 2 having an ITO film 4 was placed on a substrate support base 21 of the liquid crystal microcapsule aligning apparatus 20-3 shown in FIG. 7. A solenoid vibrator 27 was driven to vibrate a nozzle 26, so the cylindrical liquid crystal microcapsules 6 were discharged from the nozzle 26 onto the substrate 2. The liquid crystal microcapsules 6 were discharged while translating a hopper 25 and substrate support base 21 relative to each other, thereby regularly aligning the liquid crystal microcapsules 6 on the substrate 2.

After completion of aligning the liquid crystal microcapsules 6 on the substrate 2, a solenoid vibrator 22 was driven -to apply vibration to the glass substrate 2 in one direction parallel to the substrate surface. With this operation, the liquid crystal microcapsules 6 were more accurately aligned to form a liquid crystal layer 7.

The same glass substrate 3 as that used in Example 16 was placed on the liquid crystal layer 7 such that the surface having an ITO film 5 came into contact with the liquid crystal layer 7 and the stripe patterns of the ITO films 4 and 5 were perpendicular to each other. This multilayered structure was pressed while being heated in vacuum, and the side surface portion was sealed using a sealing agent, thus completing a liquid crystal display device 1-5.

When an AC voltage of 10 V at 50 Hz was applied across the electrodes 4 and 5 of the resultant liquid crystal display device 1-5, the transmission contrast ratio was 5:1.

EXAMPLE 18

A liquid crystal display device 1-5 shown in FIG. 19 was manufactured by the following method.

A glass substrate 2 having an ITO film 4 was mounted on a substrate support base 21 of a liquid crystal microcapsule aligning apparatus 20-4 shown in FIG. 15. A solution mixture having the same composition as that used in Example 9 was discharged from a nozzle 26 of the liquid crystal microcapsule aligning apparatus 20-4 onto the substrate 2. The opening portion of the nozzle 26 had a diameter of 10 $\mu$m. The solution mixture was discharged from the nozzle 26 in the air while applying a static pressure of 5 atm.

The solution mixture formed a fibrous liquid crystal microcapsule 6 almost simultaneously with discharge. The liquid crystal microcapsules 6 were discharged while translating a hopper 25 and substrate support base 21 relative to each other, thereby regularly aligning the liquid crystal microcapsules 6 on the substrate 2.

After completion of aligning the liquid crystal microcapsules 6 on the substrate 2, a solenoid vibrator 22 was driven to apply vibration to the glass substrate 2 in one direction parallel to the substrate surface. With this operation, the liquid crystal microcapsules 6 were more accurately aligned to form a liquid crystal layer 7.

The same glass substrate 3 as that used in Example 16 was placed on the liquid crystal layer 7 such that the surface having an ITO film 5 came into contact with the liquid crystal layer 7 and the stripe patterns of the ITO films 4 and 5 were perpendicular to each other. This multilayered structure was pressed while being heated in vacuum, and the side surface portion was sealed using a sealing agent, thus completing the liquid crystal display device 1-5.

When an AC voltage of 8 V at 50 Hz was applied across the electrodes 4 and 5 of the resultant liquid crystal display device 1-5, the transmission contrast ratio was 5:1. Liquid crystal display devices were manufactured by the same methods as in Examples 15 to 18 except that a thin film transistor was formed on the substrate 2. When an AC voltage of 8 V at 50 Hz was applied across the electrodes 4 and 5 of each liquid crystal display device, the transmission contrast ratio was 5:1in all liquid crystal display devices.

EXAMPLE 19

A liquid crystal display device 1-1 shown in FIG. 1 was manufactured by the following method. This will be described with reference to FIGS. 24A to 24C and FIGS. 25A to 25C. FIGS. 24A to 24C and FIGS. 25A to 25C are side and plan views, respectively, schematically showing the method of forming a liquid crystal microcapsule layer of Example 19 of the present invention.

A liquid crystal material prepared by adding 1 wt % of black dichroic dye S-435 available from Mitsui Toatsu Chemicals to Lixon-5065xx available from Chisso was used. Eighty parts by weight of this liquid crystal material, 14 parts by weight of methyl methacrylate as a monomer having hydrophilic groups, 1 part by weight of divinyl benzene as a crosslinker, and 0.2 parts by weight of benzoyl peroxide as a crosslinker were mixed and dissolved. Using an emulsifier available from Ise Kagaku, the resultant solution mixture was extruded from pores of a hydrophilic porous glass tube having an average pore size of 1 $\mu$m into a 0.3 wt % aqueous solution of polyvinyl alcohol at a static pressure of 1.5 atm to obtain an emulsion.

This emulsion was stirred at a temperature of 85° C. and a stirring speed of 50 rpm for 1 hr to polymerize the monomer component. After one hour, the product was poured into a porous tube of an ion exchange resin together with pure water to purify the product, thereby obtaining liquid crystal microcapsules 6. The liquid crystal microcapsules 6 had excellent dispersion properties for water or the like. Even when a dispersion obtained by dispersing the liquid crystal microcapsules 6 into water or the like was left to stand for one day, no coagulation occurred.

When the particle size distribution of the liquid crystal microcapsules 6 was measured by laser scattering, the average grain size was 5 µm, and the distribution width was narrow. When the liquid crystal microcapsules were observed with a microscope, the liquid crystal microcapsules had a spherical shape.

Figure 24A:
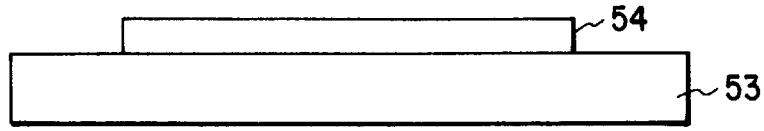
FIGS. 24A to 24C are side views schematically showing a method of manufacturing a liquid crystal display device of Example 19 of the present invention.
Figure 24B:
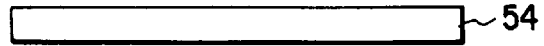
Figure 24C:
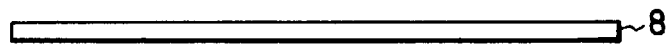

A liquid crystal microcapsule coating solution containing 55 wt % of liquid crystal microcapsules 6 and 5 wt % of polyvinyl alcohol in water was prepared. This liquid crystal microcapsule coating solution was applied to a polyethylene film 53 and dried to form a coat 54, as shown in FIG. 24A. The thickness of the coat 54 was 7 µm. The coat 54 was peeled from the polyethylene film 53, as shown in FIG. 24B. The coat 54 was pulled until the thickness became 5 µm while holding the two end portions, as shown in FIG. 24C. With this process, a liquid crystal microcapsule layer 8 was formed.

Figure 25A:
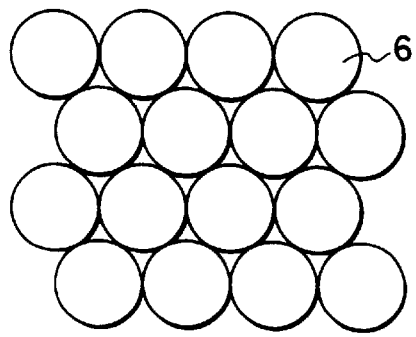
FIGS. 25A to 25C are side views schematically showing the method of manufacturing the liquid crystal display device of Example 19 of the present invention.
Figure 25B:
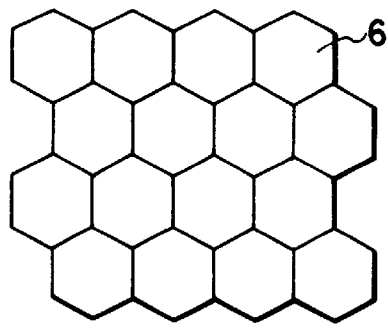
Figure 25C:
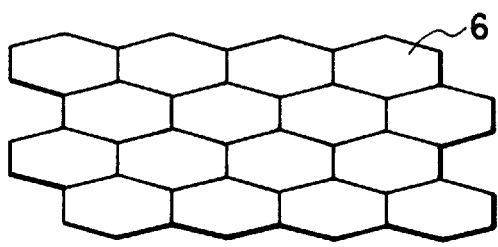

In the above process, the liquid crystal microcapsules 6 deformed as shown in FIGS. 25A to 25C. Immediately after the liquid crystal microcapsule coating solution was applied to the polyethylene film 53, the liquid crystal microcapsules 6 in the coat 54 had a spherical shape as shown in FIG. 25A. As the coat 54 was dried, the contact area between the adjacent liquid crystal microcapsules 6 increased, so the liquid crystal microcapsules 6 had a regular hexagonal shape, as shown in FIG. 25B. This shape was maintained even after the coat 54 was peeled from the polyethylene film 53. However, when the coat 54 was pulled, as described above, the liquid crystal microcapsules 6 were stretched in the pulling direction, as shown in FIG. 25C. That is, the liquid crystal microcapsules 6 in the liquid crystal microcapsule layer 8 had the shape shown in FIG. 25C.

Figure 26:
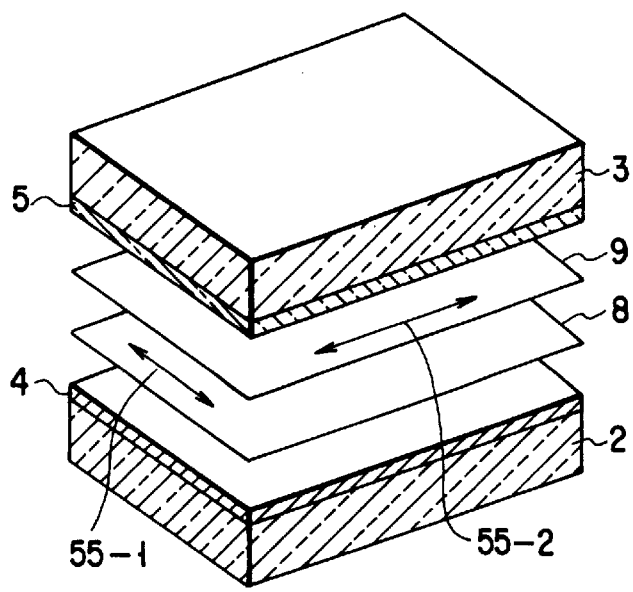
FIG. 26 is a perspective view schematically showing the method of manufacturing the liquid crystal display device of Example 19 of the present invention.

After formation of the liquid crystal microcapsule layer 8, a liquid crystal microcapsule layer 9 was formed by the same method. The liquid crystal microcapsule layers 8 and 9 were inserted between a glass substrate 2 having an aluminum reflection electrode 4 and a substrate 3 having an ITO transparent electrode 5. The liquid crystal microcapsule layers 8 and 9 were stacked such that pulling directions 55-1 and 55-2 were perpendicular to each other, as shown in FIG. 26. The substrate 3 was pressed against the substrate 2 at 120° C. and 5 Torr, thus completing the liquid crystal display device 1-1 shown in FIG. 1.

The liquid crystal display device 1-1 was observed with a microscope. Destruction of the transparent films of the liquid crystal microcapsules 6 was not confirmed. The thickness of a liquid crystal layer 7 was 10 µm. In both the liquid crystal microcapsule layers 8 and 9, the major axis of each liquid crystal microcapsule 6 had a length about 2.5 times the maximum value of the diameter perpendicular to the major axis. The alignment direction of liquid crystal molecules was parallel to the substrate surface, and the liquid crystal molecules in the liquid crystal microcapsule layer 8 were aligned perpendicular to those in the liquid crystal microcapsule layer 9.

When an AC voltage of 10 V at 50 Hz was applied across the electrodes 4 and 5 of the resultant liquid crystal display device 1-1, the display state changed from black in the absence of applied voltage to white. The contrast ratio obtained by a reflection densitometer was 6.2:1.

EXAMPLE 20

A liquid crystal display device 1-1 shown in FIG. 1 was manufactured by the following method. This will be described with reference to FIGS. 27A and 27B. FIGS. 27A and 27B are plan views schematically showing the method of forming a liquid crystal layer of Example 20 of the present invention.

The same liquid crystal microcapsule coating solution as in Example 19 was applied to an aluminum reflection electrode 4 formed on a glass substrate 2 to form a coat 54 as shown in FIG. 27A. This coat 54 was sequentially heated to 90° C. at a rate of 2 cm/min and dried from an end portion to the end portion on the opposite side to form a liquid crystal layer 7. That is, as shown in FIG. 27A, a heated region 56 was moved in a direction 55-3 to form the liquid crystal layer 7.

The liquid crystal layer 7 was observed with a microscope. Liquid crystal microcapsules 6 had a shape stretched in a direction 55-1 perpendicular to the heating direction 55-3. The liquid crystal layer 7 had a thickness of 10 µm and a structure in which three liquid crystal microcapsule layers were stacked.

A disk 57 shown in FIG. 27B was heated to 90° C. The surface of the substrate 2 having the liquid crystal layer 7 was brought into contact with the surface of the disk 57. The disk 57 was slowly rotated ¼ of a revolution about a rotary shaft 58 while pressing the substrate 2 against the disk 57 at a pressure of 1 kg/cm². The surface of the disk 57 was treated with a fluoroplastic. The substrate 2 was set such that the straight line connecting the center of the substrate and the rotary shaft 58 was parallel to the alignment direction 55-1 of the major axes of the liquid crystal microcapsules 6. The minimum distance from the rotary shaft 58 to the substrate 2 was 2 cm.

When the disk 57 was rotated, the liquid crystal microcapsules 6 in contact with the disk 57 were stretched in a rotating direction 55-2 of the disk 57. If the minimum distance from the rotary shaft 58 to the substrate 2 is sufficiently large, the liquid crystal microcapsules 6 in contact with the disk 57 are stretched in virtually one direction. The liquid crystal microcapsules 6 which are not in contact with the disk 57 do not deform as far as the pressure applied to the substrate 2 is sufficiently low.

According to the above-described method, the direction of the major axes of the liquid crystal microcapsules 6 in a liquid crystal microcapsule layer 8 in contact with the reflection electrode 4 can be made perpendicular to that in an uppermost liquid crystal microcapsule layer 9.

After the disk 57 was rotated, the substrate 2 was quickly removed from the disk 57. A flat plate at room temperature was brought into contact with the surface of the substrate 2 having the liquid crystal layer 7 to rapidly cool the liquid crystal layer 7. On the other hand, an epoxy resin was applied to a transparent electrode 5 on a glass substrate 3 to form a coat (not shown) having a thickness of 1 µm. After the flat plate was peeled from the liquid crystal layer 7, the substrates 2 and 3 were stacked such that the liquid crystal layer 7 came into contact with the coat formed on the transparent electrode 5. The resultant structure was pressed and heated to 80° C., thus completing the liquid crystal display device 1-1 shown in FIG. 1.

The liquid crystal display device 1-1 was observed with a microscope. Destruction of the transparent films of the liquid crystal microcapsules 6 was not confirmed. The thickness of the liquid crystal layer 7 was 10 µm. In both the liquid crystal microcapsule layers 8 and 9, the major axis of each liquid crystal microcapsule 6 had a length about 2.4 times the maximum value of the diameter perpendicular to the major axis. The alignment direction of liquid crystal molecules was parallel to the substrate surface. The alignment direction of the liquid crystal molecules in the liquid crystal microcapsule layer 8 was nearly perpendicular to that in the liquid crystal microcapsule layer 9.

When an AC voltage of 10 V at 50 Hz was applied across the electrodes 4 and 5 of the liquid crystal display device 1-1, the display state changed from black in the absence of applied voltage to white. The contrast ratio obtained by a reflection densitometer was 6.2:1.

EXAMPLE 21

A liquid crystal display device 1-1 shown in FIG. 1 was manufactured by the following method.

The same liquid crystal microcapsule coating solution as in Example 19 was applied to an aluminum reflection electrode 4 formed on a glass substrate 2 to form a coat. This coat was sequentially heated to 90° C. at a rate of 2 cm/min and dried from an end portion to the end portion on the opposite side to form a liquid crystal microcapsule layer 8 having a thickness of 5 $\mu$m, as in Example 20.

The liquid crystal microcapsule coating solution was applied to the liquid crystal microcapsule layer 8 to form a coat. This coat was dried by the same method as described above except that the drying direction was rotated through 90°, thereby forming a liquid crystal microcapsule layer 9 having a thickness of 5 $\mu$m. With this process, a liquid crystal layer 7 having the liquid crystal microcapsule layers 8 and 9 was formed.

An epoxy resin was applied to a transparent electrode 5 on a glass substrate 3 to form a coat (not shown) having a thickness of 1 $\mu$m. After this, the substrates 2 and 3 were stacked at a low pressure of 5 Torr or less such that the liquid crystal layer 7 came into contact with the coat formed on the transparent electrode 5. The resultant structure was pressed and heated to 120° C. With this process, the substrates 2 and 3 were bonded, thus completing the liquid crystal display device 1-1 shown in FIG. 1.

The liquid crystal display device 1-1 was observed with a microscope. Destruction of the transparent films of the liquid crystal microcapsules 6 was not confirmed. The thickness of the liquid crystal layer 7 was 10 $\mu$m. In both the liquid crystal microcapsule layers 8 and 9, the major axis of each liquid crystal microcapsule 6 had a length about 2.3 times the maximum value of the diameter perpendicular to the major axis. The alignment direction of liquid crystal molecules was parallel to the substrate surface. The alignment direction of the liquid crystal molecules in the liquid crystal microcapsule layer 8 was perpendicular to that in the liquid crystal microcapsule layer 9.

When an AC voltage of 10 V at 50 Hz was applied across the electrodes 4 and 5 of the liquid crystal display device 1-1, the display state changed from black in the absence of applied voltage to white. The contrast ratio obtained by a reflection densitometer was 5.8 1.

EXAMPLE 22

A liquid crystal display device 1-1 shown in FIG. 1 was manufactured by the following method.

The same liquid crystal microcapsule coating solution as in Example 19 was applied to an aluminum reflection electrode 4 formed on a glass substrate 2 to form a coat. This coat was sequentially heated and dried from an end portion to the end portion on the opposite side using a far infrared heater to form a liquid crystal microcapsule layer 8, as in Example 20.

The liquid crystal microcapsule coating solution was applied to a transparent electrode 5 on a glass substrate 3 to form a coat. This coat was dried by the same method as described above, thereby forming a liquid crystal microcapsule layer 9 having a thickness of 5 $\mu$m.

The substrates 2 and 3 were stacked such that the liquid crystal microcapsule layers 8 and 9 came into contact with each other, and the drying directions were perpendicular to each other. The resultant multilayered structure was put in a polyamide bag. The structure was heated to 120° C. while reducing the pressure in the polyamide bag to joint the polyamide bag and members, thus completing the liquid crystal display device 1-1 shown in FIG. 1.

The liquid crystal display device 1-1 was observed with a microscope. Destruction of the transparent films of liquid crystal microcapsules 6 was not confirmed. The thickness of the liquid crystal layer 7 was 18 $\mu$m. In both the liquid crystal microcapsule layers 8 and 9, the major axis of each liquid crystal microcapsule 6 had a length about 3.2 times the maximum value of the diameter perpendicular to the major axis. The alignment direction of liquid crystal molecules was parallel to the substrate surface. The alignment direction of the liquid crystal molecules in the liquid crystal microcapsule layer 8 was perpendicular to that in the liquid crystal microcapsule layer 9.

When an AC voltage of 10 V at 50 Hz was applied across the electrodes 4 and 5 of the liquid crystal display device 1-1, the display state changed from black in the absence of applied voltage to white. The contrast ratio obtained by a reflection densitometer was 12:1.

EXAMPLE 23

A liquid crystal display device 1-1 shown in FIG. 1 was manufactured by the following method.

A liquid crystal material prepared by adding 1 wt % of black dichroic dye S-435 available from Mitsui Toatsu Chemicals to Lixon-5052xx as a fluorine-based liquid crystal available from Chisso was used. Eighty parts by weight of this liquid crystal material and 14 parts by weight of isobutyl fumarate as a prepolymer having hydrophilic groups were mixed and dissolved. Using a film emulsifier available from Ise Kagaku, the resultant solution mixture was extruded from pores of a hydrophilic porous glass tube with an average pore size of 1 $\mu$m into a 0.3 wt % aqueous solution of polyvinyl alcohol at a static pressure of 1.5 atm, thereby obtaining an emulsion.

0.5 wt % of TMPTA and 0.2 wt % of benzoyl peroxide were added to the emulsion. The mixture was stirred at a temperature of 85° C. and a stirring speed of 50 rpm for 1 hr to polymerize the monomer component. After one hour, the product was poured into a porous tube consisting of an ion exchange resin together with pure water and purified, thereby obtaining liquid crystal microcapsules 6. The liquid crystal microcapsules 6 had excellent dispersion properties for water or the like. Even when a dispersion obtained by dispersing the liquid crystal microcapsules 6 into water or the like was left to stand for one day, no coagulation took place.

When the particle size distribution of the liquid crystal microcapsules 6 was measured by laser scattering, the average grain size was 5 $\mu$m, and the distribution width was narrow. When the liquid crystal microcapsules were observed with a microscope, the liquid crystal microcapsules had a spherical shape.

The liquid crystal microcapsules 6 and an ester polymer S-102 having heat-resistance crosslinking groups, available from Takamatsu Yusi, were added to water to prepare a liquid crystal microcapsule coating solution. This liquid crystal microcapsule coating solution was applied to an aluminum reflection electrode 4 formed on a glass substrate 2 to form a coat. This coat was sequentially heated and dried from an end portion to the end portion on the opposite side using a far infrared heater to form a liquid crystal microcapsule layer 8, as in Example 20.

The liquid crystal microcapsule coating solution was applied to the liquid crystal microcapsule layer 8 to form a coat. This coat was dried by the same method as described above except that the drying direction was rotated through 90°, thereby forming a liquid crystal microcapsule layer 9. With this process, a liquid crystal layer 7 having the liquid crystal microcapsule layers 8 and 9 was formed.

A glass substrate 3 having a transparent electrode 5 was placed on the liquid crystal layer 7. The resultant multilayered structure was put in a polyamide bag. The structure was heated to 120° C. while reducing the pressure in the polyamide bag to joint the polyamide bag and members, thus completing the liquid crystal display device 1-1 shown in FIG. 1.

The liquid crystal display device 1-1 was observed with a microscope. Destruction of the transparent films of liquid crystal microcapsules 6 was not confirmed. The thickness of the liquid crystal layer 7 was 20 $\mu$m. In both the liquid crystal microcapsule layers 8 and 9, the major axis of each liquid crystal microcapsule 6 had a length about 3.1 times the maximum value of the diameter perpendicular to the major axis. The alignment direction of liquid crystal molecules was parallel to the substrate surface. The alignment direction of the liquid crystal molecules in the liquid crystal microcapsule layer 8 was perpendicular to that in the liquid crystal microcapsule layer 9.

When an AC voltage of 11 V at 50 Hz was applied across the electrodes 4 and 5 of the liquid crystal display device 1-1, the display state changed from black in the absence of applied voltage to white. The contrast ratio obtained by a reflection densitometer was 10:1.

EXAMPLE 24

A liquid crystal display device 1-1 shown in FIG. 1 was manufactured by the following method.

A liquid crystal material prepared by adding 1 wt % of black dichroic dye S-435 available from Mitsui Toatsu Chemicals to Lixon-4033-000xx having a positive dielectric anisotropy, available from Chisso, was used. Eighty parts by weight of this liquid crystal material, 14 parts by weight of methyl methacrylate as a monomer, 1 part by weight of divinyl benzene as a crosslinker, and 0.2 parts by weight of benzoyl peroxide as a crosslinker were mixed and dissolved. Using a film emulsifier available from Ise Kagaku, the resultant solution mixture was extruded from pores of a hydrophilic porous glass tube with an average pore size of 1 $\mu$m into a 0.3 wt % aqueous solution of polyvinyl alcohol at a period of 1 Hz, maximum pressure of 1.6 atm, and minimum pressure of 1.2 atm, thereby obtaining an emulsion.

The emulsion was stirred at a temperature of 85° C. and a stirring speed of 50 rpm for 1 hr to polymerize the monomer components. After one hour, the product was poured into a porous tube consisting of an ion exchange resin together with pure water and purified, thereby obtaining liquid crystal microcapsules 6. The liquid crystal microcapsules 6 had excellent dispersion properties for water or the like. Even when a dispersion obtained by dispersing the liquid crystal microcapsules 6 into water or the like was left to stand for one day, no coagulation occurred.

When The particle size distribution of the liquid crystal microcapsules 6 was measured by laser scattering, the average grain size was 6 $\mu$m, and the distribution width was narrow. When the liquid crystal microcapsules were observed with a microscope, the liquid crystal microcapsules had a spherical shape.

A polyimide film was formed on an aluminum reflection electrode 4 formed on a glass substrate 2, and rubbed to form an alignment film (not shown). A liquid crystal microcapsule coating solution prepared by dispersing the liquid crystal microcapsules 6 into a predetermined solution was applied to the alignment film to form a coat. This coat was sequentially heated and dried from an end portion to the end portion on the opposite side using a far infrared heater to form a liquid crystal microcapsule layer 8, as in Example 20. The drying direction of the coat was perpendicular to the rubbing direction of the alignment film.

A polyimide film was formed on a transparent electrode 5 formed on a glass substrate 3, and rubbed to form an alignment film (not shown). A liquid crystal microcapsule layer 9 was formed on the alignment film by the same method as described above.

The substrates 2 and 3 were stacked such that the liquid crystal microcapsule layers 8 and 9 came into contact with each other, and the drying directions were perpendicular to each other. The resultant multilayered structure was put in a polyamide bag. The structure was heated to 120° C., while reducing the pressure in the polyamide bag to joint the polyamide bag and members, thus completing the liquid crystal display device 1-1 shown in FIG. 1.

The liquid crystal display device 1-1 was observed with a microscope. Destruction of the transparent films of liquid crystal microcapsules 6 was not confirmed. The thickness of the liquid crystal layer 7 was 20 $\mu$m. In both the liquid crystal microcapsule layers 8 and 9, the major axis of each liquid crystal microcapsule 6 had a length about 38 times the maximum value of the diameter perpendicular to the major axis. The alignment direction of liquid crystal molecules was parallel to the substrate surface. The alignment direction of the liquid crystal molecules in the liquid crystal microcapsule layer 8 was perpendicular to that in the liquid crystal microcapsule layer 9.

When an AC voltage of 9 V at 50 Hz was applied across the electrodes 4 and 5 of the liquid crystal display device 1-1, the display state changed from black in the absence of applied voltage to white. The contrast ratio obtained by a reflection densitometer was 15:1.

EXAMPLE 25

A liquid crystal display device 1-3 shown in FIG. 17 was manufactured by the following method.

Spherical liquid crystal microcapsules 6 having an average grain size of 7 $\mu$m were prepared by emulsion polymerization. For the liquid crystal microcapsules 6, a liquid crystal material prepared by adding 1 wt % of dichroic dye G232 available from Nippon Kanko Shikiso to ZLI5052 available from Merck Japan was encapsulated with polymethyl methacrylate (PMMA). The light absorption range of the dichroic dye G232 is 600 nm to 500 nm. The maximum absorption wavelength is about 550 nm.

A liquid crystal microcapsule coating solution prepared by dispersing the liquid crystal microcapsules 6 into a predetermined solution was applied to a surface of a glass substrate 2 having an ITO film 4 by screen printing to form a coat having a thickness of 10 µm. This coat was sequentially heated and dried from an end portion to the end portion on the opposite side to form a liquid crystal microcapsule layer 8, as in Example 20. In the liquid crystal microcapsule layer 8, the liquid crystal microcapsules 6 were stretched in a direction perpendicular to the drying direction.

A λ/2-wavelength plate 14 was placed on the liquid crystal microcapsule layer 8. As the λ/2-wavelength plate 14 available from Nitto Denko was used. This λ/2-wavelength plate 14 is a polymer film having a thickness of about 200 µm. The normal wavelength of the λ/2-wavelength plate 14 is 450 nm. The λ/2-wavelength plate 14 was placed such that its optical axes formed an angle of 45° with respect to the major axis of the liquid crystal microcapsule 6.

A liquid crystal microcapsule layer 9 was formed on the λ/2-wavelength plate 14 by the same method as described above. The liquid crystal microcapsule layer 9 was formed such that the major-axis direction of the liquid crystal microcapsules 6 formed an angle of 45° with respect to the optical axis of the λ/2-wavelength plate 14.

A glass substrate 3 having a transparent electrode 5 was placed on the liquid crystal microcapsule layer. The resultant structure was left to stand for several hrs in an oven controlled to 100° C. while pressing the λ/2-wavelength plate 14 against the substrate 3. The side surface portion of this multilayered structure was sealed, thus completing the liquid crystal display device 1-3.

The liquid crystal display device 1-3 was observed with a microscope. Destruction of the transparent films of liquid crystal microcapsules 6 was not confirmed. In both the liquid crystal microcapsule layers 8 and 9, the major axis of each liquid crystal microcapsule 6 had a length about 2.1 times the maximum value of the diameter perpendicular to the major axis. The alignment direction of liquid crystal molecules was parallel to the substrate surface. The alignment direction of the liquid crystal molecules in the liquid crystal microcapsule layer 8 was parallel to that in the liquid crystal microcapsule layer 9.

When an AC voltage of 12 V at 50 Hz was applied across the electrodes 4 and 5 of the liquid crystal display device 1-3, the display state changed from black in the absence of applied voltage to white. The contrast ratio obtained by a reflection densitometer was 5:1.

EXAMPLE 26

A liquid crystal display device shown in FIG. 28 was manufactured by the following method. FIG. 28 is a sectional view schematically showing the liquid crystal display device of Example 26 of the present invention.

Spherical liquid crystal microcapsules 6-1 having an average grain size of 7 µm were prepared by in situ polymerization. For the liquid crystal microcapsules 6-1, a liquid crystal material prepared by adding 1 wt % of a yellow dichroic dye 9232 available from Nihon Kanko Shikiso to LIXON 5052 available from Chisso was encapsulated with a polymer of di-isobutyl fumarate (DIBF). The light absorption range of the yellow dichroic dye is 500 nm to 400 nm. The maximum absorption wavelength is about 450 nm.

Cyan liquid crystal microcapsules 6-2 were prepared by the same method as that for the yellow liquid crystal microcapsules 6-1 except that a cyan dichroic dye 5I497 available from Mitsui Toatsu was used. In addition, magenta liquid crystal microcapsules 6-3 were prepared by the same method as that for the yellow liquid crystal microcapsules 6-1 except that a magenta dichroic dye g176 available from Nihon Kanko Shikiso was used. The light absorption range of the cyan dichroic dye is 700 nm to 600 nm. The maximum absorption wavelength is approximately 650 nm. The light absorption range of the magenta dichroic dye is 600 nm to 500 nm. The maximum absorption wavelength is approximately 550 nm.

Three systems of TFTs and gate/signal interconnections 40 were formed for each pixel on a glass substrate 2 having a thickness of 1.1 mm. A 2 µm thick undercoat 30 of polyimide was formed. This undercoat 30 was embossed to form dimples in the surface of the undercoat 30. A 1,000 Å thick aluminum film was formed on the embossed undercoat 30 and patterned to form a reflection electrode 4.

The reflection electrode 4 was connected to the source electrode of one of the three TFTs. Ten µm high electrode columns 41-1 and 41-2 were formed on the source electrodes of the remaining two TFTs.

Using a liquid crystal microcapsule coating solution prepared by dispersing the yellow liquid crystal microcapsules 6-1 into a predetermined solution, a liquid crystal microcapsule layer 8-1, λ/2-wavelength plate 14-1, and liquid crystal microcapsule layer 9-1 were sequentially formed on the reflection electrode 4 by the same method as in Example 25. That is, a yellow liquid crystal layer 7-1 was formed. A hole was formed in the λ/2-wavelength plate 14-1 at a position corresponding to the electrode columns 41-1 and 41-2. The λ/2-wavelength plate 14-1 used is available from Nitto Denko was used. This λ/2-wavelength plate 14-1 is a polymer film having a thickness of about 200 µm. The normal wavelength of the λ/2-wavelength plate 14-1 is 450 nm.

ITO films each having a thickness of 500 Å were formed on two surfaces of a transparent film 60-1 as an intermediate substrate having a thickness of 100 µm. These ITO films were patterned to conform to the pixel electrode 4, thereby forming a pixel electrode 43-1. After this, a hole having a predetermined pattern was formed in the transparent film 60-1 by punching, and a 10 µm high electrode column 41-3 extending through the hole was formed. The electrode column 41-3 and the pixel electrode 43-1 were electrically insulated from each other.

The transparent film 60-1 was placed on the liquid crystal layer 7-1 such that its lower surface from which the electrode column 41-3 projected opposed the liquid crystal layer 7-1, and the electrode columns 41-2 and 41-3 were electrically connected. After this, using a liquid crystal microcapsule coating solution prepared by dispersing the cyan liquid crystal microcapsules 6-2 into a predetermined solution, a liquid crystal microcapsule layer 8-2, λ/2-wavelength plate 14-2, and liquid crystal microcapsule layer 9-2 were sequentially formed on the transparent film 60-1 by the same method as in Example 25. That is, a cyan liquid crystal layer 7-2 was formed. A hole was formed in the λ/2-wavelength plate 14-2 at a position corresponding to the electrode column 41-3. The λ/2-wavelength plate 14-2 used is available from Nitto Denko. This λ/2-wavelength plate 14-2 is a polymer film having a thickness of about 200 µm. The normal wavelength of the λ/2-wavelength plate 14-2 is 650 nm.

An ITO counter electrode 5 was formed on a 1.1 mm thick glass substrate 3 by sputtering. Using a liquid crystal microcapsule coating solution prepared by dispersing the magenta liquid crystal microcapsules 6-3 into a predetermined solution, a liquid crystal microcapsule layer 8-3, λ/2-wavelength plate 14-3, and liquid crystal microcapsule layer 9-3 were sequentially formed on the counter electrode 5 by the same method as in Example 25. That is, a magenta liquid crystal layer 7-3 was formed. The λ/2-wavelength plate 14-3 used is available from Nitto Denko. This λ/2-wavelength plate 14-3 is a polymer film having a thickness of about 200 μm. The normal wavelength of the λ/2-wavelength plate 14-3 is 550 nm.

ITO films each having a thickness of 500 Å were formed on two surfaces of a transparent film 60-2 as an intermediate substrate having a thickness of 100 μm. These ITO films were patterned to conform to the pixel electrode 4, thereby forming a pixel electrode 43-2. After this, a titanium oxide layer 61 was formed on one major surface of the transparent film 60-2 parallel to the pixel electrode 43-2. The titanium oxide layer 61 was used as a black matrix.

The transparent film 60-2 was placed on the liquid crystal layer 7-2 such that pixel electrode 43-2 opposed the liquid crystal layer 7-2, and the pixel electrode 43-2 was electrically connected to the electrode column 41-3. The substrate 3 was heated and pressed against the λ/2-wavelength plate 14, thus completing a liquid crystal display device 1-7.

The liquid crystal display device 1-3 was observed with a microscope. Destruction of the transparent films of liquid crystal microcapsules 6-1 to 6-3 was not confirmed. In all the liquid crystal microcapsule layers 8-n and 9-n, the major axis of each of the liquid crystal microcapsules 6-1 to 6-3 had a length about 2 times the maximum value of the diameter perpendicular to the major axis. In all the liquid crystal layers 7-1 to 7-3, the alignment direction of liquid crystal molecules was roughly parallel to the substrate surface. The alignment direction of the liquid crystal molecules in the liquid crystal microcapsule layer 8-n was parallel to that in the liquid crystal microcapsule layer 9-n.

When a driver IC was mounted on the liquid crystal display device 1-7 by TAB, and an AC voltage having a maximum signal amplitude of 5 V was applied across the electrodes, the display state changed from black in the absence of applied voltage to white. The contrast ratio obtained by a reflection densitometer was 5:1. This liquid crystal display device allowed color display with satisfactory color tone.

EXAMPLE 27

A liquid crystal display device 1-1 shown in FIG. 1 was manufactured by the following method. In this example, the liquid crystal material contains no dichroic dye.

Ninety-two parts by weight of a fluorine-based liquid crystal Lixon-5052xx having a large refractive index anisotropy Δn, available from Chisso, 4 parts by weight of di-isobutyl fumarate as a monomer, 0.8 parts by weight of divinyl benzene as a crosslinker, and 0.2 parts by weight of benzoyl peroxide as a crosslinker were mixed and dissolved. Using a film emulsifier available from Ise Kagaku, this solution mixture was extruded from pores of a hydrophilic porous glass tube with an average pore size of 1 μm into a 0.3 wt % aqueous solution of polyvinyl alcohol (molecular weight: 1000) at a static pressure of 1.5 atm, thereby obtaining an emulsion.

This emulsion was stirred at a temperature of 90° C. and a stirring speed of 50 rpm for 1 hr to polymerize the monomer components. After one hour, the product was poured into a porous tube of an ion exchange resin together with pure water to purify the product, thereby obtaining liquid crystal microcapsules 6. The liquid crystal microcapsules 6 had excellent dispersion properties for water or the like. Even when a dispersion obtained by dispersing the liquid crystal microcapsules 6 into water or the like was left to stand for one day, no coagulation occurred.

When the particle size distribution of the liquid crystal microcapsules 6 was measured by laser scattering, the average grain size was 6 μm, and the distribution width was narrow. When the liquid crystal microcapsules were observed with a microscope, the liquid crystal microcapsules had a spherical shape.

Subsequently, 80 wt % of the liquid crystal microcapsules and 20 wt % of a solution mixture of water and ethylene glycol were mixed to prepare a liquid crystal microcapsule coating solution. In this solution mixture, the weight ratio of water and ethylene glycol was 1.

The liquid crystal microcapsule coating solution was applied to a polyethylene film 53 and dried to form a coat 54, as shown in FIG. 24A. The thickness of the coat 54 was 11 μm. The coat 54 was peeled from the polyethylene film 53, as shown in FIG. 24B. The coat 54 was stretched until the thickness became 5 μm while holding the two end portions, as shown in FIG. 24C. With this process, a liquid crystal microcapsule layer 8 was formed.

After formation of the liquid crystal microcapsule layer 8, a liquid crystal microcapsule layer 9 was formed by the same method. The liquid crystal microcapsule layers 8 and 9 were inserted between a glass substrate 2 having an aluminum reflection electrode 4 and a substrate 3 having an ITO transparent electrode 5. The liquid crystal microcapsule layers 8 and 9 were stacked such that pulling directions 55-1 and 55-2 were perpendicular to each other, as shown in FIG. 26. The substrate 3 was pressed against the substrate 2 at 120° C. and 5 Torr, thus completing the liquid crystal display device 1-1 shown in FIG. 1.

The liquid crystal display device 1-1 was observed with a microscope. Destruction of the transparent films of the liquid crystal microcapsules 6 was not confirmed. The thickness of a liquid crystal layer 7 was 10 μm. In both the liquid crystal microcapsule layers 8 and 9, the major axis of each liquid crystal microcapsule 6 had a length about 3.5 times the maximum value of the diameter perpendicular to the major axis. The alignment direction of liquid crystal molecules was parallel to the substrate surface, and the liquid crystal molecules in the liquid crystal microcapsule layer 8 were aligned to be perpendicular to those in the liquid crystal microcapsule layer 9.

When an AC voltage of 10 V at 50 Hz was applied to the liquid crystal display device 1-1, the light scattered state in the absence of applied voltage changed to a light transmitted state. The contrast ratio obtained by a reflection densitometer was 20:1.

In Examples 1 to 27, the volume percentage of the liquid crystal material in the liquid crystal microcapsules 6 was 70 vol % or more. In Examples 1 to 27, the variation in alignment direction of each liquid crystal microcapsule 6 from the average alignment direction of the liquid crystal microcapsules 6 fell within the range of 10°.

As described above, to efficiently absorb light in the absence of applied voltage, the alignment direction of liquid crystal molecules must be parallel to the substrate surface. However, when the conventional spherical liquid crystal microcapsules are used, the liquid crystal molecules in the liquid crystal microcapsules are aligned at random. More specifically, in many liquid crystal microcapsules, the liquid crystal molecules are not aligned parallel to the substrate surface. For this reason, according to the conventional liquid crystal display device, the light absorbance in the absence of applied voltage is insufficient, so no high display contrast can be obtained.

According to the present invention, liquid crystal microcapsules are formed into an appropriate shape, so the liquid crystal molecules in the liquid crystal microcapsules in the absence of applied voltage are always aligned in a predetermined direction. In addition, according to the present invention, the alignment direction of liquid crystal microcapsules is controlled using the shape of the liquid crystal microcapsules. Hence, in the present invention, the alignment direction of liquid crystal molecules in the liquid crystal microcapsules in the absence of applied voltage can be controlled to be, e.g., parallel to the substrate surface. That is, the light absorbance in the absence of applied voltage can be increased.

In the present invention, the liquid crystal layer has a multilayered structure in which two liquid crystal microcapsule layers are stacked. In each liquid crystal microcapsule layer, the liquid crystal microcapsules are aligned in one direction. As described above, the shape of the liquid crystal microcapsules has correlation with the alignment direction of liquid crystal molecules. Hence, in all liquid crystal microcapsules in each liquid crystal microcapsule layer, the liquid crystal molecules are aligned in the same direction in the absence of applied voltage.

According to the present invention, the alignment directions of liquid crystal molecules in each liquid crystal microcapsule layer are uniformed, and the alignment directions of liquid crystal molecules are different between the liquid crystal microcapsule layers. More specifically, light incident on the liquid crystal layer is transmitted through at least two liquid crystal microcapsules in which the alignment directions of liquid crystal molecules are different. The at least two liquid crystal microcapsules can absorb different polarized light components. Hence, according to the present invention, the light absorbance in the absence of applied voltage can be further improved.

In the present invention, as described above, the alignment directions of liquid crystal molecules are uniformed in each of the two liquid crystal microcapsule layers stacked. With this arrangement, the alignment direction of liquid crystal molecules can be easily changed between the liquid crystal microcapsule layers. In addition, the difference in alignment direction of liquid crystal molecules between the liquid crystal microcapsule layers can be uniformed.

In the present invention, when the liquid crystal layer has two or more liquid crystal microcapsule layers, the above-described effect can be obtained.

As described above, according to the present invention, when the liquid crystal microcapsules are formed into an aspherical shape, the ratio of the liquid crystal material aligned in the major-axis direction of the liquid crystal microcapsule can be increased, so a liquid crystal display device capable of display at high contrast is provided.

In addition, according to the present invention, the liquid crystal layer has a multilayered structure in which first and second liquid crystal microcapsule layers are stacked, and the alignment direction of liquid crystal material is changed between the liquid crystal microcapsule layers. With this arrangement, a polarized light component which cannot be absorbed by one liquid crystal microcapsule layer can be easily absorbed by the other liquid crystal microcapsule layer. Therefore, according to the present invention, a liquid crystal display device capable of display at high contrast is provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
    a substrate having a pixel electrode on one major surface;
    a liquid crystal layer including first and second liquid crystal microcapsule layers sequentially stacked on the pixel electrode of said substrate; and
    a counter electrode formed on said liquid crystal layer,
    wherein each of said first and second liquid crystal microcapsule layers contains a plurality of aspherical liquid crystal microcapsules each having a shape elongated in one direction and formed by encapsulating a liquid crystal material containing a liquid crystal compound and a dichroic dye with a transparent film,
    the elongation directions of the aspherical liquid crystal microcapsules contained in said first liquid crystal microcapsule layer are aligned substantially parallel to a first direction, and
    the elongation directions of the aspherical liquid crystal microcapsules contained in said second liquid crystal microcapsule layer are aligned substantially parallel to a second direction different from the first direction.

2. A device according to claim 1, wherein each of the plurality of aspherical liquid crystal microcapsules has a length parallel to the elongation direction thereof not less than two times the maximum value of the diameter perpendicular to the elongation direction.

3. A device according to claim 1, wherein in said first liquid crystal microcapsule layer, a variation of the elongation directions of the liquid crystal microcapsules from the first direction falls within a range of ±10°, and
    in said second liquid crystal microcapsule layer, a variation of the elongation directions of the liquid crystal microcapsules from the second direction falls within a range of ±10°.

4. A device according to claim 1, wherein the first direction is substantially perpendicular to the second direction.

5. A device according to claim 1, wherein at least one of the first and second directions is substantially parallel to one major surface of said substrate, and the first direction is substantially perpendicular to the second direction.

6. A device according to claim 1, wherein both of the first and second directions are substantially parallel to one major surface of said substrate, and the first direction is substantially perpendicular to the second direction.

7. A device according to claim 1, wherein each of the plurality of aspherical liquid crystal microcapsules has a spheroidal shape.

8. A device according to claim 1, wherein each of the plurality of aspherical liquid crystal microcapsules is a granule having a tapered shape.

9. A device according to claim 1, wherein each of the plurality of aspherical liquid crystal microcapsules has a fibrous shape.

10. A device according to claim 1, wherein at least one of said first and second liquid crystal microcapsule layers contains a filler which is made of a transparent resin and fills gaps formed between the plurality of aspherical liquid crystal microcapsules.

11. A device according to claim 1, farther comprising a transparent alignment film formed between said first liquid crystal microcapsule layer and said second liquid crystal microcapsule layer to control an alignment of the plurality of aspherical liquid crystal microcapsules in said second liquid crystal microcapsule layer.

12. A device according to claim 1, wherein one major surface of said substrate has a band-shaped projecting portion,
   a side surface of the band-shaped projecting portion is in contact with at least some of the plurality of aspherical liquid crystal microcapsules in said first liquid crystal microcapsule layer, and
   a longitudinal direction of the band-shaped projecting portion is substantially perpendicular to the first direction.

13. A device according to claim 1, wherein the surface of said substrate where the pixel electrode is formed has a plurality of recessed portions periodically aligned, and
   at least some of the plurality of aspherical liquid crystal microcapsules contained in said first liquid crystal microcapsule layer are positioned in the plurality of recessed portions.

14. A device according to claim 13, wherein each of the plurality of recessed portions has a shape that fits with the aspherical liquid crystal microcapsule.

15. A device according to claim 13, wherein each of the plurality of recessed portions has a groove shape.

16. A device according to claim 15, wherein a longitudinal direction of the groove-shaped recessed portion is substantially parallel to the first direction.

17. A device according to claim 16, further comprising intermediate electrodes between said three liquid crystal layers.

18. A device according to claim 1, wherein said device has a structure in which three liquid crystal layers having different absorption wavelengths are sequentially stacked.

19. A liquid crystal display device comprising:
   a substrate having a pixel electrode on one major surface;
   a liquid crystal layer including first and second liquid crystal microcapsule layers sequentially stacked on the pixel electrode of said substrate; and
   a counter electrode formed on said liquid crystal layer,
   wherein each of said first and second liquid crystal microcapsule layers contains a plurality of aspherical liquid crystal microcapsules each having a shape elongated in one direction and formed by encapsulating a liquid crystal material containing liquid crystal compound with a transparent film,
   the elongation directions of the aspherical liquid crystal microcapsules contained in said first liquid crystal microcapsule layer are aligned in a first direction, and
   the elongation directions of the aspherical liquid crystal microcapsules contained in said second liquid crystal microcapsule layer are aligned in a second direction different from the first direction.

* * * * *